US008895684B2

(12) United States Patent
Thiele et al.

(10) Patent No.: US 8,895,684 B2
(45) Date of Patent: Nov. 25, 2014

(54) MODIFIED POLYMER COMPOSITIONS

(75) Inventors: Sven Thiele, Halle (DE); Sascha Rulhoff, Halle (DE)

(73) Assignee: Styron Europe GmbH, Horgen (CH)

( * ) Notice: Subject to any disclaimer, the term of this patent is extended or adjusted under 35 U.S.C. 154(b) by 84 days.

(21) Appl. No.: 13/517,144

(22) PCT Filed: Dec. 20, 2010

(86) PCT No.: PCT/EP2010/007804
§ 371 (c)(1),
(2), (4) Date: Jul. 20, 2012

(87) PCT Pub. No.: WO2011/079922
PCT Pub. Date: Jul. 7, 2011

(65) Prior Publication Data
US 2012/0316289 A1    Dec. 13, 2012

Related U.S. Application Data

(60) Provisional application No. 61/288,519, filed on Dec. 21, 2009.

(51) Int. Cl.
| | | |
|---|---|---|
| *C08F 36/06* | (2006.01) | |
| *C08F 236/10* | (2006.01) | |
| *B60C 1/00* | (2006.01) | |
| *C08C 19/44* | (2006.01) | |
| *C08F 36/04* | (2006.01) | |
| *C08L 15/00* | (2006.01) | |
| *C08K 5/548* | (2006.01) | |
| *C08K 3/36* | (2006.01) | |
| *C08L 9/00* | (2006.01) | |

(52) U.S. Cl.
CPC ............ *C08C 19/44* (2013.01); *C08F 236/10* (2013.01); *B60C 1/00* (2013.01); *C08K 5/548* (2013.01); *C08K 3/36* (2013.01); *C08F 36/04* (2013.01); *C08L 9/00* (2013.01); *C08L 15/00* (2013.01)
USPC .......................................... 526/335; 526/340

(58) Field of Classification Search
CPC ............ C08F 297/044; C08F 297/023; C08F 236/06; C08F 2/38; B60C 1/0016; C08L 23/32; C08L 23/36
USPC .................................................. 526/335, 340
See application file for complete search history.

(56) References Cited

U.S. PATENT DOCUMENTS 3,078,254 A    2/1963  Zelinski et al.
3,244,664 A    4/1966  Zelinski et al.

(Continued)

FOREIGN PATENT DOCUMENTS

DE    237 513 A1    7/1981
DE    242 232 A1    7/1981

(Continued)

OTHER PUBLICATIONS

International Search Report, dated May 12, 2011, pp. 1-4, International Patent Application No. PCT/EP2010/007804, European Patent Office, The Netherlands.

(Continued)

*Primary Examiner* — Kuo-Liang Peng
(74) *Attorney, Agent, or Firm* — Brinks Gilson & Lione

(57) ABSTRACT

The invention provides a first composition comprising at least the following: i) a modified polymer comprising at least one branched modified polymer macromolecule (b1) and at least one linear modified polymer macromolecule (a1), and wherein the at least one branched modified polymer macromolecule and the at least one linear modified polymer macromolecule each, independently, comprises at least one amine group selected from the group consisting of formulas (1A-1F), each as described above Formula 1A, Formula 1B, Formula 1C, Formula 1D, Formula 1E, Formula 1F, and combinations thereof; and wherein the at least one branched modified polymer macromolecule further comprises one of the structures (ib1-ib4) as described above, and the at least one linear modified polymer macromolecule further comprises one of the structures (iib1-iib2) as described above.

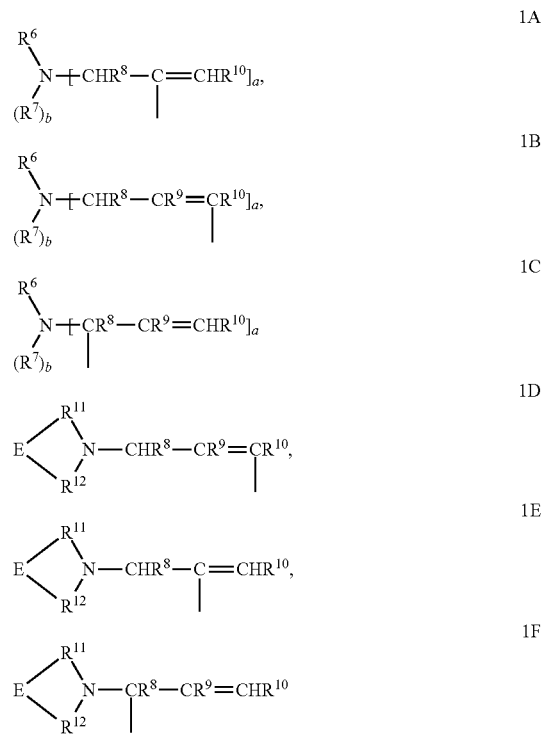

15 Claims, No Drawings

(56) References Cited

U.S. PATENT DOCUMENTS

| | | | |
|---|---|---|---|
| 3,281,383 | A | 10/1966 | Zelinski et al. |
| 3,629,213 | A | 12/1971 | Onishi et al. |
| 3,652,456 | A * | 3/1972 | Naylor .................. 502/155 |
| 3,692,874 | A | 9/1972 | Farrar et al. |
| 3,951,936 | A | 4/1976 | Hanlon |
| 3,978,103 | A | 8/1976 | Meyer-Simon et al. |
| 4,048,206 | A | 9/1977 | Voronkov et al. |
| 4,474,908 | A | 10/1984 | Wagner |
| 4,616,069 | A | 10/1986 | Watanabe et al. |
| 4,689,368 | A | 8/1987 | Jenkins |
| 4,931,376 | A | 6/1990 | Ikematsu et al. |
| 5,086,136 | A | 2/1992 | Takashima et al. |
| 5,089,574 | A | 2/1992 | Castner |
| 5,134,199 | A | 7/1992 | Hattori et al. |
| 5,218,023 | A | 6/1993 | Horikawa et al. |
| 5,448,002 | A | 9/1995 | Castner |
| 5,502,131 | A | 3/1996 | Antkowiak et al. |
| 5,753,579 | A | 5/1998 | Jalics et al. |
| 5,753,761 | A | 5/1998 | Sandstrom et al. |
| 5,786,441 | A | 7/1998 | Lawson et al. |
| 5,792,820 | A | 8/1998 | Lawson et al. |
| 5,834,573 | A | 11/1998 | Castner |
| 5,866,650 | A | 2/1999 | Lawson et al. |
| 5,916,961 | A | 6/1999 | Hergenrother et al. |
| 5,959,048 | A | 9/1999 | Lawson et al. |
| 6,018,007 | A | 1/2000 | Lynch |
| 6,025,450 | A | 2/2000 | Lawson et al. |
| 6,046,288 | A | 4/2000 | Lawson et al. |
| 6,080,835 | A | 6/2000 | Lawson et al. |
| 6,103,842 | A | 8/2000 | Halasa et al. |
| 6,184,168 | B1 | 2/2001 | Lynch |
| 6,229,036 | B1 | 5/2001 | Batz-Sohn et al. |
| 6,310,152 | B1 | 10/2001 | Castner |
| 6,489,415 | B2 | 12/2002 | Hsu et al. |
| 6,627,715 | B2 | 9/2003 | Halasa et al. |
| 6,693,160 | B1 | 2/2004 | Halasa et al. |
| 6,777,569 | B1 | 8/2004 | Westmeyer et al. |
| 2003/0065114 | A1 | 4/2003 | Castner |
| 2005/0124740 | A1 | 6/2005 | Klockmann et al. |
| 2011/0082253 | A1 | 4/2011 | Thiele et al. |
| 2011/0218300 | A1 * | 9/2011 | Thiele et al. .................. 525/54 |

FOREIGN PATENT DOCUMENTS

| | | |
|---|---|---|
| DE | 236 321 A1 | 11/1981 |
| EP | 0 593 049 A1 | 10/1993 |
| EP | 0 924 214 A2 | 11/1998 |
| EP | 0 964 008 A1 | 6/1999 |
| EP | 1 367 069 A1 | 5/2003 |
| JP | 11-301794 | 11/1999 |
| WO | WO 02/24764 A1 | 3/2002 |
| WO | WO 2007/047943 A2 | 4/2007 |
| WO | WO 2008/130782 A1 | 10/2008 |
| WO | WO 2009/077837 A1 | 6/2009 |
| WO | WO 2009/148932 A1 | 12/2009 |
| WO | WO 2010/056694 A1 | 5/2010 |
| WO | WO 2011/076377 A1 | 6/2011 |

OTHER PUBLICATIONS

International Preliminary Report on Patentability, dated Jun. 26, 2012, pp. 1-4, International Patent Application No. PCT/EP2010/007804, The International Bureau of WIPO, Switzerland.

International Search Report, dated Jan. 28, 2011, pp. 1-3, International Patent Application No. PCT/EP2010/007805, European Patent Office, The Netherlands.

International Preliminary Report on Patentability, dated Jun. 26, 2012, pp. 1-6, International Patent Application No. PCT/EP2010/007805, The International Bureau of WIPO, Switzerland.

* cited by examiner

MODIFIED POLYMER COMPOSITIONS

RELATED APPLICATIONS

This application is a National Stage of International Application PCT/EP2010/007804, filed Dec. 20, 2010, which claims the benefit of the filing date under 35 U.S.C. §119(e) of Provisional U.S. Patent Application Ser. No. 61/288,519, filed Dec. 21, 2009. Both applications are hereby incorporated by reference in their entirety.

FIELD OF THE INVENTION

This invention relates to modified polymer compositions comprising alpha modified/omega modified polymers and alpha modified/branched modified polymers, each as described herein. The invention also relates to the use of these compositions in the preparation of vulcanized compositions, and articles prepared from the same. The modified compositions are useful in the preparation of vulcanized, and thus cross-linked, elastomeric compositions having relatively low hysteresis loss. Such compositions are useful in many articles, including tire treads having low rolling resistance, good wet grip and ice grip, in combination with a good balance of other desirable physical and chemical properties, for example, abrasion resistance, tensile strength and processability.

BACKGROUND OF THE INVENTION

It is generally accepted, that increasing oil prices and national countries' legislations that require the reduction of automotive carbon dioxide emissions, force tire and rubber producers to contribute to produce "fuel efficient," and thus fuel or gas saving tires. One general approach to obtain fuel efficient tires is to produce tire formulations that have reduced hysteresis loss. A major source of hysteresis in vulcanized elastomeric polymers is believed to be attributed to free polymer chain ends, that is, the section of the elastomeric polymer chain between the last cross-link and the end of the polymer chain. This free end of the polymer does not participate in any efficient elastically recoverable process, and as a result, any energy transmitted to this section of the polymer is lost. This dissipated energy leads to a pronounced hysteresis under dynamic deformation. Another source of hysteresis in vulcanized elastomeric polymers is believed to be attributed to an insufficient distribution of filler particles in the vulcanized elastomeric polymer composition. The hysteresis loss of a cross-linked elastomeric polymer composition is related to its Tan δ, at 60° C., value (see ISO 4664-1:2005; Rubber, Vulcanized or thermoplastic; Determination of dynamic properties—part 1: General guidance). In general, vulcanized elastomeric polymer compositions having relatively small Tan δ values, at 60° C., are preferred as having lower hysteresis loss. In the final tire product, this translates to a lower rolling resistance and better fuel economy.

It is generally accepted, that a lower rolling resistance tire can be made on the expense of deteriorated wet grip properties. For example, if, in a random solution styrene-butadiene rubber (random SSBR), the polystyrene unit concentration is relatively reduced, with respect to the total polybutadiene unit concentration, and the 1,2-polydiene unit concentration is kept constant, both the tan delta at 60° C. and the tan delta at 0° C., are reduced, generally corresponding to improved rolling resistance and deteriorated wet grip performance of a tire. Similarly, if, in a random solution styrene-butadiene rubber (random SSBR), the 1,2-polybutadiene unit concentration is relatively reduced, with respect to the total polybutadiene unit concentration, and the polystyrene unit concentration is kept constant, both the tan delta at 60° C. and the tan delta at 0α C. are reduced, generally corresponding to improved rolling resistance and deteriorated wet grip performance of a tire. Accordingly, when assessing the rubber vulcanizate performance correctly, both the rolling resistance, related tan delta at 60° C., and the wet grip, related tan delta at 0° C., should be monitored.

One generally accepted approach to reducing hysteresis loss is to reduce the number of free chain ends of elastomeric polymers. Various techniques are described in the open literature including the use of "coupling agents," such as tin tetrachloride, which may functionalize the polymer chain end, and react with components of an elastomeric composition, such as, for example, with a filler or with unsaturated portions of a polymer. Examples of such techniques include: U.S. Pat. Nos. 3,281,383; 3,244,664 and 3,692,874 (tetrachlorosilane); U.S. Pat. Nos. 3,978,103; 4,048,206; 4,474,908; 6,777,569 (blocked mercaptosilanes) and U.S. Pat. No. 3,078,254 (a multi-halogen-substituted hydrocarbon, such as 1,3,5-tri(bromo methyl)benzene); U.S. Pat. No. 4,616,069 (tin compound and organic amino or amine compound); and U.S. 2005/0124740.

The application of "coupling agents," as reactant to living polymers, more often than not, leads to the formation of polymer blends comprising one fraction of linear or uncoupled polymers, and one or more fractions comprising more than two polymer arms at the coupling point. The reference "Synthesis of end-functionalized polymer by means of living anionic polymerization," Journal of Macromolecular Chemistry and Physics, 197, (1996), 3135-3148, describes the synthesis of "polystyrene-containing" and "polyisoprene-containing" living polymers with hydroxy (—OH) and mercapto (—SH) functional end caps, obtained by reaction of the living polymers with haloalkanes containing silyl ether and silyl thioether functions. The tertiary-butyldimethylsilyl (TBDMS) group is preferred as a protecting group for the —OH and —SH functions in the termination reactions, because the corresponding silyl ethers and thioethers are found to be both, stable and compatible with anionic living polymers.

International Publication No. WO 2007/047943 describes the use of a silane-sulfide omega chain end modifier, represented by the formula $(RO)_x(R)_ySi$—R'—S—$SiR_3$, wherein x is the number one, two or three, y is the number zero, one or two, the sum of x and y is three, R is alkyl, and R' is aryl, alkylaryl or alkyl, to produce a chain end modified elastomeric polymer, used as component in a vulcanized elastomeric polymer composition, or in a tire tread.

More specifically, according to WO 2007/047943, a silane-sulfide compound is reacted with anionically-initiated, living polymers to produce "chain end modified" polymers, which are subsequently blended with fillers, vulcanizing agents, accelerators or oil extenders, to produce a vulcanized elastomeric polymer composition having low hysteresis loss. To further control polymer molecular weight and polymer properties, a coupling agent (or linking agent) can be used according to WO 2007/047943, as an optional component, in the process of the preparation of elastomeric polymers. The modifier is then added before, after, or during, the addition of a coupling agent, and preferably, the modification reaction is completed after the addition of the coupling agent. In some embodiments, more than a third of the polymer chain ends are reacted with a coupling agent prior to addition of the modifier.

U.S. Pat. No. 5,502,131 describes a method of preparing a polymer comprising polymerizing diolefin monomers and/or monovinylaromatic monomers in the presence of a polymerization initiator having the general Formula A or B:

$$\begin{array}{c}R'_1\\ \phantom{R}\diagdown\\ \phantom{R'_1}N\!\!-\!\!R'_3\!\!-\!\!Li \quad \text{and}\\ \phantom{R}\diagup\\ R'_2\end{array}$$ Formula A $$\begin{array}{c}(R'_5)_x\\ \overline{\phantom{xxxxxxxxx}}\\ R'_4 \phantom{xxx} N\!\!-\!\!R'_3\!\!-\!\!Li,\\ \underline{\phantom{xxxxxxxxx}}\end{array}$$ Formula B wherein $R'_1$ and $R'_2$ are same or different and are alkyls, cycloalkyls or aralkyls; $R'_3$ is a deprotonated allyl, 2-methallyl or xylyl; $R'_4$ is a carbocyclic group; and $R'_5$ is an alkyl substituent on a methylene group. The formation of polymers comprising polar groups in the alpha and omega chain end positions was not conclusively demonstrated in the experimental section of the U.S. Pat. No. 5,502,131. Tan delta at 0° C. values correlating with the tire wet grip performance was not reported at all. Furthermore, the impact of the presented alpha chain end modified polymers in silica compound vulcanizates was not demonstrated or stated in the patent application. In addition, no heteroatom is included in $R'_4$ in Formula B, and aromatic substituents are excluded for $R'_1$ and $R'_2$ in Formula A.

German Democratic Republic (GDR) patent applications DD 237513 A1, DD 242232 A1 and DD 236321 A1 describe a procedure for the preparation of multi-functional 1,3-diene homo- and copolymers (e.g. of butadiene with isoprene, styrene or alpha-methylstryrene), based on polymerization initiators of the general formula:

Formula C wherein n is a number from 2 to 6, R, R', R" and R''' are each independently selected (but depending on the specific patent application DD 237513 A1, DD 242232 A1 or DD 236321 A1 selected) from the group consisting of alkyl, cyclic alkyl, aryl, allyl, deprotonated allyl or R''''—(CH$_2$—CH(Li)—CH$_2$)—, wherein and R'''' is an alkyl group, a cycloalkyl group or an aryl group. The molecular weights of the polymers as described in DD 237513 A1, DD 242232 A1 and DD 236321 A1 are too low to be used for compound mixtures useful for the application in tires. International Publication No. WO 2009/077837 A1 refers to a butadiene-styrene copolymer, functionalized at both extremities of its chains, to the preparation of the copolymers, to compounds comprising mentioned copolymers, and to the use of the same. In particular the patent publication refers to two groups of polymers, Group 1 representing alpha omega modified linear random styrene butadiene rubber, and Group 2 representing linear, branched and/or radial copolymer structures, as depicted in Scheme 1 below.

Scheme 1

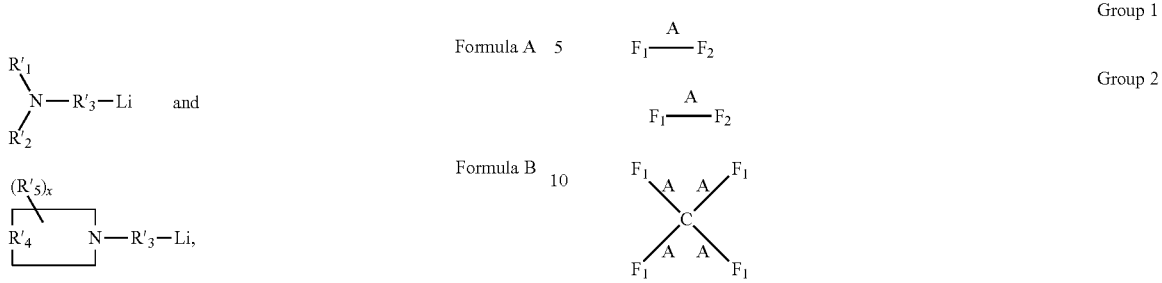

In Scheme 1, $F_1$ represents a terminal functionalization of polymeric chains, and can be groups of the type —OH, —COOH, —COX, where X is a halogen, —SH, —CSSH, —NCO, epoxy and amine, and the amine group more specifically defined as one of the following structures: —N(R1)$_2$, —NR2R2, —NHR1, NH$_2$, wherein the groups R1 and R2 may be alkyl groups, cycloalkyl groups, aralkyl groups or aryl groups.

In Scheme 1, $F_2$ represents one of the extremities of the polymer chains, functionalized with silyl, silanol and siloxane groups defined as one of the following structures —SiH$_2$(OH), —Si(R1)$_2$(OH), —SiH(OH)$_2$, —SiR1(OH)$_2$, —Si(OH)$_3$, —Si(OR1)$_3$, —(SiR1R2O)$_x$—R3, —Si(R3)$_3$—m(X)m, wherein X is a halogen, R1 and R2 are alkoxy, alkyl, cycloalkyl, aralkyl or vinyl groups, and R3 is hydrogen, alkyl, aryl or an amine group containing siloxane group represented by the formula -A$^1$-Si(A$^2$-N((H)$_k$(R1)$_{2-k}$))$_y$(OR1)$_z$(R3)$_{3-(y+z)}$, where k is the number 0, 1 or 2, y is the number 1, 2 or 3, z is the number 0, 1 or 2, 0≤y+z≤3, and R1, R2, R3, A$^1$ and A$^2$ are groups containing exclusively hydrogen and carbon atoms.

In Scheme 1, C is a silicon or tin based coupling agent with a functionality greater than, or equal to, the number 2, and represented by structures wherein the silicon or tin atom of the coupling agent is linked to a halogen, an —OR group or to a group containing exclusively hydrogen and carbon atoms, stated R group also represents a hydrocarbon group.

The application claims a butadiene and styrene copolymer containing "Group 1" (linear structure) and "Group 2" (branched or radial structure) butadiene-styrene copolymers, and one or more fillers, the nature of the fillers not being defined. In the patent application, there was no indication about the performance of the described polymers in carbon black compound vulcanizates.

Two typical fillers, silica and carbon black are applied to the tire production. Standard formulations very often comprise both fillers, silica and carbon black, in different ratios. Therefore, it would be desirably to have a modified polymer which gives excellent rolling resistance, and grip characteristics, in both carbon black and silica compounds. In addition, it would be desirable to have improved heat build-up values for the modified polymer-filler vulcanizate. A decreased heat built-up value reduces the risk of depolymerization in the vulcanizate in thermal and mechanical stress situations.

Additional initiator compounds and/or modifier compounds are described in the following: U.S. Pat. Nos. 5,502,131, 6,025,450, 6,080,835, 6,046,288, 5,792,820, 5,916,961, 5,866,650, 5,959,048, 5,852,189, 5,912,343, 5,736,617, 5,786,441, 7,342,070, 6,229,036, International Publication No. WO 2007/047943, International Publication Nos. WO/2009/148932 and WO/2010/056694.

There is a need for modification methods and resulting modified polymers that can be used to further optimize dynamic silica and carbon black vulcanizate properties, including low hysteresis properties, corresponding to a high wet grip and to a low rolling resistance property in tires. In addition there is a need to further decrease the vulcanizate heat built up during thermal exposure and under mechanical stress. These needs have been met by the following invention.

SUMMARY OF THE INVENTION

The invention provides a first composition comprising at least the following:

i) a modified polymer comprising at least one branched modified polymer macromolecule (b1) and at least one linear modified polymer macromolecule (a1), and wherein the at least one branched modified polymer macromolecule and the at least one linear modified polymer macromolecule each, independently, comprises at least one amine group selected from the group consisting of formulas (1A-1F):

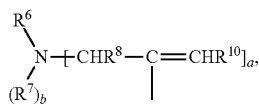

Formula 1A

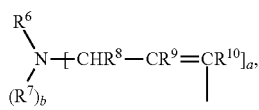

Formula 1B

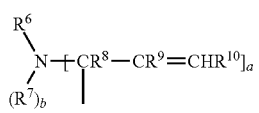

Formula 1C

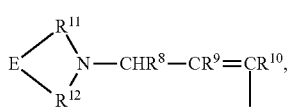

Formula 1D

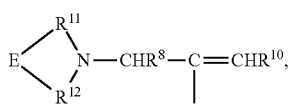

Formula 1E

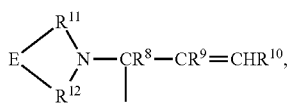

Formula 1F and combinations thereof;

wherein, N is a nitrogen atom, C is carbon atom, H is a hydrogen atom;

E is at least divalent, and is selected from the group consisting of: a) a $(C_1-C_{18})$ alkyl, which may be substituted with one or more of the following groups: amine group, $R^{39}R^{40}R^{41}Si$— and $R^{39}R^{40}R^{41}Si$-amine group; where $R^{39}$, $R^{40}$ and $R^{41}$ are each independently selected from the group consisting of: $(C_1-C_{18})$ alkyl, $(C_6-C_{18})$ aryl, and $(C_7-C_{18})$ aralkyl; $(C_6-C_{18})$ aryl, $(C_7-C_{18})$ aralkyl; b) an oxygen atom (O); c) a sulfur atom (S); d) N—$CHR^8$—$CR^9$=$CR^{10}$, where $R^8$, $R^9$ and $R^{10}$ are each defined below; e) N—$CHR^8$—C=$CHR^{10}$, where $R^8$, $R^9$ and $R^{10}$ are each defined below; f) N—$CR^8$—$CR^9$=$CHR^{10}$, where $R^8$, $R^9$ and $R^{10}$ are each defined below; g) N—$CHR^8$—$CR^9$=$CHR^{10}$, where $R^8$, $R^9$ and $R^{10}$ are each defined below; h) a H—N group; k) a tertiary amine group; or l) a $R^{42}R^{43}R^{44}SiN$ group, where $R^{42}$, $R^{43}$ and $R^{44}$ are each independently selected from the group consisting of $(C_1-C_{18})$ alkyl, $(C_6-C_{18})$ aryl, and $(C_7-C_{18})$ aralkyl;

$R^{11}$ and $R^{12}$ are each at least divalent, and are each independently selected from the group consisting of $(C_1-C_{18})$ alkyl, $(C_6-C_{18})$ aryl, and $(C_7-C_{18})$ aralkyl;

$R^8$, $R^9$, $R^{10}$ are each independently selected from the group consisting of: hydrogen (H), $(C_1-C_{18})$ alkyl, $(C_6-C_{18})$ aryl, and $(C_7-C_{18})$ aralkyl;

$R^6$ is selected from the group consisting of: hydrogen (H), $(C_1-C_{18})$ alkyl, $(C_6-C_{18})$ aryl, $(C_7-C_{18})$ aralkyl and —$SiR^{36}R^{37}R^{38}$, where $R^{36}$, $R^{37}$ and $R^{38}$ are each independently selected from the group consisting of: $(C_1-C_{18})$ alkyl, $(C_6-C_{18})$ aryl, and $(C_7-C_{18})$ aralkyl; and $(C_1-C_{18})$ alkyl may be substituted with one or more of the following groups: amine group, $R^{45}R^{46}R^{47}Si$— group or $(R^{45}R^{46}R^{47}Si)_2$ N group, where $R^{45}$, $R^{46}$ and $R^{47}$ are each independently selected from the group consisting of: $(C_1-C_{18})$ alkyl, $(C_6-C_{18})$ aryl, and $(C_7-C_{18})$ aralkyl;

$R^7$ is selected from the group consisting of: hydrogen (H), $(C_1-C_{18})$ alkyl, $(C_6-C_{18})$ aryl, $(C_7-C_{18})$ aralkyl, —$CHR^8$—$CR^9$=$CHR^{10}$, and —$SiR^{51}R^{52}R^{53}$, where $R^{51}$, $R^{52}$ and $R^{53}$ are each independently selected from the group consisting of: $(C_1-C_{18})$ alkyl, $(C_6-C_{18})$ aryl, and $(C_7-C_{18})$ aralkyl;

a is the number 1 or 2; and b is the number zero or one; and wherein the at least one branched modified polymer macromolecule further comprises ib) at least one of the following structures (ib1-ib4):

ib1) a four valent silicon or tin atom, each referred to as $(R''')_tM$ group, or a $(R''')_tM(X)_p$ group, or a $M(X)_z$—$(O)_x$-M$(X)_z$ group, wherein M is a tin or a silicon atom, O is an oxygen atom, X is a halide atom, an alkoxy group or a hydroxyl group (—OH group), R''' is an $(C_1-C_6)$-alkyl group, z is the number 1 or 2, x is the number zero or 1, p is the number 1 or 2, t is the number 0, 1 or 2, and wherein, for each group, the remaining free valences on M are each linked to an alpha-modified polymer macromolecule;

ib2) a group according to Formula 2A:

$(R^{24}O)_q(R^{25})_rSi$—$R^{29}$—S—$Si'R^{26}R^{27}R^{28}$   Formula 2A, wherein, Si and Si' are silicon atoms, S is a sulfur atom and O is an oxygen atom;

$R^{24}$ is selected from the group consisting of: hydrogen (H), and $(C_1-C_6)$ alkyl;

$R^{25}$, $R^{26}$, $R^{27}$ and $R^{28}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl;

$R^{29}$ is a divalent group selected from the group consisting of: a di-$(C_2-C_{20})$ alkylether (alkyl-O-alkyl), a $(C_6-C_{18})$ aryl, a $(C_7-C_{18})$ alkylaryl, and a $(C_1-C_{18})$ alkyl, and each group may be substituted with at least one of the following: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and/or a thioalkyl;

q is the number 0 or 1; and r is the number 0 or 1; the sum of q and r (q+r) is the number 0 or 1; and the remaining free valences of the "four valent silicon atom," Si, are each linked to an alpha-modified polymer macromolecule;

ib3) a group according to Formula 2B:

$(R^{24}O)_q(R^{25})_rSi$—$R^{29}$—S—H   Formula 2B, wherein, Si is a silicon atom, S is a sulfur atom, O is an oxygen atom, H is a hydrogen atom;

$R^{24}$ is selected from the group consisting of: hydrogen (H) and $(C_1-C_6)$ alkyl;

$R^{25}$ is selected from the group consisting of: hydrogen (H), $(C_1-C_6)$ alkyl, $(C_6-C_{18})$ aryl, and $(C_7-C_{18})$ aralkyl;

$R^{29}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl, and each group may be substituted with at least one of the following: a $(C_1-C_4)$ alkyl, a $(C_1-C_4)$ alkoxy, a $(C_7-C_{16})$ aryl, a $(C_7-C_{16})$ aralkyl, a nitrile, an amine, a $NO_2$, and/or a thioalkyl;

q is the number 0 or 1; and r is the number 0 or 1; the sum of q and r (q+r) is the number 0 or 1; and the remaining free valences of the "four valent silicon atom," Si, are each linked to an alpha-modified polymer macromolecule;

ib4) a group according to Formula 2C:

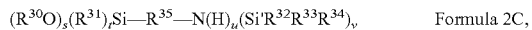
$$(R^{30}O)_s(R^{31})_q\text{Si}-R^{35}-N(H)_u(\text{Si}'R^{32}R^{33}R^{34})_v \quad \text{Formula 2C},$$

wherein, Si and Si' are silicon atoms, S is a sulfur atom, N is a nitrogen atom, and O is an oxygen atom;

$R^{30}$ is selected from the group consisting of: hydrogen (H) and $(C_1-C_6)$ alkyl;

$R^{31}, R^{32}, R^{33}$ and $R^{34}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl;

$R^{35}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl, and each group may be substituted with at least one of the following: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and/or a thioalkyl;

s is the number 0 or 1; and t is the number 0 or 1; the sum of s and t (s+t) is the number 0 or 1; u is the number 0, 1 or 2; v is the number 0, 1 or 2; and the sum of u and v (u+v) is the number 2; and the remaining free valences of the "four valent silicon atom," Si, are each linked to an alpha-modified polymer macromolecule; and wherein the at least one linear modified polymer macromolecule further comprises at least one the following structures (iib1-iib2):

a sulfanylsilane compound moiety corresponding to Formula 4A:

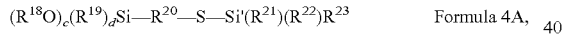
$$(R^{18}O)_c(R^{19})_d\text{Si}-R^{20}-S-\text{Si}'(R^{21})(R^{22})R^{23} \quad \text{Formula 4A},$$

wherein, Si and Si' are each a silicon atom, S is sulfur atom, O is oxygen atom;

$R^{18}$ is selected from the group consisting of: hydrogen (H) and $(C_1-C_6)$ alkyl;

$R^{19}$ is selected from the group consisting of: hydrogen (H), $(C_1-C_{18})$ alkyl, $(C_6-C_{18})$ aryl, and $(C_7-C_{18})$ aralkyl;

$R^{20}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl, and each group may be substituted with at least one of the following: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and/or a thioalkyl;

$R^{21}, R^{22}$ and $R^{23}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl;

c is a number selected from 0, 1 and 2; d is a number selected from 0, 1, and 2; and the sum of c and d is the number 2 (c+d=2); and the remaining free valence of the "four valent silicon atom," Si, is linked to an alpha-modified polymer macromolecule a sulfanylsilane compound moiety corresponding to Formula 4B:

$$(R^{18}O)_c(R^{19})_d\text{Si}-R^{20}-S-H \quad \text{Formula 4B},$$

wherein, Si is a silicon atom, S is a sulfur atom, H is a hydrogen atom, O is an oxygen atom;

$R^{18}$ is selected from the group consisting of: hydrogen (H) and $(C_1-C_6)$ alkyl;

$R^{19}$ is selected from the group consisting of: hydrogen (H), $(C_1-C_{18})$ alkyl, $(C_6-C_8)$ aryl and $(C_7-C_{18})$ aralkyl;

$R^{20}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl, and each group may be substituted with at least one of the following: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and/or a thioalkyl;

c is a number selected from 0, 1 and 2; d is a number selected from 0, 1, and 2; and the sum of c and d is the number 2 (c+d=2); and the remaining free valence of the "four valent silicon atom," Si, is linked to an alpha-modified polymer macromolecule.

DETAILED DESCRIPTION OF THE INVENTION

As discussed above, the invention provides a first composition comprising at least the following: i) a modified polymer comprising at least one branched modified polymer macromolecule (b1) and at least one linear modified polymer macromolecule (a1), and wherein the at least one branched modified polymer macromolecule and the at least one linear modified polymer macromolecule each, independently, comprises at least one amine group selected from the group consisting of formulas (1A-1F):

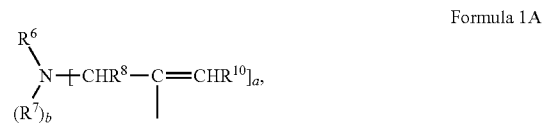

Formula 1A

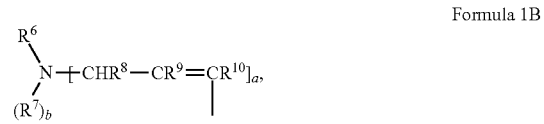

Formula 1B

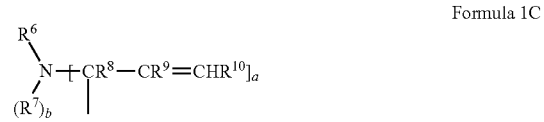

Formula 1C

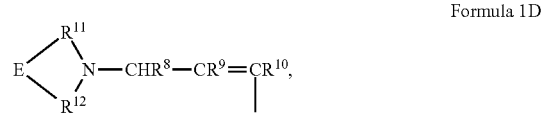

Formula 1D

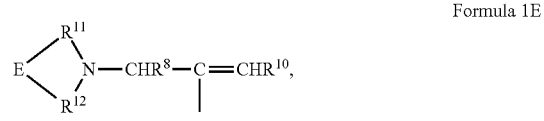

Formula 1E

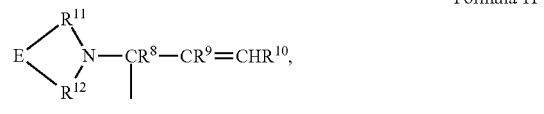

Formula 1F and combinations thereof;

wherein, N is a nitrogen atom, C is carbon atom, H is a hydrogen atom;

E is at least divalent, and is selected from the following: a) a $(C_1-C_{18})$ alkyl, which may be substituted with one or more of the following groups: amine group, $R^{39}R^{40}R^{41}$Si— and $R^{39}R^{40}R^{41}$Si-amine group, where $R^{39}$, $R^{40}$ and $R^{41}$ are each independently selected from the group consisting of: $(C_1-$ $C_{18}$) alkyl, ($C_6$-$C_{18}$) aryl, and ($C_7$-$C_{18}$) aralkyl; ($C_6$-$C_{18}$) aryl, ($C_7$-$C_{18}$) aralkyl; b) an oxygen atom (O); c) a sulfur atom (S); d) N—CHR$^8$—CR$^9$=CR$^{10}$, where R$^8$, R$^9$ and R$^{10}$ are each defined below; e) N—CHR$^8$—C=CHR$^{10}$, where R$^8$, R$^9$ and R$^{10}$ are each defined below; f) N—CR$^8$—CR$^9$=CHR$^{o1}$, where R$^8$, R$^9$ and R$^{10}$ are each defined below; g) N—CHR$^8$—CR$^9$=CHR$^{10}$, where R$^8$, R$^9$ and R$^{10}$ are each defined below; h) a H—N group; k) a tertiary amine; and l) a R$^{42}$R$^{43}$R$^{44}$SiN group, where R$^{42}$, R$^{43}$ and R$^{44}$ are each independently selected from the group consisting of: ($C_1$-$C_{18}$) alkyl, ($C_6$-$C_{18}$) aryl, and ($C_7$-$C_{18}$) aralkyl;

R$^{11}$ and R$^{12}$ are each at least divalent, and are each independently selected from the group consisting of: ($C_1$-$C_{18}$) alkyl, ($C_6$-$C_{18}$) aryl, and ($C_7$-$C_{18}$) aralkyl; and R$^{11}$ and R$^{12}$ are each preferably independently selected from ($C_1$-$C_5$) alkyl;

R$^8$, R$^9$, R$^{10}$ are each independently selected from the group consisting of: hydrogen (H), ($C_1$-$C_{18}$) alkyl, ($C_6$-$C_{18}$) aryl, and ($C_7$-$C_{18}$) aralkyl; and R$^8$, R$^9$ and R$^{10}$ are each preferably independently selected from ($C_1$-$C_5$) alkyl;

R$^6$ is selected from the group consisting of: hydrogen (H), ($C_1$-$C_{18}$) alkyl, ($C_6$-$C_{18}$) aryl, ($C_7$-$C_{18}$) aralkyl and —SiR$^{36}$R$^{37}$R$^{38}$, where R$^{36}$, R$^{37}$ and R$^{38}$ are each independently selected from the group consisting of: ($C_1$-$C_{18}$) alkyl, ($C_6$-$C_{18}$) aryl, and ($C_7$-$C_{18}$) aralkyl; and ($C_1$-$C_{18}$) alkyl may be substituted with one or more of the following groups: amine group, R$^{45}$R$^{46}$R$^{47}$Si— group or (R$^{45}$R$^{46}$R$^{47}$Si)$_2$ N group, where R$^{45}$, R$^{46}$ and R$^{47}$ are each independently selected from the group consisting of: ($C_1$-$C_{18}$) alkyl, ($C_6$-$C_{18}$) aryl, and ($C_7$-$C_{18}$) aralkyl; and R$^6$ is preferably selected from ($C_1$-$C_5$) alkyl;

R$^7$ is selected from the group consisting of: hydrogen (H), ($C_1$-$C_{18}$) alkyl, ($C_6$-$C_{18}$) aryl, ($C_7$-$C_{18}$) aralkyl, —CHR$^8$—CR$^9$=CHR$^{10}$, and —SiR$^{51}$R$^{52}$R$^{53}$, where R$^{51}$, R$^{52}$ and R$^{53}$ are each independently selected from the group consisting of: ($C_1$-$C_{18}$) alkyl, ($C_6$-$C_{18}$) aryl, and ($C_7$-$C_{18}$) aralkyl; and R$^7$ is preferably independently selected from ($C_1$-$C_5$) alkyl or —SiR$^{51}$R$^{52}$R$^{53}$, where R$^{51}$, R$^{52}$, and R$^{53}$ are described above;

a is the number 1 or 2; and b is the number zero or one; and wherein the at least one branched modified polymer macromolecule further comprises ib) at least one of the following structures (ib1-ib4):

ib1) a four valent silicon or tin atom, each referred to as (R''')$_t$ M group, or a (R''')$_t$M(X)$_p$ group, or a M(X)$_z$—(O)$_x$-M (X)$_z$ group, wherein M is a tin or a silicon atom, O is an oxygen atom, X is a halide atom, an alkoxy group or a hydroxyl group (—OH group), R''' is an ($C_1$-$C_6$)-alkyl group, z is the number 1 or 2, x is the number zero or 1, p is the number 1 or 2, t is the number 0, 1 or 2 and wherein, for each group, the remaining free valences on M are each linked to an alpha-modified polymer macromolecule;

a group according to Formula 2A:

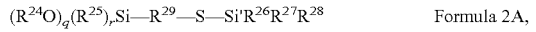

Formula 2A, wherein, Si and Si' are silicon atoms, S is a sulfur atom and O is an oxygen atom;

R$^{24}$ is selected from the group consisting of: hydrogen (H), and ($C_1$-$C_6$) alkyl;

R$^{25}$, R$^{26}$, R$^{27}$ and R$^{28}$ are the same or different, and are each independently selected from the group consisting of: hydrogen (H), ($C_1$-$C_{18}$) alkyl, ($C_1$-$C_{18}$) alkoxy, ($C_6$-$C_{18}$) aryl, and ($C_7$-$C_{18}$) aralkyl, and preferably selected from the group consisting of: ($C_1$-$C_{18}$) alkyl, ($C_6$-$C_{18}$) aryl, and ($C_7$-$C_{18}$) aralkyl; and R$^{25}$, R$^{26}$, R$^{27}$ and R$^{28}$ are each more preferably independently selected from ($C_1$-$C_5$) alkyl. In another embodiment, R$^{25}$, R$^{26}$, R$^{27}$ and R$^{28}$ are each independently a ($C_1$-$C_{16}$) alkyl, more preferably a ($C_1$-$C_{12}$) alkyl, even more preferably a ($C_1$-$C_8$) alkyl, and most preferably a ($C_1$-$C_4$) alkyl;

R$^{29}$ is a divalent group selected from the group consisting of: a di-($C_2$-$C_{20}$) alkylether (alkyl-O-alkyl), a ($C_6$-$C_{18}$) aryl, a ($C_7$-$C_{18}$) alkylaryl, and a ($C_1$-$C_{18}$) alkyl, and each group may be substituted with at least one of the following: a ($C_1$-$C_4$) alkyl, a ($C_1$-$C_4$) alkoxy, a ($C_7$-$C_{16}$) aryl, a ($C_7$-$C_{16}$) aralkyl, a nitrile, an amine, an NO$_2$, and a thioalkyl; and preferably substituted with at least one of the following: a ($C_1$-$C_4$) alkyl, a ($C_1$-$C_4$) alkoxy, a ($C_7$-$C_{16}$) aryl, and/or ($C_7$-$C_{16}$) aralkyl. R$^{29}$ is preferably a ($C_1$-$C_{16}$) alkyl, more preferably a ($C_1$-$C_{12}$) alkyl, even more preferably a ($C_1$-$C_8$) alkyl, and most preferably a ($C_1$-$C_5$) alkyl. In another embodiment, R$^{29}$ is a ($C_7$-$C_{25}$) alkylaryl, more preferably a ($C_7$-$C_{16}$) alkylaryl, most preferably a ($C_7$-$C_{12}$) alkylaryl;

q is the number 0 or 1; and r is the number 0 or 1; the sum of q and r (q+r) is the number 0 or 1; and the remaining free valences of the "four valent silicon atom," Si, are each linked to an alpha-modified polymer macromolecule;

ib3) a group according to Formula 2B:

Formula 2B, wherein, Si is a silicon atom, S is a sulfur atom, O is an oxygen atom, H is a hydrogen atom;

R$^{24}$ is selected from the group consisting of: hydrogen (H) and ($C_1$-$C_6$) alkyl;

R$^{25}$ is selected from the group consisting of: hydrogen (H), ($C_1$-$C_{68}$) alkyl, ($C_6$-$C_{18}$) aryl, and ($C_7$-$C_{18}$) aralkyl; and R$^{25}$ is preferably independently selected from ($C_1$-$C_{18}$) alkyl, ($C_6$-$C_{18}$) aryl, and ($C_7$-$C_{18}$) aralkyl; and R$^{25}$ is more preferably independently selected from ($C_1$-$C_{10}$) alkyl;

R$^{29}$ is a divalent group selected from the group consisting of: a di-($C_2$-$C_{20}$) alkylether (alkyl-O-alkyl), an ($C_6$-$C_{18}$) aryl, a ($C_7$-$C_{18}$) alkylaryl, and a ($C_1$-$C_{18}$) alkyl. Each R$^{29}$ group may be substituted with at least one substituent selected from the group consisting of: a ($C_1$-$C_4$) alkyl, a ($C_1$-$C_4$) alkoxy, a ($C_7$-$C_{16}$) aryl, a ($C_7$-$C_{16}$) aralkyl, a nitrile, an amine, a NO$_2$, and a thioalkyl, preferably substituted with at least one substituent selected from the group consisting of: a ($C_1$-$C_4$) alkyl, a ($C_1$-$C_4$) alkoxy, a ($C_7$-$C_{16}$) aryl, and a ($C_7$-$C_{16}$) aralkyl. In one embodiment, R$^{29}$ is a ($C_1$-$C_{16}$) alkyl, more preferably a ($C_1$-$C_{12}$) alkyl, even more preferably a ($C_1$-$C_8$) alkyl, and most preferably a ($C_1$-$C_5$) alkyl. In another embodiment, R$^{29}$ is a ($C_7$-$C_{25}$) alkylaryl, more preferably a ($C_7$-$C_{16}$) alkylaryl, most preferably a ($C_7$-$C_{12}$) alkylaryl;

q is the number 0 or 1; and r is the number 0 or 1; the sum of q and r (q+r) is the number 0 or 1; and the remaining free valences of the "four valent silicon atom," Si, are each linked to an alpha-modified polymer macromolecule.

ib4) a group according to Formula 2C:

Formula 2C, wherein, Si and Si' are silicon atoms, S is a sulfur atom, N is a nitrogen atom, and O is an oxygen atom;

R$^{30}$ is selected from the group consisting of: hydrogen (H) and ($C_1$-$C_6$) alkyl; R$^{31}$, R$^{32}$, R$^{33}$ and R$^{34}$ are the same or different, and are each independently selected from the group consisting of: hydrogen (H), ($C_1$-$C_{18}$) alkyl, ($C_1$-$C_{18}$) alkoxy, ($C_6$-$C_{18}$) aryl, and ($C_7$-$C_{18}$) aralkyl. R$^{31}$, R$^{32}$, R$^{33}$ and R$^{34}$ are each preferably independently selected from the group consisting of ($C_1$-$C_{18}$) alkyl, ($C_1$-$C_{18}$) alkoxy, ($C_6$-$C_{18}$) aryl, and ($C_7$-$C_{18}$) aralkyl; and R$^{31}$, R$^{32}$, R$^{33}$ and R$^{34}$ are each more preferably independently selected from ($C_1$-$C_5$) alkyl. In another embodiment, R$^{31}$, R$^{32}$, R$^{33}$ and R$^{34}$ are each independently a ($C_1$-$C_{16}$) alkyl, more preferably a ($C_1$-$C_{12}$) alkyl, even more preferably a ($C_1$-$C_8$) alkyl, and most preferably a ($C_1$-$C_4$) alkyl.

R$^{35}$ is a divalent group selected from the group consisting of: a di-($C_2$-$C_{20}$) alkylether (alkyl-O-alkyl), an ($C_6$-$C_{18}$) aryl, a $(C_7-C_{18})$ alkylaryl, and a $(C_1-C_{18})$ alkyl; and each $R^{35}$ group may be substituted with at least one substituent selected from the group consisting of: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and a thioalkyl; and preferably substituted with at least one substituent selected from the group consisting of: a $(C_1-C_4)$ alkyl, a $(C_1-C_4)$ alkoxy, a $(C_7-C_{16})$ aryl, and/or a $(C_7-C_{16})$ aralkyl. In one embodiment, $R^{35}$ is preferably a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{35}$ is a $(C_7-C_{25})$ alkylaryl, more preferably a $(C_7-C_{16})$ alkylaryl, most preferably a $(C_7-C_{12})$ alkylaryl;

s is the number 0 or 1; and t is the number 0 or 1; the sum of s and t, (s+t), is the number 0 or 1; u is the number 0, 1 or 2; v is the number 0, 1 or 2; and the sum of u and v, (u+v), is the number 2; and the remaining free valences of the "four valent silicon atom," Si, are each linked to an alpha-modified polymer macromolecule; and wherein the at least one linear modified polymer macromolecule further comprises at least one the following structures (iib1-iib2):

iib1) a sulfanylsilane compound moiety corresponding to Formula 4A:

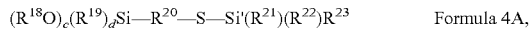

$$(R^{18}O)_c(R^{19})_dSi—R^{20}—S—Si'(R^{21})(R^{22})R^{23} \qquad \text{Formula 4A,}$$

wherein, Si and Si' are each a silicon atom, S is sulfur atom, O is oxygen atom;

$R^{18}$ is selected from the group consisting of: hydrogen (H) and $(C_1-C_6)$ alkyl;

$R^{19}$ is selected from the group consisting of: hydrogen (H), $(C_1-C_{18})$ alkyl, $(C_6-C_{18})$ aryl, and $(C_7-C_{18})$ aralkyl; and $R^{19}$ is preferably independently selected from the group consisting of $(C_1-C_{18})$ alkyl, $(C_6-C_{18})$ aryl, and $(C_7-C_{18})$ aralkyl; and $R^{19}$ is more preferably selected from $(C_1-C_{10})$ alkyl;

$R^{20}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl; and each $R^{20}$ group may be substituted with at least one substituent selected from the group consisting of: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and a thioalkyl; preferably substituted with at least one substituent selected from the group consisting of: a $(C_1-C_4)$ alkyl, a $(C_1-C_4)$ alkoxy, a $(C_7-C_{16})$ aryl, and/or a $(C_7-C_{16})$ aralkyl; and $R^{20}$ is preferably a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{20}$ is a $(C_7-C_{25})$ alkylaryl, more preferably a $(C_7-C_{16})$ alkylaryl, most preferably a $(C_7-C_{12})$ alkylaryl;

$R^{21}$, $R^{22}$ and $R^{23}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl; and $R^{21}$, $R^{22}$ and $R^{23}$ are each preferably independently a $(C_1-C_{16})$ alkyl, more preferably a $(C_1-C_{12})$ alkyl, even more preferably a $(C_1-C_8)$ alkyl, and most preferably a $(C_1-C_5)$ alkyl;

c is a number selected from 0, 1 and 2; d is a number selected from 0, 1, and 2; and the sum of c and d is the number 2 (c+d=2); and the remaining free valence of the "four valent silicon atom," Si, is linked to an alpha-modified polymer macromolecule.

a sulfanylsilane compound moiety corresponding to Formula 4B:

$$(R^{18}O)_c(R^{19})_dSi—R^{20}—S—H \qquad \text{Formula 4B,}$$

wherein, Si is a silicon atom, S is a sulfur atom, H is a hydrogen atom, O is an oxygen atom;

$R^{18}$ is selected from the group consisting of: hydrogen (H) and $(C_1-C_6)$ alkyl;

$R^{19}$ is selected from the group consisting of: hydrogen (H), $(C_1-C_{18})$ alkyl, $(C_6-C_{18})$ aryl, and $(C_7-C_{18})$ aralkyl; and $R^{19}$ is preferably independently selected from the group consisting of $(C_1-C_{18})$ alkyl, $(C_6-C_{18})$ aryl, and $(C_7-C_{18})$ aralkyl; and $R^{19}$ is more preferably selected from $(C_1-C_{10})$ alkyl;

$R^{20}$ is a divalent group selected from the group consisting of: a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl; and each $R^{20}$ group may be substituted with at least one substituent selected from the group consisting of: a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and a thioalkyl; and preferably substituted with at least one substituent selected from the group consisting of: a $(C_1-C_4)$ alkyl, a $(C_1-C_4)$ alkoxy, a $(C_7-C_{16})$ aryl, and a $(C_7-C_{16})$ aralkyl; and $R^{20}$ is preferably a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{20}$ is a $(C_7-C_{25})$ alkylaryl, more preferably a $(C_7-C_{16})$ alkylaryl, most preferably a $(C_7-C_{12})$ alkylaryl;

c is a number selected from 0, 1 and 2; d is a number selected from 0, 1, and 2; and the sum of c and d is the number 2 (c+d=2); and the remaining free valence of the "four valent silicon atom," Si, is linked to an alpha-modified polymer macromolecule.

In one embodiment the first composition further comprises an oil.

In one embodiment, the first composition further comprises a filler, and a vulcanization agent. In a further embodiment the first composition further comprises an oil.

The invention also provides a vulcanized polymer composition comprising the reaction product of at least the following: 1) a filler; 2) a vulcanization agent; and 3) the first composition as described herein.

The invention also provides a method for making a vulcanized polymer composition comprising reacting at least the following constituents: 1) a filler; 2) a vulcanization agent; and 3) the first composition as described herein.

A first composition may comprise a combination of two or more embodiments as described herein.

A vulcanized composition may comprise a combination of two or more embodiments as described herein.

The following embodiments apply to the above aspects of the invention.

In one embodiment, the branched modified polymer macromolecule (b1) and/or the linear modified polymer macromolecule (1) independently comprise at least one amine group selected from Formula 1D, Formula 1E, or Formula 1F, and where E is an oxygen atom (O), a sulfur atom (S), N—CHR$^8$—CR$^9$=CR$^{10}$, N—CHR$^8$—C=CHR$^{10}$, N—CR$^8$—CR$^9$=CHR$^{10}$, or N—CHR$^8$—CR$^9$=CHR$^{10}$. In a further embodiment, both the branched modified polymer macromolecule (b1) and the linear modified polymer macromolecule (a1) comprise the same type of amine group.

In one embodiment, the branched modified polymer macromolecule (b1) and/or the linear modified polymer macromolecule (a1) independently comprise at least one amine group selected from Formula 1A, Formula 1B, or Formula 1C, and where a is the number 2 and b is the number zero. In a further embodiment, both the branched modified polymer macromolecule (b1) and the linear modified polymer macromolecule (a1) comprise the same type of amine group.

In one embodiment, the branched modified polymer macromolecule (b1) and/or the linear modified polymer macromolecule (a1) independently comprise at least one amine group selected from Formula 1A, Formula 1B, Formula 1C, Formula 1D, Formula 1E, or Formula 1F; and the branched modified polymer macromolecule (b1) comprises a group selected from Formula 2A, where $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_5)$ alkyl. In a further embodiment, both the branched modified polymer macromolecule (b1) and the linear modified polymer macromolecule (a1) comprise the same type of amine group.

In one embodiment, the branched modified polymer macromolecule (b1) and/or the linear modified polymer macromolecule (a1) independently comprise at least one amine group selected from Formula 1D, Formula 1E, or Formula 1F, and where E is an oxygen atom (O), a sulfur atom (S), N—CHR$^8$—CR$^9$=CR$^{10}$, N—CHR$^8$—C=CHR$^{10}$, N—CR$^8$—CR$^9$=CHR$^{10}$, or N—CHR$^8$—CR$^9$=CHR$^{10}$. In a further embodiment, the branched modified polymer macromolecule (b1) comprises a group selected from Formula 2A, where $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_5)$ alkyl. In a further embodiment, both the branched modified polymer macromolecule (b1) and the linear modified polymer macromolecule (a1) comprise the same type of amine group.

In one embodiment, the branched modified polymer macromolecule (b1) and/or the linear modified polymer macromolecule (a1) independently comprise at least one amine group selected from Formula 1A, Formula 1B, or Formula 1C, and where a is the number 2 and b is the number zero. In a further embodiment, the branched modified polymer macromolecule (b1) comprises a group selected from Formula 2A, where $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_5)$ alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, Formula 1C, Formula 1D, Formula 1E, or Formula 1F; and the branched modified polymer macromolecule (b1) comprises a group selected Formula 2A, where $R^{29}$ is a divalent group selected from the group consisting of: an $(C_6-C_{18})$ aryl, a $(C_7-C_{18})$ alkylaryl, and a $(C_1-C_{18})$ alkyl; and each $R^{29}$ group may be substituted with one of the following: $(C_1-C_4)$ alkyl, $(C_1-C_4)$ alkoxy, $(C_7-C_{16})$ aryl, and/or $(C_7-C_{16})$ aralkyl; and $R^{29}$ is preferably a $(C_1-C_5)$ alkyl. In a further embodiment $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_5)$ alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1D, Formula 1E, or Formula 1F, and where E is an oxygen atom (O), a sulfur atom (S), N—CHR$^8$—CR$^9$=CR$^{10}$, N—CHR$^8$—C=CHR$^{10}$, N—CR$^8$—CR$^9$=CHR$^{10}$, or N—CHR$^8$—CR$^9$=CHR$^{10}$. In a further embodiment, the branched modified polymer macromolecule (b) comprises a group selected Formula 2A, where $R^{29}$ is a divalent group selected from the group consisting of: an $(C_6-C_{18})$ aryl, a $(C_7-C_{18})$ alkylaryl, and a $(C_1-C_{18})$ alkyl; and each $R^{29}$ group may be substituted with a substituent selected from the group consisting of: $(C_1-C_4)$ alkyl, $(C_1-C_4)$, alkoxy, $(C_7-C_{16})$ aryl, and/or $(C_7-C_{16})$ aralkyl; and $R^{29}$ is preferably a $(C_1-C_5)$ alkyl. In a further embodiment $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_4)$ alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, or Formula 1C, and where a is the number 2 and b is the number zero. In a further embodiment, the branched modified polymer macromolecule (b1) comprises a group selected Formula 2A, where $R^{29}$ is a divalent group selected from the group consisting of: an $(C_6-C_{18})$ aryl, a $(C_7-C_{18})$ alkylaryl, and a $(C_1-C_{18})$ alkyl; and each $R^{29}$ group may be substituted with a substituent selected from the group consisting of: $(C_1-C_4)$ alkyl, $(C_1-C_4)$ alkoxy, $(C_7-C_{16})$ aryl, and/or $(C_7-C_{16})$ aralkyl; and $R^{29}$ is preferably a $(C_1-C_5)$ alkyl. In a further embodiment $R^{24}$ is a $(C_1-C_6)$ alkyl; $R^{25}$, $R^{26}$, $R^{27}$ and $R^{28}$ are the same or different, and are each independently selected from the group consisting of: $(C_1-C_{18})$ alkyl, $(C_6-C_{18})$ aryl, and $(C_7-C_{18})$ aralkyl; and $R^{25}$, $R^{26}$, $R^{27}$ and $R^{28}$ are each preferably independently selected from $(C_1-C_5)$ alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, Formula 1C, Formula 1D, Formula 1E, or Formula 1F; and the branched modified polymer macromolecule (b1) comprises a group selected from Formula 2B, where $R^{29}$ is a divalent group, selected from the group consisting of: an $(C_6-C_{18})$ aryl, a $(C_7-C_{18})$ alkylaryl, and a $(C_1-C_{18})$ alkyl; and each $R^{29}$ group may be substituted with one substituent selected from the group consisting of: $(C_1-C_4)$ alkyl, alkoxy $(C_7-C_{16})$, $(C_7-C_{16})$ aryl, and/or $(C_7-C_{16})$ aralkyl; and $R^{29}$ is preferably a $(C_1-C_5)$ alkyl. In a further embodiment, $R^{24}$ is a $(C_1-C_6)$ alkyl; $R^{25}$ is selected from the group consisting of: $(C_1-C_{18})$ alkyl, $(C_6-C_{18})$ aryl, and $(C_7-C_{18})$ aralkyl; and $R^{25}$ is preferably selected from $(C_1-C_5)$ alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1D, Formula 1E, or Formula 1F, and where E is an oxygen atom (O), a sulfur atom (S), N—CHR$^8$—CR$^9$=CR$^9$=CR$^{10}$, N—CHR$^8$—C=CHR$^{10}$, N—CR$^8$—CR$^9$=CHR$^{10}$ or N—CHR$^8$—CR$^9$=CHR$^{10}$. In a further embodiment, the branched modified polymer macromolecule (b1) comprises a group selected from Formula 2B, where $R^{29}$ is a divalent group, selected from the group consisting of: an ($C_6$-$C_{18}$) aryl, a ($C_7$-$C_{18}$) alkylaryl, and a ($C_1$-$C_{18}$) alkyl; and each $R^{29}$ group may be substituted with one substituent selected from the group consisting of: ($C_1$-$C_4$) alkyl, ($C_7$-$C_{16}$) alkoxy, ($C_7$-$C_{16}$) aryl, and/or ($C_7$-$C_{16}$) aralkyl; and $R^{29}$ is preferably a ($C_1$-$C_5$) alkyl. In a further embodiment, $R^{24}$ is a ($C_1$-$C_6$) alkyl; $R^{25}$ is selected from the group consisting of: ($C_1$-$C_{18}$) alkyl, ($C_6$-$C_{18}$) aryl, and ($C_7$-$C_{18}$) aralkyl; and $R^{25}$ is preferably selected from ($C_1$-$C_5$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, or Formula 1C, and where a is the number 2 and b is the number zero. In a further embodiment, the branched modified polymer macromolecule (b1) comprises a group selected from Formula 2B, where $R^{29}$ is a divalent group, selected from the group consisting of: an ($C_6$-$C_{18}$) aryl, a ($C_7$-$C_{18}$) alkylaryl, and a ($C_1$-$C_{18}$) alkyl; and each $R^{29}$ group may be substituted with one substituent selected from the group consisting of: ($C_1$-$C_4$) alkyl, alkoxy ($C_7$-$C_{16}$), ($C_7$-$C_{16}$) aryl, and ($C_7$-$C_{16}$) aralkyl; and $R^{29}$ is preferably a ($C_1$-$C_5$) alkyl. In a further embodiment $R^{24}$ is a ($C_1$-$C_6$) alkyl; $R^{25}$ is selected from the group consisting of: ($C_1$-$C_{18}$) alkyl, ($C_6$-$C_{18}$) aryl, and ($C_7$-$C_{18}$) aralkyl; and $R^{25}$ is preferably selected from ($C_1$-$C_8$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, Formula 1C, Formula 1D, Formula 1E, or Formula 1F; and the linear modified polymer macromolecule (1) comprises a group selected from a sulfanylsilane compound moiety corresponding to Formula 4A or Formula 4B. In a further embodiment, $R^{21}$, $R^{22}$ and $R^{23}$ are the same or different, and are each independently selected from the group consisting of: ($C_1$-$C_{18}$) alkyl, ($C_6$-$C_{18}$) aryl, and ($C_7$-$C_{18}$) aralkyl; and $R^{21}$, $R^{22}$ and $R^{23}$ are each preferably independently selected from ($C_1$-$C_5$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1D, Formula 1E, or Formula 1F, and where E is an oxygen atom (O), a sulfur atom (S), N—$CHR^8$—$CR^9$=$CR^{10}$, N—$CHR^8$—$CR^9$=$CHR^{10}$, N—$CR^8$—$CR^9$=$CHR^{10}$ or N—$CHR^8$—$CR^9$=$CHR^{10}$. In a further embodiment, the linear modified polymer macromolecule (1) comprises a group selected from a sulfanylsilane compound moiety corresponding to Formula 4A or Formula 4B. In a further embodiment, $R^{21}$, $R^{22}$ and $R^{23}$ are the same or different, and are each independently selected from the group consisting of: ($C_1$-$C_{18}$) alkyl, ($C_6$-$C_{18}$) aryl, and ($C_7$-$C_{18}$) aralkyl; and $R^{21}$, $R^{22}$ and $R^{23}$ are each preferably independently selected from ($C_1$-$C_5$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, or Formula 1C, and where a is the number 2 and b is the number zero. In a further embodiment, the linear modified polymer macromolecule (a1) comprises a group selected from a sulfanylsilane compound moiety corresponding to Formula 4A or Formula 4B. In a further embodiment, $R^{21}$, $R^{22}$ and $R^{23}$ are the same or different, and are each independently selected from the group consisting of: ($C_1$-$C_{18}$) alkyl, ($C_6$-$C_{18}$) aryl, and ($C_7$-$C_{18}$) aralkyl; and $R^{21}$, $R^{22}$ and $R^{23}$ are each preferably independently selected from ($C_1$-$C_5$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, or Formula 1C, and where a is the number 2 and b is the number zero. In a further embodiment, the linear modified polymer macromolecule (a1) comprises a group selected from a sulfanylsilane compound moiety corresponding to Formula 4A. In a further embodiment, $R^{21}$, $R^{22}$ and $R^{23}$ are the same or different, and are each independently selected from the group consisting of: ($C_1$-$C_{18}$) alkyl, ($C_6$-$C_{18}$) aryl, and ($C_7$-$C_{18}$) aralkyl; and $R^{21}$, $R^{22}$ and $R^{23}$ are each preferably independently selected from ($C_1$-$C_5$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, Formula 1C, Formula 1D, Formula 1E, or Formula 1F; and the linear modified polymer macromolecule (1) comprises a group selected a sulfanylsilane compound moiety corresponding to Formula 4B. In a further embodiment, $R^{20}$ is an ($C_6$-$C_{18}$) aryl, a ($C_7$-$C_{18}$) alkylaryl, or a ($C_1$-$C_{18}$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1D, Formula 1E, or Formula 1F, and where E is an oxygen atom (O), a sulfur atom (S), N—$CHR^8$—$CR^9$=$CR^{10}$, N—$CHR^8$—C=$CHR^{10}$ or N—$CR^8$—$CR^9$=$CHR^{10}$, N—CHR—$CR^9$=$CHR^{10}$. In a further embodiment, the linear modified polymer macromolecule comprises a group selected a sulfanylsilane compound moiety corresponding to Formula 4B. In a further embodiment, $R^{20}$ is an ($C_6$-$C_{18}$) aryl, a ($C_7$-$C_{18}$) alkylaryl, or a ($C_1$-$C_{18}$) alkyl. In a further embodiment, both the branched modified polymer macromolecule (b1) and the linear modified polymer macromolecule (1) comprise the same type of amine group.

In one embodiment, the branched modified polymer macromolecule (b1) and/or the linear modified polymer macromolecule (1) independently comprise at least one amine group selected from Formula 1A, Formula 1B, or Formula 1C, and where a is the number 2 and b is the number zero. In a further embodiment, the linear modified polymer macromolecule comprises a group selected a sulfanylsilane compound moiety corresponding to Formula 4B. In a further embodiment, $R^{20}$ is an ($C_6$-$C_{18}$) aryl, a ($C_7$-$C_{18}$) alkylaryl, or a ($C_1$-$C_{18}$) alkyl. In a further embodiment, both the branched modified polymer macromolecule (b1) and the linear modified polymer macromolecule (1) comprise the same type of amine group.

The following embodiments apply to all applicable aspects and embodiments described herein.

In one embodiment, the modified polymer is selected from the group consisting of modified styrene-butadiene copolymers, modified polybutadiene, modified butadiene-isoprene copolymers, modified polyisoprene and modified butadiene-styrene-isoprene terpolymers.

In one embodiment, an inventive composition further comprises at least one polymer selected from the group consisting of styrene-butadiene copolymers, including but not limited to solution styrene-butadiene rubber (SSBR) and emulsion styrene-butadiene rubber (ESBR); polybutadiene, including polybutadiene with a 1,4-cis-polybutadiene concentration ranging from 90 to 99 percent, from 30 to 70 percent, and from 2 to 25 percent; butadiene-isoprene copolymers; polyisoprene; butadiene-styrene-isoprene terpolymers; and combinations thereof.

An inventive composition may comprise a combination of two or more embodiments as described herein.

The invention also provides an article comprising at least one component formed from an inventive composition. In one embodiment, the article is a tire.

An inventive article may comprise a combination of two or more embodiments as described herein.

Amine Polymerization Initiator Compounds

The amine polymerization initiator compound includes a tertiary amine group, and is selected from at least one compound as represented by Formula 1G to Formula 1L:

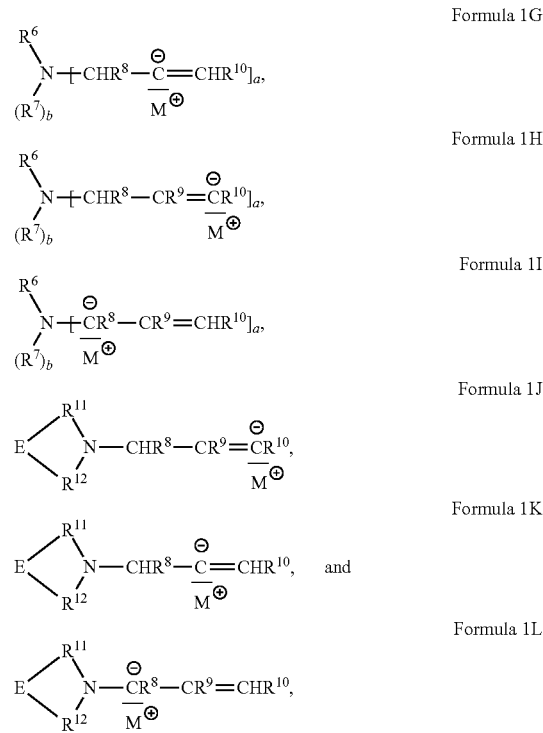

where M is lithium, sodium or potassium, N is a nitrogen atom, C is carbon atom, H is a hydrogen atom;

E is ($C_1$-$C_{18}$) alkyl, ($C_6$-$C_{18}$) aryl, ($C_7$-$C_{18}$) aralkyl, an oxygen atom (O), a sulfur atom (S), N—$CHR^8$—$CR^9$=C(M)$R^{10}$, N—$CHR^8$—C(M)=$CHR^{10}$, N—C(M)$R^8$—$CR^9$=$CHR^{10}$, or N—$CHR^8$—$CR^9$=$CHR^{10}$;

$R^6$ is selected from the group consisting of: hydrogen (H), ($C_1$-$C_{18}$) alkyl, ($C_6$-$C_{18}$) aryl, ($C_7$-$C_{18}$) aralkyl, and —$SiR^{36}R^{37}R^{38}$, where $R^{36}$, $R^{37}$ and $R^{38}$ are each independently selected from the group consisting of: ($C_1$-$C_{18}$) alkyl, ($C_6$-$C_{18}$) aryl, and ($C_7$-$C_{18}$) aralkyl; $R^{36}$, $R^{37}$ and $R^{38}$ are each preferably independently selected from ($C_1$-$C_5$) alkyl; and $R^6$ is preferably ($C_6$-$C_{10}$) aryl or —$SiR^{36}R^{37}R^{38}$;

$R^7$ is selected from the group consisting of: hydrogen (H), ($C_1$-$C_{18}$) alkyl, ($C_6$-$C_{18}$) aryl, ($C_7$-$C_{18}$) aralkyl, —$CHR^8$—$CR^9$=$CHR^{10}$, and —$SiR^{36}R^{37}R^{38}$; where $R^{36}$, $R^{37}$ and $R^{38}$ are each independently selected from the group consisting of: ($C_1$-$C_{18}$) alkyl, ($C_6$-$C_{18}$) aryl, and ($C_7$-$C_{18}$) aralkyl; $R^{36}$, $R^{37}$ and $R^{38}$ are each preferably independently selected from ($C_1$-$C_5$) alkyl; and $R^7$ is preferably ($C_6$-$C_{10}$) aryl, —$CHR^8$—$CR^9$=C(M)$R^{10}$, —$CHR^8$—C(M)=$CHR^{10}$, —C(M)$R^8$—$CR^9$=$CHR^{10}$, —$CHR^8$—$CR^9$=$CHR^{10}$, or —$SiR^{36}R^{37}R^{38}$, and $R^8$, $R^9$, $R^{10}$, $R^{11}$ and $R^{12}$ are each independently selected from the group consisting of: ($C_1$-$C_{18}$) alkyl, ($C_6$-$C_{18}$) aryl, and ($C_7$-$C_{18}$) aralkyl; and $R^8$, $R^9$, $R^{10}$, $R^{11}$ and $R^{12}$ are each preferably independently selected from ($C_1$-$C_5$) alkyl;

a is the number 1 or 2; and b is the number zero or one; and the Formula 1G to Formula 1L may include the Lewis base adducts, particularly Lewis base molecules attached to the alkali metal cation, which are not shown.

In one embodiment the amine polymerization initiator compound includes a tertiary amine group comprising compound, as represented by Formula 1G to Formula 1L: where M is lithium, N is a nitrogen atom, C is carbon atom, H is a hydrogen atom; E is an oxygen atom (O), a sulfur atom (S), N—CHR⁸—CR⁹═C(M)R¹⁰, N—CHR⁸—C(M)═CHR¹⁰, N—C(M)R⁸—CR⁹═CHR¹⁰, or N—CHR⁸—CR⁹═CHR¹⁰.

In one embodiment, in reference to Formulas 1G to 1I, a is the number 2, and b is the number zero.

In one embodiment, in reference to Formulas 1J to 1L, E is an oxygen atom (O).

In another embodiment, E is a sulfur atom (S).

In another embodiment, E is N—CHR⁸—CR⁹═C(M)R¹⁰, N—CHR⁸—C(M)═CHR¹⁰, N—C(M)R⁸—CR⁹═CHR¹⁰, or N—CHR⁸—CR⁹═CHR¹⁰.

An amine initiator compound may comprise a combination of two or more embodiments as described herein.

Amine comprising hydrocarbyl alkali compounds, assigned herein to as "amine polymerization initiator compounds," are used according to the invention, to start the polymerization of conjugated diene, triene, and monovinyl aliphatic and aromatic monomers, and other monomers in the course of an anionic solution polymerization reaction.

The amine polymerization initiator compounds are made from the corresponding protonated amine polymerization initiator precursor compounds, as represented by Formula 1M or to Formula 1L:

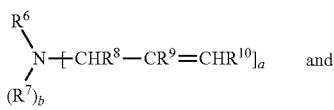

Formula 1M and

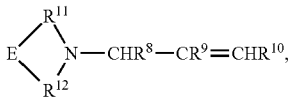

Formula 1L where M is lithium, sodium or potassium, N is a nitrogen atom, C is carbon atom, H is a hydrogen atom;

E is $(C_1-C_{18})$ alkyl, $(C_6-C_{18})$ aryl, $(C_7-C_{18})$ aralkyl, an oxygen atom (O), a sulfur atom (S), N—CHR⁸—CR⁹═CHR¹⁰;

$R^6$ is selected from the group consisting of: hydrogen (H), $(C_1-C_{18})$ alkyl, $(C_6-C_{18})$ aryl, $(C_7-C_{18})$ aralkyl, and —SiR³⁶R³⁷R³⁸ where $R^{36}$, $R^{37}$ and $R^{38}$ are each independently selected from the group consisting of: $(C_1-C_{18})$ alkyl, $(C_6-C_{18})$ aryl, and $(C_7-C_{18})$ aralkyl; and $R^{36}$, $R^{37}$ and $R^{38}$ are each preferably independently selected from $(C_1-C_5)$ alkyl; and $R^6$ is preferably $(C_6-C_{10})$ aryl or —SiR³⁶R³⁷R³⁸;

$R^7$ is selected from the group consisting of: hydrogen (H), $(C_1-C_{18})$ alkyl, $(C_6-C_{18})$ aryl, $(C_7-C_{18})$ aralkyl, —CHR⁸—CR⁹═CHR¹⁰, and —SiR³⁶R³⁷R³⁸; where $R^{36}$, $R^{37}$ and $R^{38}$ are each independently selected from the group consisting of: $(C_1-C_{18})$ alkyl, $(C_6-C_{18})$ aryl, and $(C_7-C_{18})$ aralkyl; and $R^{36}$, $R^{37}$ and $R^{38}$ are each preferably independently selected from $(C_1-C_5)$ alkyl; and $R^7$ is preferably $(C_6-C_{10})$ aryl or —SiR³⁶R³⁷R³⁸;

$R^8$, $R^9$, $R^{10}$, $R^{11}$ and $R^{12}$ are each independently selected from the group consisting of: —$(C_1-C_{18})$ alkyl, $(C_6-C_{18})$ aryl, and $(C_7-C_{18})$ aralkyl; and $R^8$, $R^9$, $R^{10}$, $R^{11}$ and $R^{12}$ are each preferably independently selected from $(C_1-C_5)$ alkyl; and a is the number 1 or 2; and b is the number zero or one.

The amine polymerization initiator compounds result when the amine polymerization initiator precursor compounds are contacted with a strong Lewis base, including hydrocarbyl alkali compounds or alkali hydrides, preferably hydrocarbyl lithium compounds, lithium hydride, sodium hydride or potassium hydride, even more preferably alkyl lithium compounds, lithium hydride or sodium hydride, and even more preferably n-butyl lithium, sec-butyl lithium or tert-butyl lithium, lithium hydride or sodium hydride in a solvent.

The preparation of each amine polymerization initiator compound, by using the corresponding hydrocarbyl alkali compound, was preferably performed in a nonpolar solvent, for a period ranging from 5 seconds to 48 hours, preferably from 5 seconds to 10 hours, even more preferably from 10 seconds to 5 hours, at a temperature ranging from −80° C. to 130° C., preferably from −10° C. to 100° C., and even more preferably from 20° C. to 80° C., using an "amine polymerization initiator precursor compound" to "Lewis base" stoichiometric ratio from 0.1 to 10, preferably from 0.4 to 5, and even more preferably from 0.8 to 1.3.

The preparation of each amine polymerization initiator compound, by using the corresponding alkali hydride compound, was preferably performed in a dipolar aprotic solvent, for a period ranging from 5 minutes to 48 hours, preferably from 10 minutes to 36 hours, even more preferably from 20 minutes to 24 hours, at a temperature ranging from 0° C. to 130° C. preferably from 10° C. to 80° C., and even more preferably from 20° C. to 60° C., using an "amine polymerization initiator precursor compound" to "Lewis base" stoichiometric ratio from 1 to 10, preferably from 1 to 5, and even more preferably from 1 to 2.

Useful amine polymerization initiator precursor compounds include the following:

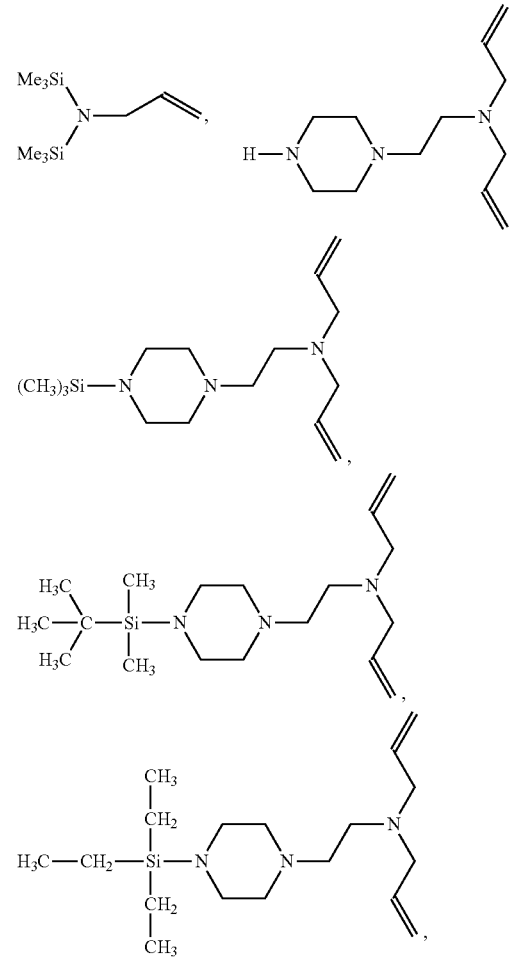

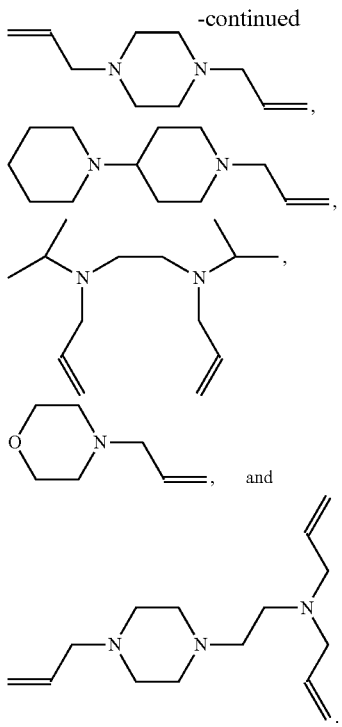

In a preferred embodiment, the amine polymerization initiator compounds (described herein) are reacted first with monomers to form the living polymers (an alpha-modified living polymer macromolecules) The living polymers are then reacted with coupling agents (as described herein) to form branched modified polymer macromolecules, and the composition containing the branched modified polymer macromolecules and alpha-modified living polymer macromolecules is then reacted with the chain-end modifier compounds to form) the first polymer composition.

In one embodiment, the amine polymerization initiator compound is the compound of Formula 1G, 1H or 1I. In another embodiment, the amine polymerization initiator compound is the compound of Formula 1J, 1K or 1L.

In one embodiment, the coupling modifier agent is $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si-SiCl_3$, $Cl_3Si-O-SiCl_3$, $Cl_3Sn-SnCl_3$, $Cl_3Sn-O-SnCl_3$. Examples of tin and silicon alkoxides coupling agents include: $Sn(OMe)_4$, $Si(OMe)_4$, $Sn(OEt)_4$ or $Si(OEt)_4$.

In another embodiment, the coupling modifier agent is the compound of Formula 2A (as described below).

In another embodiment, the coupling modifier agent is the compound of Formula 2C (as described below). In a further embodiment, the chain end-modifier compound is the compound of Formula 4C (as described below).

Coupling Modifier Agents

Coupling modifier agents according to ib1 include tin tetrachloride, tin tetrabromide, tin tetrafluoride, tin tetraiodide, silicon tetrachloride, silicon tetrabromide, silicon tetrafluoride, silicon tetraiodide, alkyl tin and alkyl silicon trihalides or diaklyl tin and dialkyl silicon dihalides can also be used. Polymers coupled with tin or silicon tetrahalides have a maximum of four arms, polymer coupled with alkyl tin and alkyl silicon trihalides have a maximum of three arms and polymer coupled with dialkyl tin and dialkyl silicon dihalides have a maximum of two arms. Hexahalo disilanes or hexahalo disiloxanes can also be used as coupling agents resulting in polymers with a maximum of six arms. Useful tin and silicon halides coupling agents include: $SnCl_4$, $(R_1)_2SnCl_2$, $R_1SnCl_3$, $SiCl_4$, $(R_1)_2SiCl_2$, $R_1SiCl_3$, $Cl_3Si-SiCl_3$, $Cl_3Si-O-SiCl_3$, $Cl_3Sn-SnCl_3$, $Cl_3Sn-O-SnCl_3$ wherein $R_1$ is a hydrocarbyl group, preferably an alkyl group. Examples of tin and silicon alkoxides coupling agents further include: $Sn(OMe)_4$, $Si(OMe)_4$, $Sn(OEt)_4$ or $Si(OEt)_4$. The most preferred coupling agents are: $SnCl_4$, $SiCl_4$, $Sn(OMe)_4$ and $Si(OMe)_4$.

The coupling modifier agents according to ib2 to ib4 include the subject compounds described herein with reference to Formulas 2A and 2C below. The term "branched modified polymer macromolecule (or alpha-modified/branched modified polymer macromolecule)" is intended to mean the reaction product of two or more living polymer chains (or alpha-modified living polymer macromolecules) with a subject coupling modifier agent.

The modified coupling agent includes a sulfanylsilane modifier compounds as represented by Formula 2A and Formula 2C:

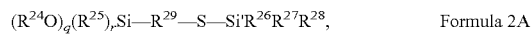  Formula 2A

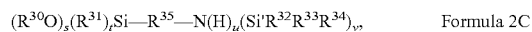  Formula 2C wherein Si and Si' are silicon atoms, S is a sulfur atom, N is a nitrogen atom, O is an oxygen atom, and H is a hydrogen atom;

$R^{24}$ and $R^{30}$ are each independently selected from the group consisting of: hydrogen (H), and $(C_1-C_6)$ alkyl;

$R^{25}$, $R^{26}$, $R^{27}$, $R^{28}$, $R^{31}$, $R^{32}$, $R^{33}$ and $R^{34}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl; and $R^{25}$, $R^{26}$, $R^{27}$, $R^{28}$, $R^{31}$, $R^{32}$, $R^{33}$ and $R^{34}$ are each preferably independently selected from $(C_1-C_5)$ alkyl. In another embodiment, $R^{25}$, $R^{26}$, $R^{27}$, $R^{28}$, $R^{31}$, $R^{32}$, $R^{33}$ and $R^{34}$ are each independently a $(C_1-C_{16})$ alkyl, more preferably a $(C_1-C_{12})$ alkyl, even more preferably a $(C_1-C_8)$ alkyl, and most preferably a $(C_1-C_4)$ alkyl.

$R^{29}$ and $R^{35}$ are each independently divalent groups selected from the group consisting of: a di-$(C_2-C_{20})$alkylether (alkyl-O-alkyl), an $(C_6-C_{18})$ aryl, a $(C_7-C_{18})$ alkylaryl, and a $(C_1-C_{18})$ alkyl; and each $R^{29}$ or $R^{35}$ group may be substituted with at least one substituent selected from the group consisting of: $(C_1-C_4)$ alkyl, $(C_1-C_4)$ alkoxy, $(C_7-C_{16})$ aryl, $(C_7-C_{16})$ aralkyl, amine, and thioalkyl. Preferably $R^{29}$ and $R^{35}$ are each independently a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{29}$ and $R^{35}$ are each independently a $(C_7-C_{25})$ alkylaryl, more preferably a $(C_7-C_{16})$ alkylaryl, and most preferably a $(C_7-C_{12})$ alkylaryl;

q and s are independently the number 2 or 3; and r and u are independently the number 0 or 1; the sum of q and r (or q+r) and the sum of u and v (or u+v) are each the number 3.

While not shown in Formula 2A or Formula 2C, it will be understood that the subject Compounds may include their corresponding Lewis base adducts (for example, with solvent molecules from tetrahydrofuran, diethylether, or dimethoxyethane, and coordinated with silicon atoms).

In one embodiment, $R^{26}$, $R^{27}$, $R^{28}$, $R^{32}$, $R^{33}$ and $R^{34}$ are the same or different, and are each independently hydrogen (H) or $(C_1-C_{16})$ alkyl; and the alkyl especially includes Me, Et, Pr (isomers) and Bu (isomers).

In one embodiment, $R^{29}$ and $R^{35}$ are the same or different, and are each independently a $(C_1-C_{16})$ divalent alkyl group, or a ($C_1$-$C_{16}$) divalent aralkyl group; and divalent alkyl groups especially includes divalent $CH_2$, $C_2H_4$, $C_3H_6$ and $C_4H_8$ groups.

In one embodiment, $R^{29}$ and $R^{35}$ are each independently an alkylene. In a further embodiment, the alkylene is selected from —$CH_2$— (methylene), —$(CH_2)_2$— (ethylidene), —$(CH_2)_3$— (propylidene) or —$(CH_2)_4$— (butylidene).

In one embodiment, $R^{29}$ and $R^{35}$ are each independently a divalent aralkylene. In a further embodiment, the aralkylene is selected from —$CH_2$—$C_6H_4$—$CH_2$— (xylidene) or —$C_6H_4$—$C(CH_3)_2$—$C_6H_4$—.

In one embodiment, $R^{24}$, $R^{25}$, $R^{26}$, $R^{27}$, $R^{28}$, $R^{30}$, $R^{31}$, $R^{32}$, $R^{33}$ and $R^{34}$ are each independently an alkyl. In a further embodiment, the alkyl is selected from $CH_3$— (methyl), $CH_3$—$CH_2$— (ethyl), $CH_3$—$(CH_2)_2$— (propyl), $(CH_3)_2$CH— (iso-propyl), $CH_3$—$(CH_2)_3$— (n-butyl), $(CH_3)_2CH$—$CH_2$— (sec-butyl), or $CH_3$—$C(CH_3)_2$— (tert-butyl).

In one embodiment, for each Formula 2A and Formula 2C, $R^{24}$ and $R^{30}$ are each independently a ($C_1$-$C_4$) alkyl, and preferably methyl, ethyl, a propyl isomer, or a butyl isomer.

In one embodiment, for each Formula 2A and Formula 2C, $R^{26}$, $R^{27}$, $R^{28}$, $R^{32}$, $R^{33}$ and $R^{34}$ are each independently selected from the group consisting of a linear ($C_1$-$C_6$) alkyl, a cyclic ($C_6$-$C_{12}$) alkyl, and a ($C_6$-$C_{15}$) aryl.

In one embodiment, for each Formula 2A and Formula 2C, $R^{29}$ and $R^{35}$ are each independently selected from the group consisting of a linear ($C_1$-$C_{10}$) alkyl (divalent), a cyclic ($C_6$-$C_{12}$) alkyl (divalent), a ($C_6$-$C_{15}$) aryl (divalent), and a ($C_7$-$C_{12}$) alkylaryl (divalent).

Each compound, Formula 2A and Formula 2C, may comprise a combination of two or more embodiments as described herein.

The coupling modifier agents are represented preferably according to ib2 to ib4 and even more preferably to Formulas 2A and 2C.

In one embodiment, the modified coupling agent is a sulfanylsilane modifier compound, as represented by the Formula 2A, as described above:

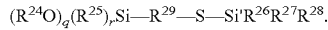

$(R^{24}O)_q(R^{25})_r$Si—$R^{29}$—S—Si'$R^{26}R^{27}R^{28}$.

In one embodiment, $R^{29}$ is a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each $R^{29}$ group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or thioalkyl.

In one embodiment, r is the number 0, and $R^{24}$, $R^{26}$, $R^{27}$ and $R^{28}$ are the same or different, and are each independently hydrogen (H), ($C_1$-$C_{16}$) alkyl, or ($C_1$-$C_{16}$) trialkylsilyl; and alkyl especially includes Me, Et, Pr (isomers) and Bu (isomers).

In one embodiment, $R^{29}$ is a ($C_1$-$C_{16}$) divalent alkyl group, or a ($C_1$-$C_{16}$) divalent aralkyl group; and divalent alkyl groups especially includes divalent $CH_2$, $C_2H_4$, $C_3H_6$ and $C_4H_8$ groups.

In one embodiment, $R^{29}$ is an alkylene. In a further embodiment, the alkylene is selected from —$CH_2$— (methylene), —$(CH_2)_2$— (ethylidene), —$(CH_2)_3$— (propylidene) or —$(CH_2)_4$— (butylidene).

In one embodiment, $R^{29}$ is a divalent aralkylene group. In a further embodiment, the aralkylene group is selected from —$CH_2$—$C_6H_4$—$CH_2$— (xylidene) or —$C_6H_4$—$C(CH_3)_2$—$C_6H_4$—.

In one embodiment, r is the number 0, and $R^{24}$, $R^{26}$, $R^{27}$ and $R^{28}$ are each independently an alkyl. In a further embodiment, the alkyl is selected from $CH_3$— (methyl), $CH_3$—$CH_2$— (ethyl), $CH_3$—$(CH_2)_2$— (propyl), $(CH_3)_2$CH— (iso-propyl), $CH_3$—$(CH_2)_3$— (n-butyl), $(CH_3)_2CH$—$CH_2$— (sec-butyl), or $CH_3$—$C(CH_3)_2$— (tert-butyl).

In one embodiment, r is the number 0, and $R^{24}$ is a ($C_1$-$C_4$) alkyl, and preferably methyl, ethyl, propyl isomer, or a butyl isomer.

In one embodiment, $R^{26}$, $R^{27}$ and $R^{28}$ are each independently selected from the group consisting of a linear ($C_1$-$C_6$) alkyl, a cyclic ($C_6$-$C_{12}$) alkyl, and a ($C_6$-$C_{15}$) aryl.

In one embodiment, $R^{29}$ is selected from the group consisting of a linear ($C_1$-$C_{10}$) alkyl (divalent), a cyclic ($C_6$-$C_{12}$ alkyl) (divalent), a ($C_6$-$C_{15}$) aryl (divalent), and a ($C_7$-$C_{12}$) alkylaryl (divalent).

Formula 2A may comprise a combination of two or more embodiments as described herein.

Useful modified coupling agents according to Formula 2A include the following: $(MeO)_3Si$—$(CH_2)_3$—S—$SiMe_3$, $(EtO)_3Si$—$(CH_2)_3$—S—$SiMe_3$, $(PrO)_3Si$—$(CH_2)_3$—S—$SiMe_3$, $(BuO)_3Si$—$(CH_2)_3$—S—$SiMe_3$, $(MeO)_3Si$—$(CH_2)_2$—S—$SiMe_3$, $(EtO)_3Si$—$(CH_2)_2$—S—$SiMe_3$, $(PrO)_3Si$—$(CH_2)_2$—S—$SiMe_3$, $(BuO)_3Si$—$(CH_2)_2$—S—$SiMe_3$, $(MeO)_3Si$—$CH_2$—S—$SiMe_3$, $(EtO)_3Si$—$CH_2$—S—$SiMe_3$, $(PrO)_3Si$—$CH_2$—S—$SiMe_3$, $(BuO)_3Si$—$CH_2$—S—$SiMe_3$, $(MeO)_3Si$—$CH_2$—$CMe_2$-$CH_2$—S—$SiMe_3$, $(EtO)_3Si$—$CH_2$—$CMe_2$-$CH_2$—S—$SiMe_3$, $(PrO)_3Si$—$CH_2$—$CMe_2$-$CH_2$—S—$SiMe_3$, $(BuO)_3Si$—$CH_2$—$CMe_2$-$CH_2$—S—$SiMe_3$, $((MeO)_3Si$—$CH_2$—$C(H)Me$-$CH_2$—S—$SiMe_3$, $(EtO)_3Si$—$CH_2$—$C(H)Me$-$CH_2$—S—$SiMe_3$, $(PrO)_3Si$—$CH_2$—$C(H)Me$-$CH_2$—S—$SiMe_3$, $(BuO)_3Si$—$CH_2$—$C(H)Me$-$CH_2$—S—$SiMe_3$, $(MeO)_3Si$—$(CH_2)_3$—S—$SiEt_3$, $(EtO)_3Si$—$(CH_2)_3$—S—$SiEt_3$, $(PrO)_3Si$—$(CH_2)_3$—S—$SiEt_3$, $(BuO)_3Si$—$(CH_2)_3$—S—$SiEt_3$, $(MeO)_3Si$—$(CH_2)_2$—S—$SiEt_3$, $(EtO)_3Si$—$(CH_2)_2$—S—$SiEt_3$, $(PrO)_3Si$—$(CH_2)_2$—S—$SiEt_3$, $(BuO)_3Si$—$(CH_2)_2$—S—$SiEt_3$, $(MeO)_3Si$—$CH_2$—S—$SiEt_3$, $(EtO)_3Si$—$CH_2$—S—$SiEt_3$, $(PrO)_3Si$—$CH_2$—S—$SiEt_3$, $(BuO)_3Si$—$CH_2$—S—$SiEt_3$, $(MeO)_3Si$—$CH_2$—$CMe_2$-$CH_2$—S—$SiEt_3$, $(EtO)_3Si$—$CH_2$—$CMe_2$-$CH_2$—S—$SiEt_3$, $(PrO)_3Si$—$CH_2$—$CMe_2$-$CH_2$—S—$SiEt_3$, $(BuO)_3Si$—$CH_2$—$CMe_2$-$CH_2$—S—$SiEt_3$, $((MeO)_3Si$—$CH_2$—$C(H)Me$-$CH_2$—S—$SiEt_3$, $(EtO)_3Si$—$CH_2$—$C(H)Me$-$CH_2$—S—$SiEt_3$, $(PrO)_3Si$—$CH_2$—$C(H)Me$-$CH_2$—S—$SiEt_3$, $(BuO)_3Si$—$CH_2$—$C(H)Me$-$CH_2$—S—$SiEt_3$, In one embodiment, the modified coupling agent is represented by the Formula 2C, as described above:

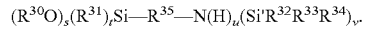

$(R^{30}O)_s(R^{31})_t$Si—$R^{35}$—N(H)$_u$(Si'$R^{32}R^{33}R^{34}$)$_v$.

In one embodiment, $R^{35}$ is a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl); and wherein each group is optionally substituted with a ($C_1$-$C_4$) alkyl, a ($C_1$-$C_4$) alkoxy, a ($C_7$-$C_{16}$) aryl, a ($C_7$-$C_{16}$) aralkyl, an amine, or thioalkyl.

In one embodiment, t is the number 0, and $R^{30}$, $R^{32}$, $R^{33}$ and $R^{34}$ are the same or different, and are each independently hydrogen (H), ($C_1$-$C_{16}$) alkyl, or ($C_1$-$C_{16}$) trialkylsilyl; and alkyl especially includes Me, Et, Pr (isomers) and Bu (isomers).

In one embodiment, $R^{35}$ is a ($C_1$-$C_{16}$) divalent alkyl group, or a ($C_1$-$C_{16}$) divalent aralkyl group; and divalent alkyl groups especially includes divalent $CH_2$, $C_2H_4$, $C_3H_6$ and $C_4H_8$ groups.

In one embodiment, $R^{35}$ is an alkylene. In a further embodiment, the alkylene is selected from —$CH_2$— (methylene), —$(CH_2)_2$— (ethylidene), —$(CH_2)_3$— (propylidene) or —$(CH_2)_4$— (butylidene).

In one embodiment, $R^{35}$ is a divalent aralkylene group. In a further embodiment, the aralkylene group is —$CH_2$—$C_6H_4$—$CH_2$— (xylidene) or —$C_6H_4$—$C(CH_3)_2$—$C_6H_4$—.

In one embodiment, t is the number 0, and $R^{30}$, $R^{32}$, $R^{33}$ and $R^{34}$ are each independently an alkyl. In a further embodiment, the alkyl is selected from $CH_3$— (methyl), $CH_3$—$CH_2$— (ethyl), $CH_3$—$(CH_2)_2$— (propyl), $(CH_3)_2$—CH— (iso-propyl), $CH_3$—$(CH_2)_3$— (n-butyl), $(CH_3)_2CH$—$CH_2$— (sec.-butyl) or $CH_3$—$C(CH_3)_2$— (tert.-butyl).

In one embodiment, t is the number 0, and $R^{30}$ is a ($C_1$-$C_4$) alkyl, and preferably methyl, ethyl, propyl isomer, or a butyl isomer.

In one embodiment, $R^{32}$, $R^{33}$ and $R^{34}$ are each, independently selected from the group consisting of a linear ($C_1$-$C_6$) alkyl, a cyclic ($C_6$-$C_{12}$) alkyl, and a ($C_6$-$C_{15}$) aryl.

In one embodiment, $R^{35}$ is selected from the group consisting of a linear ($C_1$-$C_{10}$) alkyl (divalent), a cyclic ($C_6$-$C_{12}$) alkyl (divalent), a ($C_6$-$C_{15}$) aryl (divalent), and a ($C_7$-$C_{12}$) alkylaryl (divalent).

Formula 2C may comprise a combination of two or more embodiments as described herein.

The coupling agent may be added intermittently (or at regular or irregular intervals) or continuously during the polymerization, but is preferably added at a conversion rate of the polymerization of more than 80 percent, and more preferably at a conversion rate of more than 90 percent.

For example, a coupling agent can be continuously added during the polymerization, in cases where asymmetrical coupling is desired. This continuous addition is normally done in a reaction zone separate from the zone where the bulk of the polymerization is occurring. The coupling agent can be added in a hydrocarbon solution, for example, in cyclohexane, to the polymerization admixture, with suitable mixing for distribution and reaction. The coupling agent will typically be added only after a high degree of conversion has already been attained. For instance, the coupling agent will normally be added only after a monomer conversion of greater than about 80 percent has been realized. It will typically be preferred for the monomer conversion to reach at least about 90 percent before the coupling modifier agent is added. Polymers coupled with coupling agents according to the invention have a minimum of two arms.

Preferably, a substantial amount of the polymer chain ends are not terminated prior to the reaction with the coupling agent; that is, living polymer chain ends are present and capable of reacting with the coupling agent in a polymer chain coupling reaction. The coupling reaction may be before, after, or during, the addition of the chain end-modification agent. Preferably the coupling reaction is completed prior to the addition of the chain end-modification agent. In one embodiment, as result of the coupling reaction 80 percent or less of the living polymer chains are reacted with the coupling agent. Preferably 65 percent or less of the polymer chains are reacted with the coupling agent, and more preferably 50 percent or less of the polymer chains are reacted with the coupling agent.

In some embodiments, between 10 and 20 percent of the living polymer chain ends, as determined by gel permutation chromatography (GPC), are reacted with a coupling agent(s), prior to addition of the chain end-modification agent. In other embodiments, between and 35 percent of the living polymer chain ends are reacted with a coupling agent(s), prior to addition of the chain end-modification agent. In yet other embodiments, between 35 and 50 percent of the living polymer chain ends are reacted with a coupling agent(s), prior to addition of the chain end-modification agent. The coupling agent may be directly added into the polymer solution without dilution; however, it may be beneficial to provide addition of the coupling agent in solution, such as an inert solvent (for example, cyclohexane). The amount of modified coupling agent added to the polymerization varies, depending upon the monomer species, coupling agent, chain end modification agent, reaction conditions, and desired end properties but is generally utilized from about 0.01 to less than 1.5 mol of modified coupling agent per 4 mol of amine polymerization initiator compound, preferably amine polymerization initiator compound according to Formula 1G to 1L, even more preferably amine polymerization initiator compound according to Formula 1J to 1L, to enable subsequent polymer chain-end modification of the remaining living polymer fraction. For instance, if different types of coupling agents are used, from 0.01 to 1.5 mol, preferably from 0.01 to 1.0 mol, and more preferably from 0.01 to 0.6 mol, of the modified coupling agent is utilized for every 4.0 moles of living and thus anionic polymer chain ends.

A combination of a tin or silicon comprising coupling agent, as described before, can optionally be used to couple the polymer. A combination of different coupling agents, such as, for example, different modifier compounds according to Formula 2A, can also be used to couple polymer chains. In an another embodiment, a combination of different coupling agents, such as, for example, a modifier compound according to Formula 2A and a modifier compound according to Formula 2C can optionally be used to couple polymer chains. In yet an another embodiment, a combination of a modified coupling agents according to Formula 2C or to Formula 2A with an other coupling agent, such as, for example, but not limited to, tin tetrachloride or tetramethoxysilane can also be used. By using such a combination of tin and silicon coupling agents, silicon coupling agents including the group of modified coupling agents according to Formula 2A and 2C, improved properties for tire rubbers, such as lower hysteresis, can be attained. It is particularly desirable to utilize a combination of tin and silicon coupling agents in tire tread compounds that contain both silica and carbon black. In such cases, the molar ratio of the tin to the silicon compound employed in coupling the elastomeric polymer will normally be within the range from 20:80 to 95:5; more typically from 40:60 to 90:10, and preferably from 60:40 to 85:15. Most typically, a range from about 0.001 to 4.5 mmol of coupling agent (tin and silicon compound, silicon coupling agents), including the group of modified coupling agents according to Formula 2A and 2C is employed per 100 grams of the elastomeric polymer. It is normally preferred to utilize from about 0.05 to about 0.5 mmol of the coupling agent per 100 grams of polymer to obtain the desired Mooney viscosity, and to enable subsequent chain-end functionalization of the remaining living polymer fraction. The larger quantities tend to produce polymers containing terminally reactive groups or insufficient coupling and only enable an insufficient chain end-modification.

In one embodiment, from 0.01 to less than 5.0 mol, preferably from 0.05 to 2.5 mol, and more preferably from 0.1 to 1.5 mol, of the coupling agent is utilized for every 10.0 moles of live lithium polymer chain ends. The coupling agent can be added in a hydrocarbon solution, (e.g. in cyclohexane), to the polymerization admixture, in the reactor, with suitable mixing for distribution and reaction.

The polymer coupling reaction may be carried out in a temperature range from 0° C. to 150° C., preferably from 15° C. to 120° C., and even more preferably from 40° C. to 100° C. There is no limitation for the duration of the coupling reaction, however with respect to an economical polymerization process; in case of a batch polymerization process, the coupling reaction is usually stopped about 5 to 60 minutes after the addition of the coupling agent.

The coupling agent can be added in a hydrocarbon solution, for example, in cyclohexane, to the polymerization admixture in the reactor with suitable mixing for distribution and reaction. The modified coupling agents can be prepared as described in International Publication No. WO/2009/148932, fully incorporated herein by reference.

The subject modified coupling agent includes the sulfanylsilane compounds described in the following: U.S. Pat. No. 6,229,036, International Publication No. WO 2007/047943, and in International Publication No. WO/2009/148932 (each fully incorporated herein by reference, including the methods for preparing sulfanylsilane compounds). Of the sulfanylsilane compounds disclosed, those without halogens are preferred.

Chain End Modifiers

To further control polymer properties, a chain end-modification agent is employed. The term "chain end modification agent" is intended to mean the subject compounds described herein with reference to Formula 4C below. The term "linear modified polymer macromolecule" is intended to mean the reaction product of primarily one living polymer chain (or alpha-modified living polymer macromolecule) with subject end-modification agent.

The subject chain end modifier includes compounds according to Formula 4C:

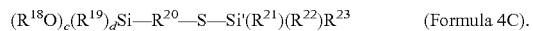

$(R^{18}O)_c(R^{19})_d Si-R^{20}-S-Si'(R^{21})(R^{22})R^{23}$     (Formula 4C).

In Formula 4C, Si and Si' are silicon atoms; S is sulfur; O is oxygen; c is an integer selected from 1, 2 and 3; d is an integer selected from 0, 1, and 2; c+d=3;

$R^{18}$ is selected from the group consisting of: $(C_1-C_6)$ alkyl;

$R^{19}$ is selected from the group consisting of: $(C_1-C_{18})$ alkyl, $(C_6-C_{18})$ aryl, and $(C_7-C_{18})$ aralkyl; and $R^{19}$ is preferably selected from $(C_1-C_{10})$ alkyl;

$R^{20}$ is a divalent group selected from the group consisting of: an $(C_6-C_{18})$ aryl, a $(C_7-C_{18})$ alkylaryl, and a $(C_1-C_{18})$ alkyl; and each $R^{20}$ group may be substituted with at least one substituent selected from the group consisting of: $(C_1-C_4)$ alkyl, $(C_1-C_4)$ alkoxy, $(C_7-C_{16})$ aryl, $(C_7-C_{16})$ aralkyl, and thioalkyl. Preferably $R^{20}$ is a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{20}$ is a $(C_7-C_{25})$ alkylaryl, more preferably a $(C_7-C_{16})$ alkylaryl, and most preferably a $(C_7-C_{12})$ alkylaryl.

$R^{21}$, $R^{22}$ and $R^{23}$ are the same or different, and are each independently selected from the group consisting of: $(C_1-C_{18})$ alkyl, $(C_1-C_{18})$ alkoxy, $(C_6-C_{18})$ aryl, and $(C_7-C_{18})$ aralkyl; and $R^{21}$, $R^{22}$ and $R^{23}$ are each preferably independently selected from $(C_1-C_5)$ alkyl. In another embodiment, $R^{21}$, $R^{22}$ and $R^{23}$ are each independently a $(C_1-C_{16})$ alkyl, more preferably a $(C_1-C_{12})$ alkyl, even more preferably a $(C_1-C_8)$ alkyl, and most preferably a $(C_1-C_4)$ alkyl.

In one embodiment, $R^{18}$, $R^{19}$, $R^{20}$, $R^{21}$, $R^{22}$ and $R^{23}$ are the same or different, and are each independently (H), $(C_1-C_{16})$ alkyl, or $(C_1-C_{16})$ trialkylsilyl; and alkyl especially includes Me, Et, Pr and Bu.

In one embodiment, $R^{20}$ is $(C_1-C_{16})$ divalent alkyl group, or a $(C_1-C_{16})$ divalent aralkyl group; and divalent alkyl groups especially include divalent Me, Et, Pr and Bu groups.

In one embodiment, $R^{20}$ is alkylene. In a further embodiment, the alkylene is selected from $-CH_2-$ (methylene), $-(CH_2)_2-$ (ethylidene), $-(CH_2)_3-$ (propylidene), or $-(CH_2)_4-$ (butylidene).

In one embodiment, $R^{20}$ is a divalent aralkylene group. In a further embodiment, the aralkylene group is $-CH_2-C_6H_4-CH_2-$ (xylidene) or $-C_6H_4-C(CH_3)_2-C_6H_4-$.

In one embodiment, $R^{18}$, $R^{19}$, $R^{21}$, $R^{22}$ and $R^{23}$ are each independently an alkyl. In a further embodiment, the alkyl is selected from $CH_3-$ (methyl), $CH_3-CH_2-$ (ethyl), $CH_3-(CH_2)_2-$ (propyl), $CH_3-(CH_2)_3$ (n-butyl), or $CH_3-C(CH_3)_2$ (tert-butyl).

In one embodiment, for Formula 4C, $R^{20}$, is selected from the group consisting of a linear $(C_1-C_{10})$ alkyl (divalent), a cyclic $(C_6-C_{12})$ alkyl (divalent), a $(C_6-C_{15})$ aryl (divalent), and a $(C_7-C_{12})$ alkylaryl (divalent).

Formula 4C may comprise a combination of two or more embodiments as described herein.

In one embodiment, the chain end-modification agent is the compound of Formula 4C, as discussed above [$(R^{18}O)_c(R^{19})_d$ Si$-R^{20}-S-Si'(R^{21})(R^{22})R^{23}$], where Si and Si' are silicon atoms; S is sulfur; O is oxygen; c is an integer selected from 1, and 2; and d is an integer selected from 1, and 2. In a further embodiment, $R^{18}$, $R^{19}$, $R^{21}$, $R^{22}$ and $R^{23}$ are the same or different, and are each independently hydrogen (H), $(C_1-C_{16})$ alkyl, or $(C_1-C_{16})$ trialkylsilyl; and alkyl especially includes Me, Et, Pr and Bu. In a further embodiment, $R^{20}$, is $(C_1-C_{16})$ divalent alkyl group, or a $(C_1-C_{16})$ divalent aralkyl group; and divalent alkyl groups especially include divalent Me, Et, Pr and Bu groups. In another embodiment, $R^{20}$ is alkylene. In a further embodiment, the alkylene is selected from $-CH_2-$ (methylene), $-(CH_2)_2-$ (ethylidene), $-(CH_2)_3-$ (propylidene) and $-(CH_2)_4-$ (butylidene). In another embodiment, $R^{20}$ is a divalent aralkylene group. In a further embodiment, the aralkylene group is selected from $-CH_2-C_6H_4-CH_2-$ (xylidene) or $-C_6H_4-C(CH_3)_2-C_6H_4-$.

In one embodiment, $R^{18}$, $R^{19}$, $R^{21}$, $R^{22}$ and $R^{23}$ are each independently an alkyl. In a further embodiment, the alkyl is $CH_3-$ (methyl), $CH_3-CH_2-$ (ethyl), $CH_3-(CH_2)_2-$ (propyl), CH3$-(CH_2)_3$ (n-butyl) or $CH_3-C(CH_3)_2$ (tert-butyl).

In one embodiment, for Formula 4C, $R^{20}$, is selected from the group consisting of a linear $(C_1-C_{10})$ alkyl (divalent), a cyclic $(C_6-C_{12})$ alkyl (divalent), a $(C_6-C_{15})$ aryl (divalent), and a $(C_7-C_{12})$ alkylaryl (divalent).

Formula 4C may comprise a combination of two or more embodiments as described herein.

While not shown in Formula 4C, it will be understood that the subject compounds may also include their corresponding Lewis base adducts (for example, with solvent molecules tetrahydrofuran, diethylether, dimethoxyethane coordinated with silicon atoms).

Specific preferred species of the subject chain end modifier include the compounds (and their corresponding Lewis base adducts which are not shown) represented by the following formulae: $(MeO)_2(Me)Si-(CH_2)_3-S-SiMe_3$, $(EtO)_2(Me)Si-(CH_2)_3-S-SiMe_3$, $(PrO)_2(Me)Si-(CH_2)_3-S-SiMe_3$, $(BuO)_2(Me)Si-(CH_2)_3-S-SiMe_3$, $(MeO)_2(Me)Si-(CH_2)_2-S-SiMe_3$, $(EtO)_2(Me)Si-(CH_2)_2-S-SiMe_3$, $(PrO)_2(Me)Si-(CH_2)_2-S-SiMe_3$, $(BuO)_2(Me)Si-(CH_2)_2-S-SiMe_3$, $(MeO)_2(Me)Si-CH_2-S-SiMe_3$, $(EtO)_2(Me)Si-CH_2-S-SiMe_3$, $(PrO)_2(Me)Si-CH_2-S-SiMe_3$, $(BuO)_2(Me)Si-CH_2-S-SiMe_3$, $(MeO)_2(Me)Si-CH_2-CMe_2-CH_2-S-SiMe_3$, $(EtO)_2(Me)Si-CH_2-CMe_2-CH_2-S-SiMe_3$, $(PrO)_2(Me)Si-CH_2-CMe_2-CH_2-S-SiMe_3$, $(BuO)_2(Me)Si-CH_2-CMe_2-CH_2-S-SiMe_3$, $((MeO)_2(Me)Si-CH_2-C(H)Me-CH_2-S-SiMe_3$, $(EtO)_2(Me)Si-CH_2-C(H)Me-CH_2-S-SiMe_3$, $(PrO)_2(Me)Si-CH_2-C(H)Me-CH_2-S-SiMe_3$, $(BuO)_2(Me)Si-CH_2-C(H)Me-CH_2-S-SiMe_3$, $(MeO)(Me)_2Si-(CH_2)_3-S-SiMe_3$, $(EtO)(Me)_2Si-(CH_2)_3-S-SiMe_3$, (PrO) $Me)_2Si-(CH_2)_3-S-SiMe_3$, $(BuO)(Me)_2Si-(CH_2)_3-S-SiMe_3$, $(MeO)(Me)_2Si-(CH_2)_2-S-SiMe_3$, $(EtO)(Me)_2Si-(CH_2)_2-S-SiMe_3$, $(PrO)(Me)_2Si-(CH_2)_2-S-SiMe_3$, $(BuO)(Me)_2Si-(CH_2)_2-S-SiMe_3$, $(MeO)(Me)_2Si-CH_2-S-SiMe_3$, (EtO)(Me)$_2$Si—CH$_2$—S—SiMe$_3$, (PrO)(Me)$_2$Si—CH$_2$—S—SiMe$_3$, (BuO)(Me)$_2$Si—CH$_2$—S—SiMe$_3$, (MeO)(Me)$_2$Si—CH$_2$—CMe$_2$-CH$_2$—S—SiMe$_3$, (EtO)(Me)$_2$Si—CH$_2$—CMe$_2$-CH$_2$—S—SiMe$_3$, (PrO)(Me)$_2$Si—CH$_2$—CMe$_2$-CH$_2$—S—SiMe$_3$, (BuO)(Me)$_2$Si—CH$_2$—CMe$_2$-CH$_2$—S—SiMe$_3$, ((MeO)(Me)$_2$Si—CH$_2$—C(H)Me-CH$_2$—S—SiMe$_3$, (EtO)(Me)$_2$Si—CH$_2$—C(H)Me-CH$_2$—S—SiMe$_3$, (PrO)(Me)$_2$Si—CH$_2$—C(H)Me-CH$_2$—S—SiMe$_3$, (BuO)(Me)$_2$Si—CH$_2$—C(H)Me-CH$_2$—S—SiMe$_3$, (MeO)$_2$(Me)Si—(CH$_2$)$_3$—S—SiEt$_3$, (EtO)$_2$(Me)Si—(CH$_2$)$_3$—S—SiEt$_3$, (PrO)$_2$(Me)Si—(CH$_2$)$_3$—S—SiEt$_3$, (BuO)$_2$(Me)Si—(CH$_2$)$_3$—S—SiEt$_3$, (MeO)$_2$(Me)Si—(CH$_2$)$_2$—S—SiEt$_3$, (EtO)$_2$(Me)Si—(CH$_2$)$_2$—S—SiEt$_3$, (PrO)$_2$(Me)Si—(CH$_2$)$_2$—S—SiEt$_3$, (BuO)$_2$(Me)Si—(CH$_2$)$_2$—S—SiEt$_3$, (MeO)$_2$(Me)Si—CH$_2$—S—SiEt$_3$, (EtO)$_2$(Me)Si—CH$_2$—S—SiEt$_3$, (PrO)$_2$(Me)Si—CH$_2$—S—SiEt$_3$, (BuO)$_2$(Me)Si—CH$_2$—S—SiEt$_3$, (MeO)$_2$(Me)Si—CH$_2$—CMe$_2$-CH$_2$—S—SiEt$_3$, (EtO)$_2$(Me)Si—CH$_2$—CMe$_2$-CH$_2$—S—SiEt$_3$, (PrO)$_2$(Me)Si—CH$_2$—CMe$_2$-CH$_2$—S—SiEt$_3$, (BuO)$_2$(Me)Si—CH$_2$—CMe$_2$-CH$_2$—S—SiEt$_3$, ((MeO)$_2$(Me)Si—CH$_2$—C(H)Me-CH$_2$—S—SiEt$_3$, (EtO)$_2$(Me)Si—CH$_2$—C(H)Me-CH$_2$—S—SiEt$_3$, (PrO)$_2$(Me)Si—CH$_2$—C(H)Me-CH$_2$—S—SiEt$_3$, (BuO)$_2$(Me)Si—CH$_2$—C(H)Me-CH$_2$—S—SiEt$_3$, (MeO)(Me)$_2$Si—(CH$_2$)$_3$—S—SiEt$_3$, (EtO)(Me)$_2$Si—(CH$_2$)$_3$—S—SiEt$_3$, (PrO)(Me)$_2$Si—(CH$_2$)$_3$—S—SiEt$_3$, (BuO)(Me)$_2$Si—(CH$_2$)$_3$—S—SiEt$_3$, (MeO)(Me)$_2$Si—(CH$_2$)$_2$—S—SiEt$_3$, (EtO)(Me)$_2$Si—(CH$_2$)$_2$—S—SiEt$_3$, (PrO)(Me)$_2$Si—(CH$_2$)$_2$—S—SiEt$_3$, (BuO)(Me)$_2$Si—(CH$_2$)$_2$—S—SiEt$_3$, (MeO)(Me)$_2$Si—CH$_2$—S—SiEt$_3$, (EtO)(Me)$_2$Si—CH$_2$—S—SiEt$_3$, (PrO)(Me)$_2$Si—CH$_2$—S—SiEt$_3$, (BuO)(Me)$_2$Si—CH$_2$—S—SiEt$_3$, (MeO)(Me)$_2$Si—CH$_2$—CMe$_2$-CH$_2$—S—SiEt$_3$, (EtO)(Me)$_2$Si—CH$_2$—CMe$_2$-CH$_2$—S—SiEt$_3$, (PrO)(Me)$_2$Si—CH$_2$—CMe$_2$-CH$_2$—S—SiEt$_3$, (BuO)(Me)$_2$Si—CH$_2$—CMe$_2$-CH$_2$—S—SiEt$_3$, ((MeO)(Me)$_2$Si—CH$_2$—C(H)Me-CH$_2$—S—SiEt$_3$, (EtO)(Me)$_2$Si—CH$_2$—C(H)Me-CH$_2$—S—SiEt$_3$, (PrO)(Me)$_2$Si—CH$_2$—C(H)Me-CH$_2$—S—SiEt$_3$, and (BuO)(Me)$_2$Si—CH$_2$—C(H)Me-CH$_2$—S—SiEt$_3$, The chain end modification agent according to Formula 4C of the present invention may be prepared as stated in International Publication No. WO 2007/047943 and in International Publication No. WO/2009/148932.

The subject chain end modification agent includes the sulfanylsilane compounds described in U.S. Pat. No. 6,229,036, in International Publication No. WO 2007/047943, and in International Publication No. WO/2009/148932 (each are fully incorporated herein by reference, including the methods for preparing sulfanylsilane compounds).

The chain end modification agent may be added intermittently (or at regular or irregular intervals) or continuously during the polymerization, but is preferably added at a conversion rate of the polymerization of more than 80 percent, and more preferably at a conversion rate of more than 90 percent. Preferably, a substantial amount of the polymer chain ends are not terminated prior to the reaction with the chain end modification agent; that is, the living polymer chain ends are present, and capable of reacting with the end modification agent. The chain end modification reaction may be before, after or during the addition of the coupling agent. Preferably the chain end-modification reaction is completed after the addition of the coupling agent. For example see International Publication No. WO/2009/148932, incorporated herein by reference.

In one embodiment, more than 20 percent, preferably more than 35 percent, and even more preferably more than 50 percent of the polymer chains, as determined by GPC, formed in the course of the polymerization process, are linked with a chain end-modification agent in the process of polymer chain end-modification.

In one embodiment, more than 20 percent of the polymer chain ends, as determined by GPC, are reacted with a coupling agent(s), prior to addition of the chain end-modification agent(s). In yet other embodiments, more than 35 percent of the polymer chain ends are reacted with a coupling agent(s), prior to addition of the chain end-modification agent(s).

In one embodiment, between 20 and 35 percent of the living polymer chain ends, as determined by GPC, are reacted with a coupling agent(s), prior to addition of the chain end-modification agent(s). In other embodiments, between 35 and 50 percent of the living polymer chain ends, as determined by GPC, are reacted with a coupling agent(s), prior to addition of the chain end-modification agent(s). In yet other embodiment, between 50 and 80 percent of the living polymer chain ends are reacted with a coupling agent(s), prior to addition of the chain end-modification agent(s).

In one embodiment, more than 20 percent of the polymer chain ends, as determined by GPC, are reacted with a modified coupling agent(s), prior to addition of the chain end-modification agent(s). In yet other embodiments, more than 35 percent of the polymer chain ends are reacted with a modified coupling agent(s), prior to addition of the chain end-modification agent(s).

In one embodiment, between 20 and 35 percent of the living polymer chain ends, as determined by GPC, are reacted with a modified coupling agent(s), prior to addition of the chain end-modification agent(s). In other embodiments, between 35 and 50 percent of the living polymer chain ends, as determined by GPC, are reacted with a modified coupling agent(s), prior to addition of the chain end-modification agent(s). In yet other embodiment, between 50 and 80 percent of the living polymer chain ends are reacted with a modified coupling agent(s), prior to addition of the chain end-modification agent(s).

In one embodiment, more than 50 percent, preferably more than 60 percent, and more preferably more than 75 percent, as determined by GPC, of the alpha modified living polymer macromolecules (still remaining after the coupling reaction), react with an end-modification agent. Chain end-modified polymer macromolecule, according to the invention, comprises a functionality derived from an amine polymerization initiator compound and a functionality derived from the chain end-modification agent.

The end modification agent may be directly added into the polymer solution without dilution; however, it may be beneficial to add the agent in solution, such as in an inert solvent (e.g. cyclohexane). The amount of chain end modification agent added to the polymerization varies, depending upon the monomer species, coupling agent or coupling modifier agent, chain end modification agent, reaction conditions, and desired end properties, but is generally from 0.05 to 5 mol-equivalent, preferably from 0.1 to 2.0 mol-equivalent, and most preferably from 0.2 to 1.5 mol-equivalent, per mol equivalent of alkali metal in the initiator compound. The polymer chain end-modification reaction may be carried out in a temperature range from 0° C. to 150° C., preferably from 15° C. to 120° C., and even more preferably from 40° C. to 100° C. There is no limitation for the duration of the chain end-modification reaction, however with respect to an economical polymerization process, for example, in the case of a batch polymerization process, the chain end-modification reaction is usually stopped about 5 to 60 minutes after the addition of the modifier.

The invention also provides a method for making the first composition, comprising at least the following step A through C. Step A: reacting the amine polymerization initiator compound as represented by Formula 1G to Formula 1L (each formula as described above), and preferably in Formula 1G to Formula 1L a is the number 2, b is the number zero and E is an oxygen atom (O), a sulfur atom (S), N—$CHR^8$—$CR^9$—$CR^{10}$, N—$CHR^8$—C—$CHR^{10}$ or N—$CR^8$—$CR^9$—$CHR^{10}$, with one or more monomer types, and preferably monomers selected from butadiene, styrene, isoprene, alpha methylstyrene or combinations thereof, in a polymerization solvent, to form a Composition A. Suitable polymerization solvents include non-polar aliphatic and non-polar aromatic solvents, preferably hexane, heptane, butane, pentane, isopar, cyclohexane, toluene and benzene. Step B: reacting Composition A with at least one type of coupling agent selected from the group consisting of: $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si$—$SiCl_3$, $Cl_3Si$—O—$SiCl_3$, $Cl_3Sn$—$SnCl_3$, $Cl_3Sn$—O—$SnCl_3$. $Sn(OMe)_4$, $Si(OMe)_4$, $Sn(OEt)_4$, $Si(OEt)_4$ or a compound corresponding to Formulas 2A (as described herein), Formula 2C (as described herein), and combinations thereof, to form Composition B. Preferably Composition A is reacted with at least one type of coupling modifier agent selected from the group consisting of: a compound corresponding to Formulas 2A (as described herein), Formula 2C (as described herein), and combinations thereof, to form Composition B. Step C: reacting Composition B with at least one type of chain end-modification agents selected from Formula 4C (as described herein), to form the modified polymer.

In a preferred embodiment, the amine polymerization initiator compound is reacted first with monomers to form alpha-modified living polymer macromolecules. Some of these macromolecules are reacted with the coupling agent to form branched modified polymer macromolecules. In step C, some of the alpha-modified living polymer macromolecules are reacted with the chain-end modifier compound to form linear modified polymer macromolecules.

In one embodiment, the amine polymerization initiator compound is the compound of Formulas 1G, 1H or 1I.

In one embodiment, the amine polymerization initiator compound is the compound of Formulas 1J, 1K or 1L.

In another embodiment, the coupling agent is selected from the following: $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si$—$SiCl_3$, $Cl_3Si$—O—$SiCl_3$, $Cl_3Sn$—$SnCl_3$, $Cl_3Sn$—O—$SnCl_3$, or combinations thereof. Examples of tin and silicon alkoxides coupling agents include: $Sn(OMe)_4$, $Si(OMe)_4$, $Sn(OEt)_4$ or $Si(OEt)_4$.

In another embodiment, the coupling agent is the compound of Formula 2A. In a further embodiment, the chain end-modifier compound is the compound of Formula 4C.

In another embodiment, the coupling agent is the compound of Formula 2C. In a further embodiment, the chain end-modifier compound is the compound of Formula 4C.

Monomers

Monomers useful in preparing the subject uncrosslinked elastomeric polymers include conjugated olefins and olefins selected from α-olefins, internal olefins, cyclic olefins, polar olefins or nonconjugated diolefins. Suitable conjugated unsaturated monomers are preferably conjugated dienes, such as 1,3-butadiene, 2-alkyl-1,3-butadiene, preferably, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene. Preferred olefins are $C_{2-20}$ α-olefins, including, but not limited to, long chain macromolecular α-olefins, more especially an aromatic vinyl compound. Preferred aromatic vinyl compounds are styrene, including $C_{1-4}$ alkyl substituted styrene, such as 2-methylstyrene, 3-methylstyrene, 4-methylstyrene, 2,4-dimethylstyrene, 2,4,6-trimethylstyrene, α-methylstyrene and stilbene, 2,4-diisopropyl styrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof. Suitable polar olefins included acrylonitrile, methacrylates, methylmethacrylate. Suitable nonconjugated olefins include $C_{4-20}$ diolefins, especially norbornadiene, ethylidenenorbornene, 1,4-hexadiene, 1,5-hexadiene, 1,7-octadiene, 4-vinylcyclohexene, divinylbenzene including 1,2-divinylbenzene, 1,3-divinylbenzene and 1,4-divinylbenzene and mixtures thereof. Preferred conjugated dienes include butadiene, isoprene and cyclopentadiene, and preferred aromatic α-olefins include: styrene and 4-methylstyrene.

Examples of applicable uncrosslinked polymers include homopolymers of conjugated dienes, especially butadiene or isoprene, and random or block co- and terpolymers of at least one conjugated diene, especially butadiene or isoprene, with at least one conjugated diene or with at least one aromatic α-olefin, and especially styrene and 4-methylstyrene, aromatic diolefin, especially divinylbenzene. Especially preferred is the random copolymerization, optionally terpolymerization, of at least one conjugated diene with at least one aromatic α-olefin, and optionally at least one aromatic diolefin or aliphatic α-olefin, and especially butadiene or isoprene with styrene, 4-methylstyrene and/or divinylbenzene. Additionally, especially preferred is the random copolymerization of butadiene with isoprene.

Polymerizations

General information about the polymerization technologies including polymerization initiator compounds; polar coordinator compounds and accelerators, each to increase the reactivity of the initiator, to randomly arrange aromatic vinyl compounds, to randomly arrange 1,2-polybutadiene or 1,2-polyisoprene or 3,4-polyisoprene units introduced in the polymer; the amounts of each compound; monomer(s); and suitable process conditions are described in International Publication No. WO/2009/148932 fully incorporated herein by reference. Solution polymerizations normally take place at lower pressures, preferably below 10 MPa, preferably in a temperature range from 0 to 120° C. The polymerization is generally conducted under batch, continuous or semi-continuous polymerization conditions. The polymerization process is preferably conducted as a solution polymerization, wherein the polymer formed is substantially soluble in the reaction mixture, or as a suspension/slurry polymerization, wherein the polymer formed is substantially insoluble in the reaction medium.

Modified Polymers

Some of the branched modified polymer macromolecules (or alpha-modified/branched-modified polymer macromolecules) of the invention are represented by Formulas P1 to P6 (partial list). Some branched modified macromolecules (not shown below) can be formed from amine polymerization initiators containing two or more initiating sites.

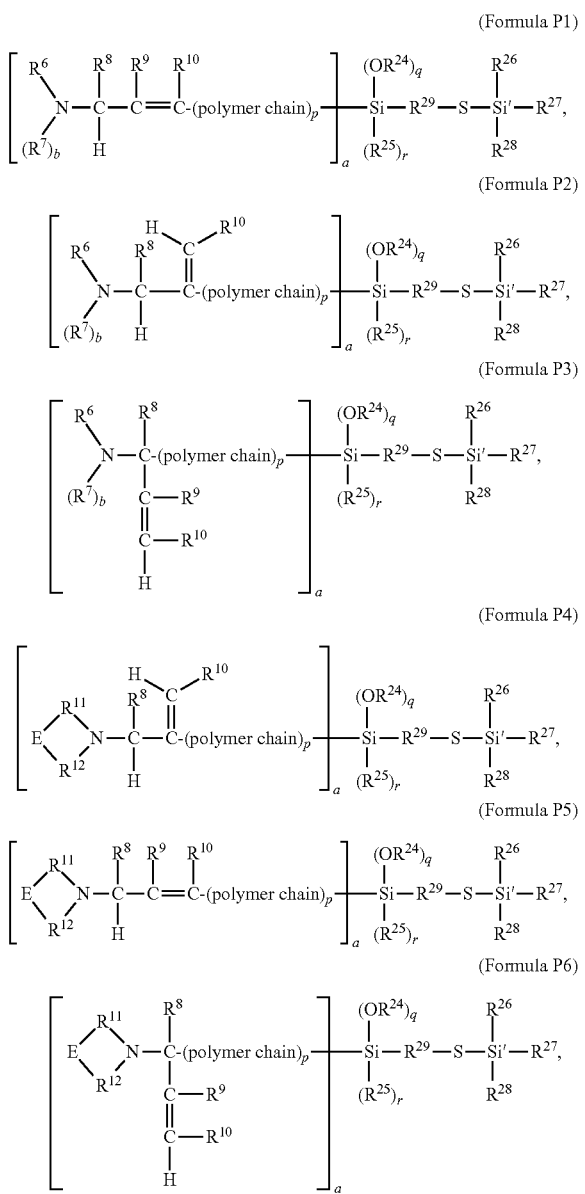

(Formula P1)

(Formula P2)

(Formula P3)

(Formula P4)

(Formula P5)

(Formula P6)

In the above formulas, the "polymer chain" is a polymer chain comprising p monomer units; N is a nitrogen atom, C is carbon atom, H is a hydrogen atom, Si and Si' are silicon atoms, S is a sulfur atom, and O is an oxygen atom;

E is $(C_1\text{-}C_{18})$ alkyl, $(C_6\text{-}C_{18})$ aryl, $(C_7\text{-}C_{18})$ aralkyl, an oxygen atom (O), a sulfur atom (S), or N—CHR—$CR^9$=$CHR^{10}$;

$R^8$, $R^9$ and $R^{10}$ are each independently selected from the group consisting of: hydrogen (H), $(C_1\text{-}C_{18})$ alkyl, $(C_6\text{-}C_{18})$ aryl, and $(C_7\text{-}C_{18})$ aralkyl; and $R^8$, $R^9$ and $R^{10}$, are each preferably independently selected from $(C_1\text{-}C_5)$ alkyl;

$R^{11}$ and $R^{12}$ are each divalent and are each independently selected from the group consisting of: hydrogen (H), $(C_1\text{-}C_{18})$ alkyl, $(C_6\text{-}C_{18})$ aryl, and $(C_7\text{-}C_{18})$ aralkyl; and $R^{11}$ and $R^{12}$ are each preferably independently selected from $(C_1\text{-}C_5)$ alkyl;

$R^6$ is selected from the group consisting of: hydrogen (H), $(C_1\text{-}C_{18})$ alkyl, $(C_6\text{-}C_{18})$ aryl, $(C_7\text{-}C_{18})$ aralkyl, and —$SiR^{36}R^{37}R^{38}$; where $R^{36}$, $R^{37}$ and $R^{38}$ are each independently selected from the group consisting of: $(C_1\text{-}C_{18})$ alkyl, $(C_6\text{-}C_{18})$ aryl, and $(C_7\text{-}C_{18})$ aralkyl; $R^{36}$, $R^{37}$ and $R^{38}$ are each preferably independently selected from $(C_1\text{-}C_5)$ alkyl; and $R^6$ is preferably $(C_6\text{-}C_{10})$ aryl or —$SiR^{36}R^{37}R^{38}$;

$R^7$ is selected from the group consisting of: hydrogen (H), $(C_1\text{-}C_{18})$ alkyl, $(C_6\text{-}C_{18})$ aryl, $(C_7\text{-}C_{18})$ aralkyl, —$CHR^8$—$CR^9$=$CHR^{10}$, and —$SiR^{36}R^{37}R^{38}$, where $R^{36}$, $R^{37}$ and $R^{38}$ are each independently selected from the group consisting of: $(C_1\text{-}C_{18})$ alkyl, $(C_6\text{-}C_{18})$ aryl, and $(C_7\text{-}C_{18})$ aralkyl; $R^{36}$, $R^{37}$ and $R^{38}$ are each preferably independently selected from $(C_1\text{-}C_5)$ alkyl; and $R^7$ is preferably $(C_6\text{-}C_{10})$ aryl, —$CR^8$—$CR^9$=$CHR^{10}$, or —$SiR^{36}R^{37}R^{38}$.

$R^{24}$ is selected from the group consisting of: hydrogen (H), and $(C_1\text{-}C_6)$ alkyl;

$R^{25}$, $R^{26}$, $R^{27}$ and $R^{28}$ are the same or different, and are each independently selected from the group consisting of: hydrogen (H), $(C_1\text{-}C_{18})$ alkyl, $(C_1\text{-}C_{18})$ alkoxy, $(C_6\text{-}C_{18})$ aryl, and $(C_7\text{-}C_{18})$ aralkyl; and $R^{25}$, $R^{26}$, $R^{27}$ and $R^{28}$ are each preferably each independently selected from $(C_1\text{-}C_5)$ alkyl. In another embodiment, $R^{25}$, $R^{26}$, $R^{27}$ and $R^{28}$ are each independently a $(C_1\text{-}C_{16})$ alkyl, more preferably a $(C_1\text{-}C_{12})$ alkyl, even more preferably a $(C_1\text{-}C_8)$ alkyl, and most preferably a $(C_1\text{-}C_4)$ alkyl.

$R^{29}$ is a divalent group selected from the group consisting of: an $(C_6\text{-}C_{18})$ aryl, a $(C_7\text{-}C_{18})$ alkylaryl, and a $(C_1\text{-}C_{18})$ alkyl; and each $R^{29}$ group may be substituted with at least one substituent selected from the group consisting of: $(C_1\text{-}C_4)$ alkyl, $(C_1\text{-}C_4)$ alkoxy, $(C_7\text{-}C_{16})$ aryl, $(C_7\text{-}C_{16})$ aralkyl, nitrile, amine, $NO_2$, and thioalkyl. Preferably $R^{29}$ is a $(C_1\text{-}C_{16})$ alkyl, more preferably a $(C_1\text{-}C_{12})$ alkyl, even more preferably a $(C_1\text{-}C_8)$ alkyl, and most preferably a $(C_1\text{-}C_5)$ alkyl. In another embodiment, $R^{29}$ is a $(C_7\text{-}C_{25})$ alkylaryl, more preferably a $(C_7\text{-}C_{16})$ alkylaryl, and most preferably a $(C_7\text{-}C_{12})$ alkylaryl.

The q is the number 0 or 1; and r is the number 0 or 1; the sum of q and r (or q+r) is the number 1; the sum of c and d (or c+d) is the number 2; a is the number 2 or 3; and b is the number 0 or 1; p is the number of polymerized monomer units and is 500 to 40,000.

While not shown in Formula P1, P2, P3, P4, P5 and P6, it will be understood that the subject compound(s) may include their corresponding Lewis base adducts and oxidation products.

Some of the formulas of the linear modified polymer macromolecules (or alpha-modified/omega-modified polymer macromolecules) are represented by Formula P13 to Formula P24 (partial list). Some of the formulas shown below represent macromolecules formed from amine polymerization initiators containing two initiating sites. Other amine initiator compounds may comprise more than two initiating sites.

(Formula P13)

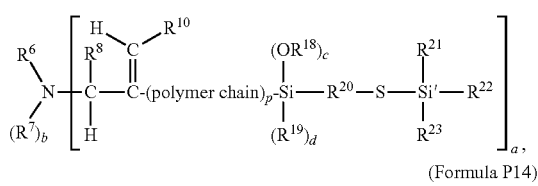

(Formula P14)

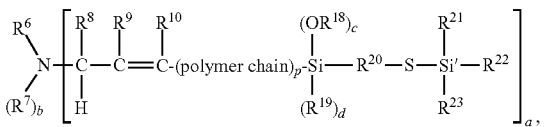

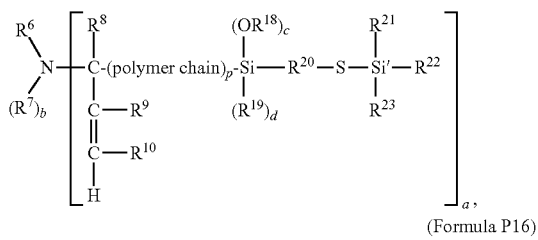
(Formula P15)

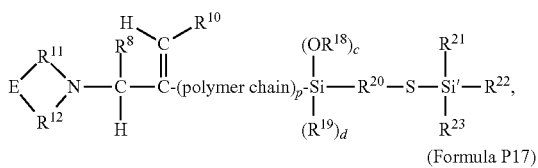
(Formula P16)

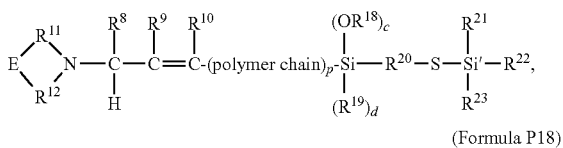
(Formula P17)

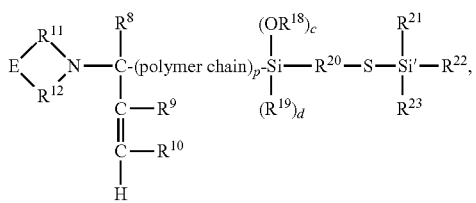
(Formula P18)

In the above formulas, the "polymer chain" is a polymer chain comprising p monomer units; N is a nitrogen atom, C is carbon atom, H is a hydrogen atom, Si and Si' are silicon atoms; S is sulfur atom; O is oxygen atom;

E is $(C_1-C_{18})$ alkyl, $(C_6-C_{18})$ aryl, $(C_7-C_{18})$ aralkyl, an oxygen atom (O), a sulfur atom (S), N—CHR$^8$—CR$^9$=CHR$^{10}$,

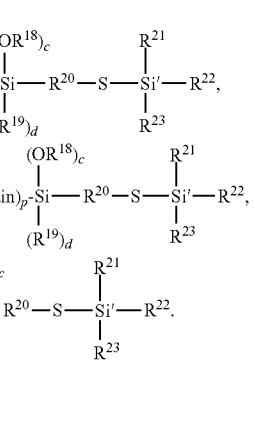

$R^8$, $R^9$ and $R^{10}$ are each independently selected from the group consisting of: hydrogen (H), $(C_1-C_{18})$ alkyl, $(C_6-C_{18})$ aryl, and $(C_7-C_{18})$ aralkyl; and $R^8$, $R^9$ and $R^{10}$ are each preferably independently selected from $(C_1-C_5)$ alkyl;

$R^{11}$ and $R^{12}$ are each divalent and each independently selected from the group consisting of: hydrogen (H), $(C_1-C_{18})$ alkyl, $(C_6-C_{18})$ aryl, and $(C_7-C_{18})$ aralkyl; and $R^{11}$ and $R^{12}$ are each preferably independently selected from $(C_1-C_5)$ alkyl;

$R^6$ is selected from the group consisting of: hydrogen (H), $(C_1-C_{18})$ alkyl, $(C_6-C_{18})$ aryl, $(C_7-C_{18})$ aralkyl, and —SiR$^{36}$R$^{37}$R$^{38}$, where R$^{36}$, R$^{37}$ and R$^{38}$ are each independently selected from the group consisting of: $(C_1-C_{18})$ alkyl, $(C_6-C_{18})$ aryl, and $(C_7-C_{18})$ aralkyl; R$^{36}$, R$^{37}$ and R$^{38}$ are each preferably independently selected from $(C_1-C_5)$ alkyl; and R$^6$ is preferably selected from $(C_6-C_{10})$ aryl or —SiR$^{36}$R$^{37}$R$^{38}$;

$R^7$ is selected from the group consisting of: hydrogen (H), $(C_1-C_{18})$ alkyl, $(C_6-C_{18})$ aryl, $(C_7-C_{18})$ aralkyl, —CHR$^8$—CR$^9$=CHR$^{10}$, and —SiR$^{51}$R$^{52}$R$^{53}$; where R$^{51}$, R$^{52}$ and R$^{53}$ are each independently selected from the group consisting of: $(C_1-C_{18})$ alkyl, $(C_6-C_{18})$ aryl, and $(C_7-C_{18})$ aralkyl; and R$^{51}$, R$^{52}$ and R$^{53}$ are each preferably independently selected from $(C_1-C_5)$ alkyl; and R$^7$ is preferably selected from $(C_6-C_{10})$ aryl, —CHR$^8$—CR$^9$=CHR$^{10}$, or —SiR$^{51}$R$^{52}$R$^{53}$;

$R^{18}$ is selected from the group consisting of: hydrogen (H), and $(C_1-C_6)$ alkyl;

$R^{19}$ is selected from the group consisting of: hydrogen (H), $(C_1-C_6)$ alkyl, $(C_6-C_{18})$ aryl, and $(C_7-C_{18})$ aralkyl; and $R^{19}$ is preferably selected from $(C_1-C_{10})$ alkyl;

$R^{20}$ is a divalent group selected from the group consisting of: an $(C_6-C_{18})$ aryl, a $(C_7-C_{18})$ alkylaryl, and a $(C_1-C_{18})$ alkyl; and each $R^{20}$ may be substituted with at least one substituent selected from the group consisting of: $(C_1-C_4)$ alkyl, $(C_1-C_4)$ alkoxy, $(C_7-C_{16})$ aryl, $(C_7-C_{16})$ aralkyl, nitrile, amine, $NO_2$, and thioalkyl. Preferably $R^{20}$ is a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, $R^{20}$ is a $(C_7-C_{25})$ alkylaryl, more preferably a $(C_7-C_{16})$ alkylaryl, most preferably a $(C_7-C_{12})$ alkylaryl.

$R^{21}$, $R^{22}$ and $R^{23}$ are the same or different, and are each independently selected from the group consisting of: hydrogen (H), $(C_1-C_{18})$ alkyl, $(C_1-C_{18})$ alkoxy, $(C_6-C_{18})$ aryl, and $(C_7-C_{18})$ aralkyl; and $R^{21}$, $R^{22}$ and $R^{23}$ are each preferably independently selected from $(C_1-C_5)$ alkyl. In another embodiment, $R^{21}$, $R^{22}$ and $R^{23}$ are each independently a $(C_1-C_{16})$ alkyl, more preferably a $(C_1-C_{12})$ alkyl, even more preferably a $(C_1-C_8)$ alkyl, and most preferably a $(C_1-C_4)$ alkyl.

The c is a number selected from the number 0, 1 and 2; d is a number selected from the number 0, 1 and 2; the sum of c and d is the number 2 (c+d=2); a is the number 1 or 2; and b is the number zero or one; and p is the number 500 to 40.000.

While not shown in Formula P13 to Formula P18, it will be understood that the subject compound(s) may include their corresponding Lewis base adducts and their corresponding oxidation products.

While not wishing to be bound by theory, the trialkyl-, triaralkyl, or triarylsilyl respective groups of Formulas 2A, 2C, 4A, P1, P2, P3, P4, P5, P6, P13, P14, P15, P16, P17 and P18, are each believed to function as a protective group, which prevents unintended subsequent reaction. These "protective" groups (—Si'R$^{21}$R$^{22}$R$^{23}$), (—Si'R$^{26}$R$^{27}$R$^{28}$), (—Si'R$^{32}$R$^{33}$R$^{34}$) and —SiR$^{36}$R$^{37}$R$^{38}$, may be removed by exposure to a compounds containing —OH groups, such water, alcohols, anionic acids or organic acids (for example, hydrochloric acid, sulfuric acid or carboxylic acids), thus forming an "un-protected" thiol (—SH) group. Such conditions are typically present during vulcanization. Depending on the polymer "work up" conditions, both the unprotected and/or protected modified polymers may be present. For example, steam stripping of a polymer solution containing the modified polymer according to Formula 2A, will remove a percentage of the protecting trialkyl, triaralkyl, or triarylsilyl groups, resulting in the unprotected thiol (—SH) group forming a percentage of compounds according to Formula 2B. The percentage of thiol groups can be very different, depending on to the structure of the R— group in the —SiR$_3$ moiety of the polymer macromolecule in Formula 2A, 2C, 4A, P1, P2, P3, P4, P5, P6, P13, P14, P15, P16, P17 and P18. Alternatively, a water-free work up procedure can be used for the preparation of the modified polymers according to Formula 2A, 2C, 4A, P1, P2, P3, P4, P5, P6, P13, P14, P15, P16, P17 and P18.

It is believed that the unprotected thiol (—SH) group of the modified polymer is reactive with both unsaturated portions of the polymer backbone, and fillers (such as silica and/or carbon black) present. This interaction is believed to result in the formation of bonds with polymer backbones or fillers, or in the case of some fillers, in electrostatic interactions, which result in more homogeneous distributions of filler within the polymer compositions.

The resulting polymer, comprising alpha-modified/branched-modified polymer macromolecules and alpha-modified/omega-modified polymer macromolecules, comprises one or more amine groups as represented by Formula 1A, 1B, 1C, 1D, 1E, 1F and 2C, and typically in a total amount from 0.0001 to 0.50 mmol/gram of polymer, preferably from 0.0005 to 0.25 mmol/gram, and more preferably from 0.0010 to 0.15 mmol/gram, and even more preferably from 0.0020 to 0.06 mmol/gram of polymer.

The resulting polymer, comprising alpha-modified/branched-modified polymer macromolecules and alpha-modified/omega-modified polymer macromolecules, preferably comprises sulfide groups, and the sulfide groups typically comprise trihydrocarbylsilyl protective groups, and thiol groups in a total amount from 0.0001 to 0.50 mmol/gram of polymer, preferably from 0.0005 to 0.25 mmol/gram, and more preferably from 0.0010 to 0.15 mmol/gram, and even more preferably from 0.0020 to 0.06 mmol/gram of polymer. In another embodiment, the sulfide groups are present in an amount ranging from 0.0001 to 0.50 mmol/gram of polymer, preferably ranging from 0.0005 to 0.25 mmol/gram, and more preferably ranging from 0.0010 to 0.15 mmol/gram, and even more preferably from ranging from 0.0020 to 0.06 mmol/gram of polymer. In another embodiment, the thiol groups are present in an amount ranging from 0.0001 to 0.50 mmol/gram of polymer, preferably ranging from 0.0005 to 0.25 mmol/gram, and more preferably ranging from 0.0010 to 0.15 mmol/gram, and even more preferably from ranging from 0.0020 to 0.06 mmol/gram of polymer.

For most applications, the modified polymer is preferably a homopolymer derived from a conjugated diolefin, a copolymer derived from a conjugated diolefin monomer with an aromatic vinyl monomer, and/or a terpolymer of one or two types of conjugated diolefins with one or two types of aromatic vinyl compounds.

Although there are no specific limitations regarding the content of 1,2-bonds and/or 3,4-bonds (hereinafter called "vinyl bonds") of the conjugation diolefin portion of the elastomeric polymer, for most applications, the vinyl bond content is preferably from 10 to 90 weight percentage, and particularly preferably from 15 to 80 weight percentage (based on total weight of polymer). If the vinyl bond content in a polymer is less than 10 weight percentage, the resulting product may have inferior wet skid resistance. If the vinyl content in the elastomeric polymer exceeds 90 weight percentage vinyl bonds, the product may exhibit compromised tensile strength and abrasion resistance, and relatively large hysteresis loss.

Although there are no specific limitations regarding the amount of aromatic vinyl monomer used in the subject modified polymer, in most applications, the aromatic vinyl monomers comprise from 5 to 60 weight percentage of the total monomer content, and more preferably from 10 to 50 weight percentage (based on total weight of polymer). Values less than 5 weight percentage may lead to reduced wet skid properties, abrasion resistance, and tensile strength; whereas values more than 60 weight percentage may lead to increased hysteresis loss. The modified elastomeric polymer may be a block or random copolymer, and preferably 40 weight percentage, or more, of the aromatic vinyl compound units are linked singly, and 10 weight percentage, or less, are of "blocks" in which eight or more aromatic vinyl compounds are linked successively. Copolymers falling outside this range often exhibit increased hysteresis. The length of successively linked aromatic vinyl units can be measured by an ozonolysis-gel permeation chromatography method developed by Tanaka, et al. (Polymer, Vol. 22, Pages 1721-1723 (1981)).

While dependant upon the specific polymer and desired end use application, the modified polymers of the present invention preferably have Mooney viscosity (ML 1+4, 100° C., as measured in accordance with ASTM D 1646 (2004), in the range from 20 to 150, and preferably from 30 to 100, using a Monsanto MV2000 instrument. If the Mooney viscosity (ML 1+4, 100° C.) is less than 20, abrasion resistance and hysteresis loss properties may be compromised. Moreover, tack and cold flow of the uncrosslinked elastomeric polymer are increased, resulting in difficult handling, poor green strength, and poor dimensional stability during storage. If the Mooney viscosity (ML 1+4, 100° C.) of the polymer is more than 150 MU, processability (filler incorporation and heat build up in the internal mixer, banding on the roll mill, extrusion rate, extrudate die swell, smoothness, etc.) or negatively impacted because compounding machinery used at the manufacturer of tires are not designed to handle such high Mooney rubber grades, and the cost of processing increases.

The preferred molecular weight distribution of the subject modified polymer, represented by the ratio of the weight average molecular weight to the number average molecular weight, ($M_w/M_n$), ranges preferably from 1.2 to 3.0.

Oils may be used in combination with the subject uncrosslinked elastomeric polymers to reduce viscosity or Mooney values, or to improve processability and various performance properties of vulcanized products. For example, see International Publication No. WO/2009/148932, and U.S. Publication 2005/0159513, each incorporated herein by reference.

Mentioned oils include MES (Mild Extraction Solvate), TDAE (Treated Distillate Aromatic Extract, RAE (Residual Aromatic Extract) including T-RAE and S-RAE, DAE including T-DAE and NAP (light and heavy naphthenic oils), including Nytex 4700, Nytex 8450, Nytex 5450, Nytex 832, Tufflo 2000, Tufflo 1200. Also native oils, including vegetable oils, can be used as extender oil. Aforementioned oils comprise different concentrations of polycyclic aromatic compounds, parafinics, naphthenics and aromatics, and have different glass transition temperatures. The above mentioned types of oil are characterized in journal "Kautschuk Gummi Kunststoffe", vol. 52, pages 799-805. The MES, RAE and TDAE are especially preferred extender oils for rubber.

In a preferred embodiment, the subject modified elastomeric polymer is combined and reacted with filler(s) and vulcanization agent, and, optionally, additional constituents, including, but not limited to, accelerators, coupling agents, and unmodified uncrosslinked elastomeric polymers.

The subject modified elastomeric polymer (include oil extended embodiments) preferably comprises at least 30 weight percentage of the total elastomeric polymer present, and more preferably at least 50 weight percentage. The remaining portion of the elastomeric polymer is unmodified elastomeric polymer. Examples of preferred unmodified elastomeric polymers are listed in 66798-WO-PCT, and preferably include styrene-butadiene copolymer, natural rubbers, polyisoprene, and polybutadiene are preferable. It is desirable that the unmodified polymers have a Mooney viscosity (ML 1+4, 100° C. (ASTM D 1646 (2004), as discussed above) in the range from 20 to 200, and preferably from 25 to 150. The subject composition preferably includes fillers, which serve as reinforcement agents.

Carbon black, silica, carbon-silica dual-phase-filler, clay, calcium carbonate, magnesium carbonate, lignin, amorphous fillers, such as glass particle based fillers, and the like, and mixtures thereof, are examples of suitable fillers. Examples of fillers are described in International Publication No. WO/2009/148932 fully incorporated herein by reference. Carbon black is typically added in an amount from 2 to 100 parts by weight, and preferably from 5 to 100 parts by weight, more preferably 10 to 100 parts by weight, and even more preferably 10 to 95 parts by weight, for 100 parts by weight of the total polymer.

For examples of silica filler diameters, particle sizes, and BET surfaces, see International Publication No. WO/2009/148932. In one embodiment, silica is added in an amount from 10 to 100 parts by weight, preferably 30 to 100 parts by weight, and even more preferably from 30 to 95 parts by weight, for 100 parts by weight of the total polymer.

In one embodiment, carbon black and silica are be added together, in which case the total amount of carbon black and silica added, is from 30 to 100 parts by weight, and preferably from 30 to 95 parts by weight for 100 parts by weight of the total polymer.

It is preferable to add a silane coupling agent (used for compatibilization of polymer and stated fillers) to the composition containing modified polymer as described herein and silica or carbon-silica dual-phase-filler, which is used as filler component. The typical amount of a silane coupling agent added is from about 1 to about 20 parts by weight, and preferably from 5 to 20 parts by weight, for 100 parts by weight of the total amount of silica and/or carbon-silica dual-phase-filler. Examples of silane coupling agent are given in International Publication No. WO/2009/148932, and include bis-(3-hydroxy-dimethylsilyl-propyl)tetrasulfide, bis-(3-hydroxy-dimethylsilyl-propyl)-disulfide, bis-(2-hydroxy-dimethylsilyl-ethyl)tetrasulfide, bis-(2-hydroxy-dimethylsilyl-ethyl)disulfide, 3-hydroxy-dimethylsilyl-propyl-N,N-dimethylthiocarbamoyltetrasulfide, 3-hydroxy-dimethylsilyl-propylbenzothiazole tetrasulfide.

Sulfur, sulfur-containing compounds, and peroxides are the most common vulcanizing agents. Examples for vulcanizing accelerators, and the amount of accelerator added with respect to the total polymer, are given in International Publication No. WO/2009/148932. Additional information regarding vulcanizing agents can be found in Kirk-Othmer, Encyclopedia of Chemical technology $3^{rd}$, Ed, Wiley Interscience, N.Y. 1982, volume 20, pp. 365-468, specifically "Vulcanizing Agents and Auxiliary Materials" pp. 390-402.

The polymer composition of the present invention can be prepared by kneading the above-described modified polymers (including oil extended varieties), unmodified polymers (including oil extended varieties), fillers (carbon black, silica, carbon-silica dual-phase-filler, etc.), silane coupling agents, oils, and other additives, in a kneader at 140° C. to 180° C., to form a filler containing formulation. After cooling, vulcanizing agents, such as sulfur, vulcanizing accelerators, and the like, are added to the aforementioned filler containing formulation, and the resulting mixture is blended using a Banbury mixer or open roll mill, to form the desired shape, and mixture is vulcanized at 140° C. to 180° C., to obtain a vulcanized article.

Because the vulcanized elastomeric polymer compositions of the present invention exhibit low rolling resistance, low dynamic heat build up, and superior wet skid performance, the polymer compositions of the present invention, and preferably compositions containing modified polymers as described herein and fillers, vulcanization agents, and the vulcanized elastomeric polymer compositions, are well suitable for use in preparing tires, tire treads, side walls, and tire carcasses, as well as other industrial products such as belts, hoses, vibration dampers, and footwear components.

Modified Polymers

Examples of applicable modified polymers include the following: modified BR—-polybutadiene; butadiene/C1-C4-alkyl acrylate copolymers; modified IR—polyisoprene; modified SBR—styrene/butadiene copolymers with styrene contents of 1 to 60, preferably 10 to 50 weight percent, including SSBR wherein the polymer was prepared in solution; modified SIR—styrene/isoprene copolymers with styrene contents of 1 to 60, preferably 10 to 50 weight percent including SSIR wherein the polymer was prepared in solution; modified IIR—-isobutylene/isoprene copolymers; modified IBR—isoprene/butadiene copolymers; modified NBR—butadiene/acrylonitrile copolymers; modified HNBR—partially hydrogenated or fully hydrogenated NBR rubber; and mixtures of theses rubbers; modified EPDM. The acronym "EPDM" represents a ethylene/propylene/diene copolymer.

In one embodiment, modified polymer is a modified polybutadiene.

In another embodiment, the modified polymer is a modified butadiene/$C_1$-$C_4$-alkyl acrylate copolymer.

In another embodiment, the modified polymer is a modified butadiene/styrene copolymer.

In another embodiment, the modified polymer is a modified butadiene/styrene copolymer (SSBR) prepared in solution.

In another embodiment, the modified polymer is a modified isoprene/styrene copolymer (SSIR) prepared in solution.

In another embodiment, the modified polymer is a modified butadiene/isoprene copolymer.

In another embodiment, the modified polymer is a modified polychloroprene.

In another embodiment, the modified polymer is a modified polyisoprene, including synthetic polyisoprene and natural rubber.

In another embodiment, the modified polymer is a modified polystyrene.

In another embodiment, the modified polymer is a modified styrene/butadiene copolymer with a styrene unit content from 1 to 60 weight percent, preferably from 10 to 50 weight percent, based on the total weight of the copolymer.

In another embodiment, the modified polymer is a modified styrene/butadiene copolymer with a 1,2-polybutadiene unit content from 5 to 70 weight percent, preferably from 50 to 70, or 5 to 25 weight percent, based on the total weight of polybutadiene unit fraction of the copolymer.

In another embodiment, the modified polymer is a modified styrene/isoprene copolymer with a styrene unit content from 1 to 60 weight percent, preferably from 10 to 50 weight percent, based on the total weight of the copolymer.

In another embodiment, the modified polymer is a modified styrene/isoprene copolymer with a 1,2-polyisoprene unit content from 5 to 70 weight percent, preferably from 50 to 70, or 5 to 25 weight percent, based on the total weight of polybutadiene unit fraction of the copolymer.

In another embodiment, the modified polymer is a modified butadiene/isoprene copolymer with an isoprene unit content from 0.1 to 70 weight percent, preferably from 5 to 50 weight percent, based on the total weight of the copolymer.

In another embodiment, the modified polymer is a modified isobutylene/isoprene copolymer.

In another embodiment, the modified polymer is a modified partially hydrogenated butadiene.

In another embodiment, the modified polymer is a modified partially hydrogenated styrene-butadiene copolymer.

Applications

The invention further includes the use of an inventive composition, comprising a modified polymer, comprising linear modified polymer macromolecules and branched modified branched polymer macromolecules, for vulcanized (or cross-linked) elastomeric polymer compositions, and articles made from such compositions, such as pneumatic tires, tire treads, belts, footwear components, and the like.

The subject cross-linked polymer compositions exhibit lower Tan δ at 60° C. values, higher Tan δ at 0° C. or higher Tan δ at –10° C., and a good balance of physical properties, including one or more of the following: abrasion resistance, tensile strength, modulus, heat build up, and tear, while compounds comprising the uncrosslinked elastomeric polymers (compounds prior to vulcanization) maintain good processing characteristics. The subject compositions are useful in preparing tire treads having lower rolling resistance, higher wet grip, higher ice grip, and lower heat built-up, while maintaining good wear properties. The inventive compositions including fillers such as carbon black, silica, carbon-silica dual phase filler, vulcanizing agents and the like, and inventive vulcanized elastomeric polymer compositions are particularly useful in preparation of tires.

The invention also provides an article comprising at least one component formed from an inventive composition. In a further embodiment, the article is a tire. In a further embodiment, the article is a tire tread. In a further embodiment, the article is a tire side wall. In another embodiment, the inventive article is an automotive part. In another embodiment, the inventive article is a footwear component. In another embodiment, the inventive article is a belt, a gasket, a seal, or a hose.

For producing vehicle tires, the following polymers are of particular interest: natural rubber; emulsion SBR and solution SBR rubbers with a glass transition temperature above –50° C., polybutadiene rubber with a high cis 1,4 content (>90%), which has been prepared using catalysts based on nickel, cobalt, titanium, gadolinium or neodymium; and polybutadiene rubber with a vinyl content of 0 to 75%; and their mixtures.

For producing vehicle tires furthermore, the following polymers are of particular interest: polybutadiene rubber with a high trans 1,4 content (>75%), or SBR preferably containing between 5 and 40 wt % styrene and a high trans 1,4-polybutadiene content (>75%) of the polybutadiene fraction of the copolymer, and which each type of polymer (SBR or BR) has been prepared with one or more initiator compounds comprising earth alkaline metal compounds, such as described for example in U.S. Pat. Nos. 6,693,160; 6,627,715; 6,489,415; 6,103,842; 5,753,579; 5,086,136 and 3,629,213, incorporated herein as reference, or by using catalysts based on cobalt, such as described for example in U.S. Pat. Nos. 6,310,152; 5,834,573; 5,753,761; 5,448,002 and 5,089,574, and U.S. Publication No. 20030065114, or by using catalysts based on vanadium, such as described for example in European Patent Application No. 1367069; Japanese Patent Application No. 11301794 and U.S. Pat. No. 3,951,936, or by using catalysts based on neodymium, such as described, for example, in European Patent Application Nos. EP0964008 and EP0924214 and in U.S. Pat. Nos. 6,184,168; 6,018,007; 4,931,376; 5,134,199 and 4,689,368.

The inventive compositions may also be used to form high impact polystyrene (HIPS) and butadiene modified acrylonitrile-styrene copolymer (ABS). For example see International Application No. PCT/US09/045,553, incorporated herein by reference.

DEFINITIONS

The invention provides a first composition comprising a modified polymer which comprises at least one branched modified polymer macromolecule (or alpha-modified/branched-modified polymer macromolecule) and at least one linear modified polymer macromolecule (or alpha-modified/omega-modified polymer macromolecule). The first composition may also comprises polymer macromolecules which are not modified with the modification agents of the invention (including coupling modifier agents, chain end modifiers or amine polymerization initiators), and may also comprise polymer macromolecules that are modified with other types of coupling or modification agents.

The term "linear modified polymer macromolecule (or alpha-modified/omega modified/polymer macromolecule, or linear modified polymer chain, or alpha-modified/omega-modified/-polymer chain)" refers to an individual polymer molecule that is formed when one alpha-modified living polymer macromolecule reacts (terminates) with a chain-end modifying agent (for example, see Formulas 4C). The linear modified polymer macromolecule comprises defined polar groups or moieties at the alpha end (group derived from an amine polymerization initiator compound) and at the omega end (group derived from a sulfanylsilane chain end modifying agent) of the polymer molecule. The phrase "alpha modified" refers to modification of the polymer at the alpha end with an amine polymerization initiator compound as described herein.

The term "branched modified polymer macromolecule (or alpha-modified/branched-modified polymer macromolecule, or branched modified polymer chain, or alpha-modified/branched-modified polymer chain)" refers to an individual polymer molecule that is formed when at least two living polymer chains, (at least one of the two polymer chains being alpha-modified), react (terminate) with a coupling agent (for example, see Formulas 2A, and 2C). The term "branched modified polymer macromolecule comprises at least two polymer chains being linked to the coupling point at their omega chain end positions, while at least one of the linked chains comprises at least one amine or an protected amine group (group derived from an amine or protected amine polymerization initiator compound) at the alpha position). This coupling point is also referred to as a "central capped position." In a branched modified polymer macromolecule, a polar group derived from an amine polymerization initiator compound is located at the "free" end of at least one polymer chain (or at least one polymer arm) end, thus not at the polymer chain (or polymer arm) end attached to the central capped position. Polar groups (derived from an initiator compound according to the invention) may, or may not, be present at each free end.

The modification of each modified macromolecule is formed in a process that uses at least three different types of modifier agents, particularly the use of the following: 1) at least one amine polymerization initiator, 2) at least one silane-based or stannane-based modifier compound as coupling agent, and 3) at least one sulfaylsilane chain end-modifying agent. The amine polymerization initiator reacts with monomers to form an "alpha-modified" living polymer macromolecule. The reaction of at least two living polymer macromolecules (at least one of them comprising a amine or protected amine group of the alpha end of the polymer macromolecule) with a coupling agent results in a branched modified polymer macromolecule. Here the "alpha-modified" polymer macromolecule (a reacted living alpha-modified polymer macromolecule) is linked to a silicon or tin atom derived from the coupling agent. The reaction of one "alpha-modified living polymer macromolecule" with one sulfanylsilane chain-end modifying agent results in a linear modified polymer macromolecule. Here, the "alpha-modified" polymer macromolecule (a reacted living alpha-modified polymer macromolecule) is linked via one valence on a silicon or tin atom, each derived from the sulfanylsilane chain-end modifier.

As discussed above, the term "linear modified polymer macromolecule" is also referred to as an "alpha-modified/omega-modified polymer macromolecule", to indicate that the macromolecule is modified at its alpha (first) end with a moiety derived from an amine polymerization initiator compound, and also at it omega (last) end with a moiety derived from the chain-end modifying agent. The term "branched modified polymer macromolecule" is also referred to as an "alpha-modified/branched-modified polymer macromolecule", to indicate that the macromolecule is modified at its alpha (first) end with a moiety derived from an amine initiator compound, and also within its chain by a moiety derived from the coupling modifier agent, to form a point of branching. Nitrogen containing Lewis bases suitable to initiate an anionic polymerization reaction are also called amine polymerization initiators (for example, see Formulas 1G-1L). Positions at the modified polymer resulting from the amine polymerization initiator correspond to Formulas 1A-1F. As discussed above, a position within the polymer resulting from the reaction of a coupling agent with at least two anionic living polymer chains (or alpha-modified living polymer macromolecules) is referred to as a "central cap" or as a "central capped position," and is located within the alpha-modified branched polymer macromolecule.

It is noted, that polymer macromolecules used for the preparation of branched modified polymer macromolecules, or linear modified polymer macromolecules, may already contain polymer chain branches. Such polymer chain branches may be formed prior to the coupling modification reaction and prior to the chain-end modification reaction. For example, such polymer branches may be formed in the course of the monomer polymerization process, or may be formed after contacting the living polymer macromolecules with Lewis bases, such as used as a randomizer component or as an accelerator of the polymerization rate. Such polymer branches can also be formed in the course of chain transfer reactions, initiated through the presence of an amine polymerization initiator, or precursor molecules of the amine polymerization initiator. It is furthermore noted, that branching points in polymer macromolecules, not comprising "central caps," can also be formed when a radical is formed at one position a polymer macromolecule, as result of exposure to UV radiation, or exposure to elevated temperature. A macromolecule containing a free radical can react with another polymer chain leading to interchain carbon-carbon bond formation. The terms "linear modified polymer macromolecules" and branched modified polymer macromolecules" do not exclude the presence of branches formed by these occasional side reactions discussed and other side reactions. For example branches can be formed when divinylaromatic or divinylaliphatic compounds are added to the polymerization mixture.

A sufficient amount of linear modified polymer macromolecules and branched modified polymer macromolecules are produced by using at least one amine polymerization initiator compound, at least one coupling agent, and at least one sulfanylsilane chain end-modifier compound, to provide a first (uncrosslinked) composition having an increased content of functionalized polymer macromolecules. The use of the first composition in a second composition, further comprising filler particles, will increase the interaction of the modified polymers with the filler particles, as well as increase the interaction of the modified polymers with unsaturations in polymer backbones. These interactions are particularly desirable when the polymer composition is vulcanized to produce a vulcanized or crosslinked elastomeric polymer composition. Polymers having an unsaturated polymer backbone include the modified polymers of the invention, or other polymers containing unsaturated carbon-carbon bonds, which are added to the first composition or to a second "filler containing" composition. The distribution of filler particles in the second composition will be improved, and the hysteresis loss in the corresponding vulcanizate will be decreased.

For a vulcanized polymer the gel content is preferably greater than 50 weight percent, more preferably greater than 75 weight percent and even more preferably greater than 90 weight percent, based on the weight of the polymer. Gel content can be determined by dissolving about 0.2 grams of polymer in 150 ml of toluene, for 24 hours, at ambient temperature, separating the insolubles, drying the insolubles, and measuring the amount of insolubles.

The term "alkyl," as used herein, refers to at least one aliphatic group, and may also refer to two or more aliphatic groups. The alkyl group may be linear, branched, cyclic, or a combination thereof, and saturated or unsaturated, and preferably the alkyl group is linear, branched, cyclic or a combination thereof, and saturated; more preferably the alkyl group is linear and saturated or branched and saturated. The term "alkyl" is understood to include both straight chain aliphatic hydrocarbon groups, (for example, methyl (Me), ethyl (Et), n-propyl (Pr), n-butyl (Bu), n-pentyl, n-hexyl, etc.), branched aliphatic hydrocarbon groups (for example, isopropyl, tert-butyl, etc.), and carbon based non-aromatic rings, aliphatic hydrocarbon groups. Here, "alkyl" refers to saturated linear, branched, cyclic, or combinations thereof, aliphatic hydrocarbon groups, and unsaturated, linear, branched, cyclic, or combinations thereof, aliphatic hydrocarbon groups. It is understood that an alkyl group used as $R^{20}$, $R^{29}$ and $R^{35}$ moiety, as described herein, would be at least divalent.

The term "aryl," as used herein, refers to at least one aromatic ring, and may also refer to two or more aromatic rings. The term "aryl" is understood to include phenyls, biphenyls and other benzenoid compounds, each optionally substituted with alkyl, alkoxy, or other heteroatoms, such as oxygen, nitrogen, sulfur and phosphorous containing moieties. It is understood that an aryl group used as a $R^{20}$, $R^{29}$ and $R^{35}$ moiety, as described herein, would be at least divalent.

The term "alkoxy" is understood to include methoxy (MeO), ethoxy (EtO), propoxy (PrO), butoxy (BuO), isoprop (iPrO), isobutoxy (iBuO), pentoxy, and the like.

The term "aralkyl," as used herein, refers to at least one aromatic ring, and also at least one alkyl group. The term "aralkyl" is understood to mean an aryl group bonded to an alkyl. It is understood that an aralkyl group used as $R^{20}$, $R^{29}$ and $R^{35}$, as described herein, would be at least divalent.

The designation of $(C_a-C_b)$, for example $(C_1-C_{12})$, as used herein, is intended to mean a range of carbon atoms from a to b, and includes all individual values and subranges from a to b.

EXAMPLES

The following Examples are provided in order to further illustrate the invention, and are not to be construed as limiting. The Examples include the preparation of the amine polymerization initiator precursor compounds, the preparation of the amine polymerization initiator compounds, the preparation of modified coupling agents, and the preparation of sulfanylsilane chain-end modifiers; the preparation and testing of modified polymers; and the preparation and testing of uncrosslinked, as well as of cross-linked, polymer compositions. Unless stated to the contrary, all parts and percentages are expressed on a weight basis. The term "overnight" refers to a time of approximately 16-18 hours, and "room temperature" refers to a temperature of about 20-25° C. The polymerizations were performed under exclusion of moisture and oxygen, in a nitrogen atmosphere. Various methods were used to test and measure the examples. A description of each technique is provided.

The ratio between the 1,4-cis-, 1,4-trans- and 1,2-polydiene content of the butadiene polymers or styrene-butadiene copolymers was determined by IR, $^1$H-NMR- and $^{13}$C-NMR-spectroscopy (NMR (Avance 400 device ($^1$H=400 MHz; $^{13}$C=100 MHz) of Bruker Analytic GmbH). The vinyl content in the conjugated diolefin part was additionally determined by IR absorption spectrum (Morello method, IFS 66 FT-IR spectrometer of Bruker Analytic GmbH). The IR samples were prepared using $CS_2$ as swelling agent.

Bonded styrene content: A calibration curve was prepared by IR absorption spectrum (IR (IFS 66 FT-IR spectrometer of Bruker Analytik GmbH). The IR samples were prepared using $CS_2$ as swelling agent). For the IR determination of the bound styrene in styrene-butadiene copolymers are four bands viewed: a) band for trans-1.4-polybutadiene units at 966 $cm^{-1}$, b) band for cis-1.4-polybutadiene units at 730 $cm^{-1}$, c) band for 1.2-polybutadiene units at 910 $cm^{-1}$ and band for bound styrene (styrene aromatic bond) at 700 $cm^{-1}$. The band heights are normed according to the appropriate extinction coefficients and summarized to a total of 100%. The normation is done via $^1$H- and $^{13}$-C-NMR. The styrene content was alternatively determined by NMR technique (NMR (Avance 400 device ($^1$H=400 MHz; $^{13}$C=100 MHz) of Bruker Analytik GmbH)).

Aromatic vinyl content as well as the was determined by NMR technique (NMR (Avance 400 device ($^1$H=400 MHz; $^{13}$C=100 MHz) of Bruker Analytik GmbH;)).

The 1D NMR spectra were collected on a BRUKER Avance 200 NMR spectrometer (BRUKER BioSpin GmbH), using a "5 mm Dual detection probe." The field homogeneity was optimized by maximizing the deuterium lock signal. The samples were shimmed by optimizing the deuterium lock signal. The samples were run at room temperature (298 K). The following deuterated solvents were used: $C_6D_6$ (7.15 ppm for $^1$H, 128.02 ppm for $^{13}$C), $CDCl_3$ (7.24 ppm for $^1$H, 77.03 ppm for $^{13}$C), $d_8$-THF (1.73, 3.58 ppm for $^1$H, 25.35 ppm for $^{13}$C), the signals of the remaining protons of deuterated solvents were each used as an internal reference.

For spectral processing, the BRUKER 1D WINNMR software (version 6.0) was used. Phasing, base line correction and spectral integration of the resulting spectra was done in the manual mode. For acquisition parameters see Table 1.

TABLE 1

| 1D-NMR acquisition parameters using BRUKER standard pulse sequences | | |
|---|---|---|
| | $^1$H-NMR | $^{13}$C-NMR |
| Observe frequency | 200.130 MHz | 50,323 MHz |
| Spectral width | 4139.073 Hz | 12562.814 |
| BRUKER Pulse program | Zg30 | Zgpg30 |
| Pulse angle | 30° | 30° |
| Relaxation delay | 1.0 s | 2.0 s |
| Number of Data points for FT | 32K | 32K |
| Line broadening | 0.5 Hz | 1 Hz |
| Number of accumulated scans | 64 | >1000 |

GPC-Method: SEC calibrated with narrow distributed polystyrene standard.

Sample Preparation:

a1) Oil free polymer samples: About "9-11 mg" dried polymer sample (moisture content <0.6%) was dissolved in 10 mL tetrahydrofurane, using a brown vial of 10 mL size. The polymer was dissolved by shaking the vial for 20 min at 200 u/min.

a2) oil containing polymer samples: About "12-14 mg" dried polymer sample (moisture content <0.6%) was dissolved in 10 mL tetrahydrofurane, using a brown vial of 10 mL size. The polymer was dissolved by shaking the vial for 20 min at 200 u/min.

b) Polymer solution was transferred into a 2 ml vial using a 0.45 μm disposable filter. The 2 ml vial was placed on a sampler for GPC-analysis. Elution rate: 1.00 mL/min. Injection volume: 100.00 μm (GPC-method B 50.00 μm)

The measurement was performed in THF at 40° C. Instrument: Agilent Series 1100/1200; Module setup: Iso pump, autosampler, thermostate, VW—Detector, RI— Detector, Degasser; Columns PL Mixed B/HP Mixed B.

In each GPC-device 3 columns were used in a connected mode. The length of each of the columns: 300 mm; Column Type: 79911 GP-MXB, Plgel 10 μm MIXED-B GPC/SEC Columns, Fa. Agilent Technologies (eigentlicher Hersteller ist auch Polymer Laboratories)

GPC Standards: EasiCal PS-1 Polystyrene Standards, Spatula A+B

Styrene Standard Manufacturer:

| | |
|---|---|
| Polymer Laboratories | Polymer Laboratories |
| Now entity of Varian, Inc. | Varian Deutschland GmbH |
| Website: http://www.polymerlabs.com | |

Polydispersity (Mw/Mn) was used as a measure for the width of molecular weight distribution. The calculation of Mw and Mn (weight average molecular weight (Mw) and number average molecular weight (Mn)), was based on one of two procedures.

The Mp1, Mp2, Mp3 correspond to the (maximum peak) molecular weight measured at the first, second or third peaks of the GPC curve [the first peak Mp1 (lowest molecular weight) is located on the right side of the curve, and the last peak (highest molecular weight) is located on the left side of the curve], respectively. Maximum peak molecular weight means the molecular weight of the peak at the position of maximum peak intensity. The Mp2 and Mp3 are two or three polymer chains coupled to one macromolecule. Mp1 is one polymer chain (base molecular weight—no coupling of two or more polymer chains to one macromolecule).

The total coupling rate represents the sum of the weight fractions of coupled polymers relative to the total polymer weight, including the sum of the weight fractions of all coupled polymers and the uncoupled polymer. The total coupling rate is calculated as shown below.

CR(total)=(ΣArea fraction of all coupled peaks [Peak with maximum Mp2 to peak with highest indexed peak maximum])/(ΣArea fraction of all peaks [Peak with peak maximum Mp1 to peak with highest indexed peak maximum]).

The individual coupling rate (e.g. two polymer arms coupled corresponding to the peak with peak maximum Mp2) is calculated as depicted below:

CR(2arms)=(Area fraction of peak with peak maximum Mp2)/(ΣArea fraction of all peaks [Peak with peak maximum Mp1 to peak with highest indexed peak maximum]).

GC-MS Investigation

TABLE 3

Conditions/Parameters of GC-MS Determination
GC 6890 coupled with mass selective detector MSD 5975

| Mass spectrometric conditions | | GC conditions | |
|---|---|---|---|
| Mass Spec. | MSD 5975 | Gas Chrom. | HP 6890 GC |
| Ionization mode: | Electron impact | Column: | 30 m × 0.25 mm × 0.25 μm, HP 5 MS |
| Electron voltage: | 70 V | Oven program: | 50° C. (2 min) 15° K/min up to 320° C. (5 min) |
| Emission current: | 35 mA | Carrier gas: | Helium, constant flow, 1 ml/min |
| Scan range: | 35-450 dalton | Injection: | Split (split ratio: 30) 1 μl |
| Multiplier | 950 V | Injector: Autosampler: | 270° C. Manuel injection |

Rubber compounds were prepared by combining the constituents listed below in Table 16, Table 17, Table 18 and Table 19, in a "380 cc Banbury mixer (Labstation 350S from Brabender GmbH&Co KG)," following a two-stage mixing process. Stage 1—mixed all components together, except the components of the vulcanization package, to form a stage 1 formulation. Stage 2—components of vulcanization package were mixed into stage I formulation to form a stage 2 formulation.

Mooney viscosity was measured according to ASTM D 1646 (2004), with a preheating time of one minute and a rotor operation time of 4 minutes, at a temperature of 100° C. [ML1+4(100° C.)], on a MV 2000E from Alpha Technologies UK. The rubber Mooney viscosity measurement is performed on dry (solvent free) raw polymer (unvulcanized rubber). The Compound Moony viscosity is measured on an uncured (unvulcanized) second state polymer compound sample prepared according to Tables 14 and 15. The Compound Mooney values are listed in Tables 20, 22 and 24.

Measurement of unvulcanized rheological properties was performed according to ASTM D 5289-95 (reapproved 2001), using a rotor-less shear rheometer (MDR 2000 E from Alpha Technologies UK) to measure Scorch Time (TS) and Time to Cure (TC). The rheometer measurement was performed at a constant temperature of 160° C. on an unvulcanized second stage polymer formulation, according to Tables 20, 22 and 24. The amount of polymer sample is about 4.5 g. Sample shape and shape preparation are standardized, and defined by the measurement device (MDR 2000 E from Alpha Technologies UK).

The "TC 50" and "TC 90" are the respective times required to achieve 50% and 90% conversion of the vulcanization reaction. The torque is measured as a function of time of reaction. The vulcanization conversion is automatically calculated from the generated torque versus time curve. The "TS 1" and "TS 2" are the respective times required to increase the torque by 1 dNm and 2 dNm above the respective torque minimum (ML) during vulcanization.

Tensile Strength, Elongation at Break and Modulus at 300% Elongation (Modulus 300) were measured according to ASTM D 412-98A (reapproved 2002), using a dumbell die C test pieces on a Zwick Z010. Of the standardized dumbbell die C test pieces, those of "2 mm thickness" were used. The tensile strength measurement was performed at room temperature, on a cured (vulcanized) second stage polymer sample, prepared according to Tables 21, 23 and 25. Stage 2 formulations were vulcanized within 16-25 minutes at 160° C. to TC 95 (95% vulcanization conversion) (see cure data in Tables 20, 22 and 24).

Heat build up was measured according to ASTM D 623, method A, on a Doli 'Goodrich'-Flexometer. The heat built up measurement was performed on a vulcanized second stage polymer samples according to Tables 20, 22 and 24. Stage 2 formulations were vulcanized at 160° C. to TC 95 (95% vulcanization conversion) (see cure data in Tables 20, 22 and 24).

Tan $\delta$ at 60° C. and Tan $\delta$ at 0° C., as well as Tan $\delta$ at −10° C. measurements, were performed on cylindrical specimen, using a dynamic mechanical thermal spectrometer "Eplexor 150N," manufactured by Gabo Qualimeter Testanlagen GmbH (Germany), by applying a compression dynamic strain of 0.2%, at a frequency of 2 Hz, at the respective temperatures. The smaller the index at a temperature of 60° C., the lower is the rolling resistance (lower=better). Tan δ (0° C.) was measured using the same equipment and load conditions at 0° C. The larger the index at this temperature, the better the wet skid resistance (higher=better). Tan $\delta$ at 60° C. and Tan $\delta$ at 0° C., as well as Tan $\delta$ at −10° C. were determined (see Tables 21, 23 and 25). Stage 2 formulations were vulcanized at 160° C. to TC 95 (95% vulcanization conversion) (see cure data in Tables 20, 22 and 24). The process leads to the formation of visually "bubble free," homogeneous cured rubber disc of "60 mm diameter" and "10 mm height." A specimen was drilled out of the aforementioned dish, and has a size of "10 mm diameter" and "10 mm height."

DIN abrasion was measured according to DIN 53516 (1987 Jun. 01). The larger the index, the lower the wear resistance is (lower=better). The abrasion measurement was performed on a vulcanized, second stage polymer formulation according to Tables 20, 22 and 24. Stage 2 formulations were vulcanized at 160° C. to TC 95 (95% vulcanization conversion) (see cure data in Tables 20, 22 and 24).

In general, the higher the values for Elongation at Break, Tensile Strength, Modulus 300, and Tan δ at 0° C., the better the sample performance; whereas the lower the Tan δ at 60° C. (Heat Build Up, and Abrasion), the better the sample performance. Preferably TS 1 is >1.5 minute, TS 2 is >2.5 minute, TC 50 is from 3 to 8 minutes, and TC 90 is from 8 to 19 minutes.

Modifier Preparation: Eleven Amine Polymerization Initiator Precursor compounds, three Amine Polymerization Initiator Compounds, three Coupling Agents, including one Modified Coupling Agent, and three Chain-End Modifier agents, were each prepared as an example. The structural formula and method of preparation (or source for obtaining) are provided below. The combined use of amine polymerization initiator compounds, coupling agents, and chain-end modifier agents, is representative for the present invention, whereas the combined use of initiator compounds lacking polar heteroatoms in the anionic moiety of the initiator compound (such as alkyl lithium initiator compounds, e.g. n-butyl lithium), coupling agents and chain-end modifier agents, is for comparative purposes.

Preparation of the Amine Polymerization Initiator Precursor Compounds

General Procedure for the Synthesis of Tertiary allyl Amines

A "500 ml" 3 neck flask, equipped with a reflux condenser and a magnetic stirrer, was charged with a secondary amine, with triethylamine, and with 200 ml of cyclohexane. A slight excess of allyl bromide was added, drop wise, while the reaction mixture was stirred at room temperature. The reaction mixture was stirred overnight at room temperature. The organic phase was removed from sticky insoluble oil, representing essentially triethylammonium bromide, $Et_3NHBr$. Subsequently, the solvent is distilled off. The raw product was purified by distillation.

Amine polymerization initiator precursor compound P1 is represented by Formula P1 below, and was prepared as follows:

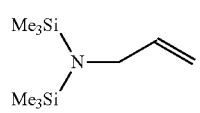

(Formula P1)

A "250 mL" Schlenk flask was charged with 100 mL tetrahydrofuran and with 0.1 mol potassium bis(trimethylsilyl)amide. A slight excess of allyl bromide (0.11 mol) was added, drop wise, while the reaction mixture was stirred at room temperature. The reaction mixture was stirred overnight at room temperature. Tetrahydrofurane solvent was removed under reduced pressure, and the crude product was diluted in pentane solvent. The pentane solution was filtered to remove potassium bromide. Then the pentane solvent was removed under reduced pressure. All volatile reaction components were removed under reduced pressure (10 mbar) at a temperature of 30° C. Boiling point of compound P1: 72° C./15 Torr; Isolated Yield: 68%; Purity according to GC 92%:

Amine polymerization initiator precursor compound P2 is represented by Formula P2 below, and was prepared as follows:

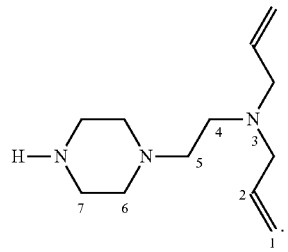

(Formula P2)

1-[2-Diallylamino)-ethyl]-piperazine P2 was purchased from Aldrich.

$^1$H-NMR (200 MHz, 23° C., CDCl$_3$): H-1, 5.66-5.86 ppm (ddt, 4H); H-2, 5.02-5.12 ppm (dd, 2H); H-3, 3.01, 3.04 ppm (d, 4H); H-4, H-5 2.77-2.81 ppm (t, 4H); H-2, H-1 2.33-2.56 ppm (m, 8H); —NH, 1.45 ppm (s, 1H). GCMS (EI, 70 eV): 1 peak at 7.65 min, M=209 g/mol.

Amine polymerization initiator precursor compound P3 is represented by Formula P3 below, and was prepared as follows:

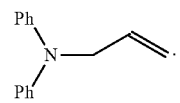

(Formula P3)

Synthesis was performed according to the general procedure for preparation of tertiary allyl amines, described above. The following amounts of reagents were used: 0.2264 mol diphenylamine, 0.2264 mol triethylamine and 0.2311 mol allylbromide. Triethylammonium bromide separated as brownish oil from the solution within 10 minutes. The solution was separated by decantation. The solvent was removed in vacuum. The obtained crude product was dissolved in 50 ml of pentane, and stored overnight at −35° C., in order to remove about "16 g" of a major crystalline impurity (33%) of unreacted diphenylamine. Raw product was distilled at reduced pressure 1.5 mbar. Compound P3 was isolated at a temperature of 118 to 119° C., and at a pressure of 1.5 mbar. A colorless transparent liquid was obtained. Yield: 24.0 g, 50%.

$^1$H-NMR (200 MHz, 23° C., CDCl$_3$) δ 7.18-7.28 (m, 4H, m-H of Ph), 6.98-7.05 (m, 4H, o-H of Ph), 6.86-6.96 (m, 2H, p-H of Ph), 5.91 (ddt, 1H, J1=17.18 Hz, J2=10.10 Hz, J3=4.80 Hz, CH2CH=CH2), 5.25 (dd, 1H, J1=17.18 Hz, J2=1.52 Hz, CH$_2$CH=CH$_2$), 5.14 (dd, 1H, J1=10.10 Hz, J2=1.52 Hz, CH$_2$CH=CH$_2$), 4.33 (d, 2H, J=4.80 Hz, CH$_2$CH=CH$_2$); 13C (50 MHz, 23° C., CDCl$_3$) δ 147.77 (Cq of Ph), 134.20 (CH$_2$CH=CH$_2$), 129.12 (m-C of Ph), 121.19 (p-C of Ph), 120.65 (o-C of Ph), 116.31 (CH$_2$CH=CH$_2$), 54.66 (CH$_2$CH=CH$_2$).

GCMS (EI, 70 eV): 1 peak at 14.62 min; 209 [M+] 100%.

Amine polymerization initiator precursor compound P4 is represented by Formula P4 below:

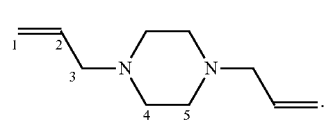

(Formula P4)

Procedure for preparation of 1,4-diallylpiperatzine P4: The reaction was carried out in 500 ml flask, equipped with reflux condenser and magnetic stirrer. The deprotonation of the secondary amino groups of piperazine was performed using triethylamine. The reactants piperazine and triethylamine were dissolved in 250 ml cyclohexane at RT (room temperature). In the following, the allyl bromide was added, drop wise, with a syringe, and the formulation stirred over night. A white waxy precipitate or an insoluble brownish oil could be observed. The organic phase was decanted from the insoluble fraction and the solvent, and the excess of agents, like allyl bromide and triethylamine, was removed by distillation at normal pressure up to a temperature of 100° C. The product was purified by distillation from the raw product under reduced pressure at 102° C. at 20 mbar. In detail, the amounts of agents stated in Table 6 were taken.

TABLE 6

Amounts of reaction components needed for preparation of compound P4

| Piperazine | 0.090 mol | (7.733 g) |
| Allyl bromide | 0.226 mol | (27.287 g) |
| TEA | 0.226 mol | (22.823 g) |

TABLE 6-continued

Amounts of reaction components needed for preparation of compound P4

| | |
|---|---|
| Reaction conditions | Over night at RT |
| Conversion crude product (GCMS, Area %) | Piperazine (none), Allyl-piperazine (13.5) 1,4-Diallyl-piperazine (86.5) |
| Yield/B.p.: | 51%/102° C. in vaccum (20 mbar) |

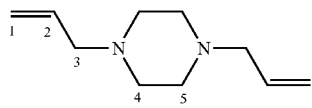

$^1$H-NMR (200 MHz, 23° C., CDCl$_3$): H-1, 5.65-5.85 ppm (ddt, 4H, J$_1$=17.18 Hz, J$_2$=10.11 Hz, J$_3$=6.57 Hz); H-2, 4.99-5.10 ppm (dd, 2H, J$_1$=17.18 Hz, J$_2$=10.11 Hz, J$_3$=6.57 Hz); H-3, ppm (dd, 4H, J$_1$=6.57 Hz); H-4, H-5 2.37 ppm (m, 4H). GCMS (EI, 70 eV): 1 peak at 7.65 min, M=166.27 g/mol.

Amine polymerization initiator precursor compound P5 is represented by Formula P5 below, and was prepared as follows:

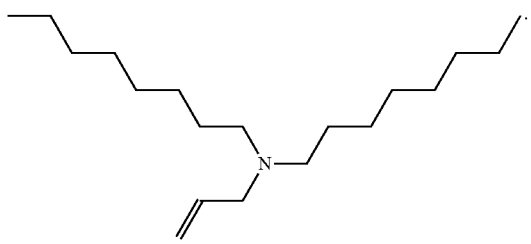

(Formula P5)

Synthesis was performed according to the general procedure for preparation of tertiary allyl amines, described above. The following amounts of reagents were used: 0.1037 mol di-n-octylamine, 0.1037 mol triethylamine and 0.1155 mol allylbromide. After 24 hours, the triethylammonium bromide separated as a large white crystalline precipitate from the solution. The solution was separated by filtration. Then, the solvent was removed in vacuum. The raw product was distilled at reduced pressure (1.5 mbar). Compound P5 was isolated at a temperature of 130-132° C. at 1.5 mbar. A colorless transparent liquid was obtained. Yield: 16.2 g, 57%.

$^1$H-NMR (200 MHz, 23° C., CDCl$_3$) 5.83 (ddt, 1H, J1=17.18 Hz, J2=10.10 Hz, J3=6.57 Hz, CH$_2$CH=CH$_2$), 5.12 (dd, 1H, J1=17.18 Hz, J2=2.02 Hz, CH$_2$CH=CH$_2$), 5.05 (dd, 1H, J1=10.10 Hz, J2=2.02 Hz, CH$_2$CH=CH$_2$), 3.04 (d, 2H, J=6.57 Hz, CH$_2$CH=CH$_2$), 2.36 (t, 4H, J=7.08 Hz, AllN(CH$_2$(CH$_2$)$_6$CH$_3$)$_2$), 1.32-1.50 (m, 4H, AllN(CH$_2$(CH$_2$)$_6$CH$_3$)$_2$), 1.24 (br. s, 20H, AllN(CH$_2$(CH$_2$)$_6$CH$_3$)$_2$), 0.85 (t, 6H, J=6.82 Hz, AllN(CH$_2$(CH$_2$)$_6$CH$_3$)$_2$).

GCMS (EI, 70 eV): 1 peak at 13.57 min, 281 [M+] 3%, 182 [M+-C7H15] 100%.

Amine polymerization initiator precursor compound P6 is represented by Formula P6 below, and was prepared as follows:

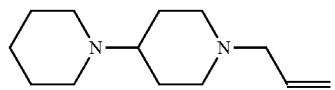

(Formula P6)

Synthesis was performed according to the general procedure for preparation of tertiary allyl amines, described above. The following amounts of reagents were used: 0.0600 mol 4-piperidino piperidine, 0.0600 mol triethylamine and 0.0693 mol allylbromide. Triethylammonium bromide separated as a large white crystalline precipitate from the solution within one hour. The solution was separated by filtration. Then the solvent was removed in vacuum. The obtained crude product was dissolved in 15 ml of pentane, and stored overnight at −35° C., in order to remove minor crystalline impurity of 4-piperidino piperidine. The raw product was then distilled at reduced pressure (2.4 mbar). Compound P6 was isolated at 99 to 101° C./2.4 mbar, as a colorless transparent liquid, which became yellow on standing. Yield: 7.5 g, 60%.

$^1$H-NMR (200 MHz, 23° C., CDCl$_3$) δ 5.83 (ddt, 1H, J1=17.18 Hz, J2=10.10 Hz, J3=6.57 Hz, CH$_2$CH=CH$_2$), 5.12 (dd, 1H, J1=17.18 Hz, J2=2.02 Hz, CH$_2$CH=CH$_2$), 5.08 (dd, 1H, J1=10.10 Hz, J2=2.02 Hz, CH$_2$CH=CH$_2$), 2.89-3.04 (m, 2H, AllN(CH$_2$CH$_2$)$_2$CHN), 2.92 (d, 2H, J=6.57 Hz, CH$_2$CH=CH$_2$), 2.42-2.49 (m, 4H, CHN(CH$_2$CH$_2$)$_2$CH$_2$), 2.14-2.32 (m, 1H, AllN(CH$_2$CH$_2$)$_2$CHN) 1.78-1.93 (m, 2H, AllN(CH$_2$CH$_2$)$_2$CHN), 1.62-1.78 (m, 2H, AlN(CH$_2$CH$_2$)$_2$CHN), 1.46-1.61 (m, 2+4H, AllN(CH$_2$CH$_2$)$_2$HN and CHN(CH$_2$CH$_2$)$_2$CH$_2$), 1.31-1.46 (m, 2H, CHN(CH$_2$CH$_2$)$_2$CH$_2$); $^{13}$C DEPT (50 MHz, 23° C., CDCl$_3$) δ 135.46 (CH$_2$CH=CH$_2$), 117.54 (CH$_2$CH=CH$_2$), 62.78 (AllN(CH$_2$CH$_2$)$_2$CHN), 61.82 (CH$_2$CH=CH$_2$), 53.48 (AllN(CH$_2$CH$_2$)$_2$CHN), 50.04 (CHN(CH$_2$CH$_2$)$_2$CH$_2$), 27.57 (AllN(CH$_2$CH$_2$)$_2$CHN), 26.42 (CHN(CH$_2$CH$_2$)$_2$CH$_2$), 24.80 (CHN(CH$_2$CH$_2$)$_2$CH$_2$). GCMS (EI, 70 eV): 1 peak at 13.66 min, 208 [M+] 20%, 123 [M+—C5H11N] 100%.

Amine polymerization initiator precursor compound P7 is represented by Formula P7 below, and was prepared as follows:

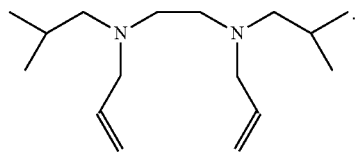

(Formula P7)

The content of a 250 mL Schlenk flask containing 0.43 mol lithium allyl(isopropyl)amide made from 0.43 mol allyl isopropyl amine and 0.43 mol n-butyllithium (15 wt % in n-hexane) in 125 mL tetrahydrofuran, was added drop wise to 1,2-dichloroethane (0.210 mole) in 25 mL tetrahydrofuran placed in a second Schlenk flask at room temperature. The reaction mixture was stirred overnight at room temperature. Then, 50 mL water was added to the THF solution. The resulting mixture was extracted using diethylether. The diethylether fractions were combined, and dried using sodium sulfate, filtered and the diethylether was removed under reduced pressure. All volatile reaction components were removed under reduced pressure (10 mbar), at a temperature of 30° C. Compound P7 was purified through distillation. Isolated Yield of P7: 52%; Purity according to GC 89%.

Amine polymerization initiator precursor compound P8 is represented by Formula P8 below, and was prepared as follows:

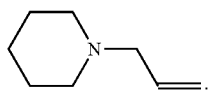

(Formula P8)

Synthesis was performed according to the general procedure for preparation of tertiary allyl amines, described above. The following amounts of reagents were used: 0.2022 mol piperidine, 0.2022 mol triethylamine and 0.2082 mol allylbromide. Triethylammonium bromide separated as a large white crystalline precipitate from the solution within 30 minutes. The solution was separated by filtration. Then, the solvent was removed at normal pressure (1 bar). The raw product was purified by distillation at normal pressure, and P8 was isolated at a boiling of 149 to 150° C. A colorless transparent liquid was obtained. Yield: 15.0 g, 60%.

$^1$H-NMR (200 MHz, 23° C., CDCl$_3$) δ 5.83 (ddt, 1H, J1=17.18 Hz, J2=10.10 Hz, J3=6.57 Hz, CH$_2$CH=CH$_2$), 5.10 (dd, 1H, J1=17.18 Hz, J2=2.02 Hz, CH$_2$CH=CH$_2$), 5.06 (dd, 1H, J1=10.10 Hz, J2=2.02 Hz, CH$_2$CH=CH$_2$), 2.90 (d, 2H, J=6.57 Hz, CH$_2$CH=CH$_2$), 2.29-2.34 (m, 4H, N(CH$_2$CH$_2$)$_2$CH$_2$), 1.48-1.59 (m, 4H, N(CH$_2$CH$_2$)$_2$CH$_2$) 1.31-1.44 (m, 2H, N(CH$_2$CH$_2$)$_2$CH). GCMS (EI, 70 eV): I peak at 6.54 min, 124 [M+] 85%, 98 [M+-CH2=CH]100%.

Amine polymerization initiator precursor compound P9,4-Allyl-morpholine, is represented by Formula P9 below:

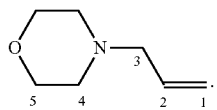

(Formula P9)

Procedure for preparation of 4-Allyl-morpholine P9: The reaction was carried out in 500 ml flask equipped with reflux condenser and magnetic stirrer. The deprotonation of the secondary amino group of morpholine was performed by using triethylamine. The reactants morpholine and triethylamine were dissolved in "250 ml cyclohexane" at RT. In the following, the allyl bromide was added, drop wise, with a syringe, and the formulation stirred over night. The reactions showed an exothermic characteristic during the introduction period, and a white waxy precipitate, or a insoluble brownish oil, could be observed. The organic phase was decanted from the insoluble fraction, and the solvent, and the excess of agents like allyl bromide and triethylamine, were removed by distillation, at normal pressure, and up to a temperature of 100° C., or in vacuum. The product was purified by distillation of from the raw product under normal pressure, or in vacuum. In detail the amount of reaction components, as stated in Table 7, were used.

TABLE 7

Reaction components used for preparation of compound P9

| | | |
|---|---|---|
| Morpholine | 0.157 mol | (13.699 g) |
| Allyl bromide | 0.165 mol | (19.975 g) |
| TEA | 0.165 mol | (16.707 g) |
| Reaction conditions | Over night at RT | |
| Conversion crude product (GCMS, Area %) | Morpholine (1.7), N-allyl-morpholine (95.5) | |
| Yield | 41% | 8.2 g |

$^1$H-NMR (200 MHz, 23° C., CDCl$_3$): H-1, 5.66-5.86 ppm (ddt, 4H, J$_1$=16.67 Hz, J$_2$=10.11 Hz, J$_3$=6.57 Hz); H-2, 5.05-5.15 ppm (dd, 2H, J$_1$=16.67 Hz, J$_2$=10.11 Hz, J$_3$=6.57 Hz); H-3, ppm (d, 4H, J$_3$=6.57 Hz); H-4, ppm (dt, 4H, J$_1$=9.10 Hz); H-5, ppm (dt, 4H, J$_1$=9.10 Hz). GCMS (EI, 70 eV): 1 peak at 5.29 min, M=127.19 g/mol.

Amine polymerization initiator precursor compound P10 is represented by Formula P10 below, and was prepared as follows:

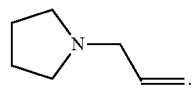

(Formula P10)

Synthesis was performed according to the general procedure for preparation of tertiary allyl amines, described above. The following amounts of reagents were used: pyrrolidine 0.2396 mol, triethylamine 0.2396 mol and allylbromide 0.2500 mol. Triethylammonium bromide separated as brownish oil from the solution. The solution was separated by decantation, and the solvent was removed at normal pressure (1 bar). The raw product was purified by distillation at normal pressure, and compound P10 was isolated at a boiling point of 120 to 122° C. Yield: 13.6 g, 51%.

$^1$H-NMR (200 MHz, 23° C., CDCl$_3$) δ 5.88 (ddt, 1H, J1=17.18 Hz, J2=10.10 Hz, J3=6.57 Hz, CH$_2$CH=CH$_2$), 5.13 (dd, 1H, J1=17.18 Hz, J2=2.02 Hz, CH$_2$CH=CH$_2$), 5.03 (dd, 1H, J1=10.10 Hz, J2=2.02 Hz, CH$_2$CH=CH$_2$), 3.05 (d, 2H, J=6.57 Hz, CH$_2$CH=CH$_2$), 2.41-2.48 (m, 4H, N(CH$_2$CH$_2$)$_2$), 1.70-1.76 (m, 4H, N(CH$_2$CH$_2$)$_2$). GCMS (EI, 70 eV): 1 peak at 4.71 min, 110 [M+] 100%.

Amine polymerization initiator precursor compound P11 is represented by Formula P11 below, and was prepared as follows below.

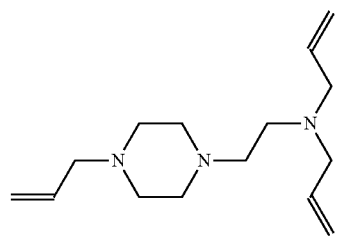

(Formula P11)

The agent 1-(2-Aminoethylamine)-piperazine was dissolved in methanol/NaOMe solution, and allyl bromide was added slowly. The solvent was removed by distillation, and the raw product was extracted with cyclohexane. Cyclohexane solvent was distilled off after completion of the extraction at normal pressure (1 bar) at elevated temperature. A brownish transparent liquid was obtained.

TABLE 8

Reaction components used for preparation of compound P11

| | | |
|---|---|---|
| 1-(-Aminoethyl)-piperazine | 0.090 mol | (7.733 g) |
| NaOMe | 0.226 mol | (27.287 g) |
| Allyl bromide | 0.226 mol | (22.823 g) |
| Reaction conditions | Over night at RT | |
| Yield of the Raw Product containing 75% of compound P11 (accord. to GCMS, (Area %)) | | 16.3 g |

GCMS (EI, 70 eV): 1 peak at 12.04 min, M = 249 g/mol ($C_{15}H_{27}N_3$).

Initiator Compounds n-Buyllithium purchased from Aldrich as a 20 wt % solution in cyclohexane was denoted as "initiator I1."

Preparation of the Amine Polymerization Initiator Compounds

Preparation of Amine polymerization initiator compound 12

Reaction of N-allyl bis(trimetyhlsilyl)amine P1 with n-BuLi/TMEDA

The reaction was performed in an inert atmosphere. Dried n-BuLi (0.046 g/0.72 mmole; hexane solvent was removed under low pressure) was mixed with 0.084 g (0.73 mmol) of TMEDA contained in 0.6 ml of $C_6D_6$. Then 0.147 g (0.73 mmol) of N-allyl bis(trimethylsilyl)amine P1 were added at room temperature. No n-butyl lithium could be observed in the $^1$H-NMR spectrum performed 10 minutes after completion of the above described preparation procedure. Another reaction performed at the reaction temperature of 50° C., using identical compound amounts, also led to the identical reaction product. Also, here no n-butyl lithium could be detected by NMR spectroscopy. Accordingly, the formation of amine polymerization initiator compound 12 occurs very quickly and quantitatively with a broad temperature range of reaction.

Preparation and NMR Investigation of Amine Polymerization Initiator Compound 13

Reaction of N-allyl Pyrrolidine P10 with n-BuLi/TMEDA

The reaction was performed in an inert atmosphere. Dried n-BuLi (0.050 g (0.78 mmol); hexane solvent was removed under low pressure) was mixed with 0.081 g (0.70 mmol) of TMEDA contained in 0.6 ml of $C_6D_6$. Then 0.078 g (0.70 mmol) of N-allyl pirrolidine P10 were added at room temperature. The $^1$H-NMR spectrum performed 10 minutes after completion of the above described preparation procedure showed 100% formation of allyl lithium salt, adduct with TMEDA.

$^1$H-NMR (200 MHz, 23° C., $C_6D_6$) δ 6.27 (td, 1H, J1=11.37 Hz, J2=5.56 Hz, CHLi—CH=CH$_2$), 4.22 (d, 1H, J=5.56 Hz, CHLi—CH=CH$_2$), 2.73-2.83 (m, 4H, N(CH$_2$CH$_2$)$_2$), 2.00 (s, 12H, NMe$_2$ of TMEDA), 1.98 (s, 4H, NCH$_2$ of TMEDA), 1.90 (d, 2H, J=11.37 Hz, CHLi—CH=CH$_2$), 1.60-1.70 (m, 4H, N(CH$_2$CH$_2$)$_2$); $^{13}$C (50 MHz, 23° C., $C_6D_6$) δ 133.67 (CHLi—CH=CH$_2$), 96.54 (CHLi—CH=CH$_2$), 56.92 (NCH$_2$ of TMEDA), 54.24 (N(CH$_2$CH$_2$)$_2$), 52.40 (CHLi—CH=CH$_2$), 46.09 (NMe$_2$ of TMEDA), 24.23 (N(CH$_2$CH$_2$)$_2$).

Preparation and NMR Investigation of Amine Polymerization Initiator Compound 14

Reaction of Diphenyl Allyl Amine P3 with n-BuLi/TMEDA

The reaction was performed in an inert atmosphere. Dried n-BuLi (0.050 g (0.78 mmol); hexane solvent was removed under low pressure) was mixed with 0.081 g (0.70 mmol) of TMEDA contained in 0.6 ml of $C_6D_6$. Then 0.150 g (0.70 mmol) of diphenyl allyl amine P3 were added at room temperature.

The $^1$H-NMR spectrum performed 10 minutes after completion of the above described preparation procedure showed 90% formation of allyl lithium salt, adduct with TMEDA.

The conversion level maintained at 90% when the final reaction mixture was warmed up to 55° C. for one hour according to a second $^1$H-NMR measurement.

$^1$H-NMR (200 MHz, 23° C., $C_6D_6$) δ 7.39-7.45 (m, 4H, o-H of Ph), 7.09-7.18 (m, 4H, m-H of Ph), 6.72-6.81 (m, 2H, p-H of Ph), 6.21 (dd, 1H, J1=12.12 Hz, J2=5.81 Hz, CHLi—CH=CH$_2$), 4.58 (d, 1H, J=5.81 Hz, CHLi—CH=CH$_2$), 1.92 (d, 2H, J=12.12 Hz, CHLi—CH=CH$_2$), 1.77 (s, 12H, NMe$_2$ of TMEDA), 1.70 (s, 4H, NCH$_2$ of TMEDA); 13C (50 MHz, 23° C., $C_6D_6$) δ 148.61, 128.87, 121.07, 120.15 (aromatic carbons), 133.44 (CHLi—CH=CH$_2$), 87.41 (CHLi—CH=CH$_2$), 56.65 (NCH$_2$ of TMEDA), 45.85 (NMe$_2$ of TMEDA), 31.90 (CHLi—CH=CH$_2$).

Coupling Modifier Agents

Coupling Agent C1 is represented by Formula C1. Tin tetrachloride (C1) was purchased from Aldrich.

SnCl$_4$ (Formula C1)

Coupling Agent C2 is represented by Formula C2. Silicon tetramethoxide (C2) was purchased from Aldrich.

Si(OMe)$_4$ (Formula C2)

Coupling Agent C3 is represented by Formula C3, and was prepared as follows.

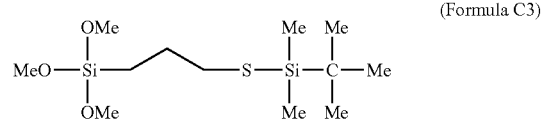 [SMILES: CO[Si](CCCS[Si](C)(C)C(C)(C)C)(OC)OC]

(Formula C3)

Preparation Pathway 1 (C3):

To a 100 mL Schlenk flask was charged 25 ml tetrahydrofuran (THF), 79.5 mg (10 mmol) lithium hydride, and subsequently, 1.80 g (10 mmol) gamma-mercaptopropyl trimethoxy silane [Silquest A-189] from the Cromton GmbH. The reaction mixture was stirred for 24 hours at room temperature, and another two hours at 50° C. Than tert-butyl dimethyl chloro silane (1.51 g (10 mmol)) was dissolved in 10 g THF, and the resulting solution was then added drop wise to the Schlenk flask. Lithium chloride precipitated. The suspension was stirred for about 24 hours at room temperature, and for another two hours at 50° C. The THF solvent was removed under vacuum. Then cyclohexane (30 ml) was added. The white precipitate was subsequently separated by filtration. The cyclohexane solvent was removed under vacuum (under reduced pressure). The resulting colorless liquid solution proved to be 99% pure per GC, and therefore no further purification was necessary. A yield of 2.9 g (9.2 mmol) of modified coupling agent 1 was obtained.

Alternative Preparation Pathway 2 (C3):

To a 100 mL Schlenk flask was charged 1.80 g (10 mmol) gamma-mercaptopropyl trimethoxy silane [Silquest A-189] from the Cromton GmbH, 25 ml tetrahydrofuran (THF), and subsequently, 0.594 g (11 mmol) sodium methanolate (NaOMe) dissolved in 10 mL THF. The reaction mixture was stirred for 18 hours at room temperature. Then tert-butyl dimethyl chloro silane (1.51 g (10 mmol)) was dissolved in 10 g THF, and the resulting solution was then added drop wise to the Schlenk flask. Sodium chloride precipitated. The suspension was stirred for about 24 hours at room temperature, and for another two hours at 50° C. The THF solvent was removed under vacuum. Then cyclohexane (30 ml) was added. The white precipitate was subsequently separated by filtration. The cyclohexane solvent was removed under vacuum (under reduced pressure). The resulting colorless liquid solution proved to be 89% pure per GC. Further purification consisted in a fractionated distillation, and a yield of 2.2 g (7.2 mmol) of modified coupling agent C3 was obtained.

Chain-End Modifier Agents

Chain End Modification Agent E2 is represented by Formula E2, and was prepared as follows.

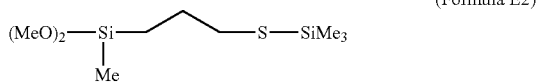

(Formula E2)

A 250 mL Schlenk flask was charged with 100 g cyclohexane, 8.6 g (85 mmol) triethylamine and 14.4 g (79.8 mmol) gamma-mercaptopropyl (methyl)dimethoxysilane from the ABCR GmbH. Trimethyl chloro silane (17.4 g (160 mmol)) was diluted with 50 g cyclohexane, and the resulting solution was then added drop wise to the Schlenk flask. Immediately, a white triethylammonium chloride precipitated. The suspension was stirred for about 24 hours at room temperature, and for another three hours at 60° C. The white precipitate was subsequently separated by filtration. The resulting colorless solution was distilled under vacuum to yield 17.2 g (68.1 mmol) of end modification agent E2.

Chain End Modification Agent E3 is represented by Formula E3 below, and was prepared as follows:

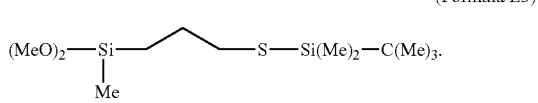

(Formula E3)

The preparation of chain end modification agent E3 was performed as described for modified coupling agent C3 above, except in both preparation pathways, the stated gamma-mercaptopropyl trimethoxy silane [10 mmol; Silquest A-189], from the Cromton GmbH, was replaced by gamma-mercaptopropyl (methyl)dimethoxysilane (10 mmole) from the ABCR GmbH.

If the preparation of chain end modifier E3 is performed according to "preparation pathway 1," a yield of 2.7 g (9.3 mmol) of compound E3 was obtained.

If the preparation of chain end modifier E3 is performed according to "preparation pathway 2," a yield of 2.3 g (7.9 mmol) of compound E3 was obtained.

Chain End Modification Agent E4 is represented by Formula E4 below, and was purchased from Aldrich.

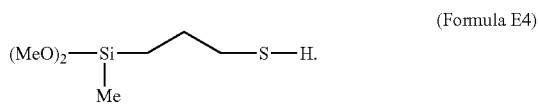

(Formula E4)

Homopolymerization of 1,3-Butadiene

A) Amine Polymerization Initiator Compound Preparation

Procedure of preparation of amine polymerization initiator compound from amine polymerization initiator precursor compound for application in an anionic 1,3-butadiene polymerization.

The reaction was performed in an inert atmosphere in a dry box. The n-butyl lithium (7.76 g (18.19 mmol)), as a 15 wt % solution in hexane, was mixed with 2.12 g (18.19 mmol) of TMEDA. The pale-yellow solution was then added dropwise to a solution of 18.19 mmol of the amine polymerization initiator precursor compound (tertiary allyl amine) in 5 ml of cyclohexane. The reaction solution turned orange to deep red. The reaction mixture was stirred at RT for one hour, and then added, without further purification, to a solution of 1,3-butadiene in cyclohexane, to start the butadiene polymerization. In all cases, low Mw polybutadiene (Mw~Mn~1000) was formed.

TABLE 9

Butadiene polymerization components and polymerization conditions

| Initiator precursor | Mass Initiator precursor (g) | Individual Amount Initiator precursor, n-BuLi & TMEDA (mmol) | Solubility amine polymerization initiator compound in cyclohexane solvent | Solubility polar initiator compound in solution in an argon or nitrogen atmosphere at room temperature |
|---|---|---|---|---|
| N-Allyl pirrolidine P8 | 2.03 | 18.19 | good | >24 hr's |
| N-Allyl piperidine P10 | 2.28 | 18.19 | good | >24 hr's |
| N-Allyl-4-piperidino piperidine P6 | 3.79 | 18.19 | good | >24 hr's |
| Dioctyl allyl amine P5 | 5.12 | 18.19 | good | >24 hr's |
| Diphenyl allyl amine P3 | 3.80 | 18.19 | good | >24 hr's |

B) Polybutadiene Low Molecular Weight Preparation

The polymerizations were performed in a double wall, 2 L glass reactor, equipped with thermostating unit, which was purged with nitrogen before the addition of the cyclohexane solvent, the amine polymerization initiator compounds, 1,3-butadiene monomer, and optionally, chain-end modifier agents. Cyclohexane solvent (400 g) was added into the reactor at ambient temperature. The polymerization reactor was then adjusted to a temperature of 55° C., and the solvent was stirred. Then a solution of 18.19 mmol of a separately prepared amine polymerization initiator compound was injected into the polymerization vessel. The reactor was allowed to stir for several minutes, in order to reach an average temperature of 55° C., and then 1,3-butadiene (10 g) was added to start the polymerization reaction. The polymerization was performed for a period varying between 60 and 140 minutes, at a temperature of 55° C.

For the termination of the polymerization process, the polymer solution was removed from the polymerization vessel into a separate container. The polymer was stabilized with "0.1 g IRGANOX 1520." The resulting polymer solution was then dried in vacuum for 8 hours at 55° C., forming a sticky colorless to pale-brown oil. The polybutadienes were characterized using $^1$H-NMR spectroscopy and CI MS. Details about the polymerization conditions and low molecular weight polymers are summarized in the table below.

TABLE 10

Polymerization Conditions

| Initiator | Reaction time (min) | Monomer Conversion[1] (wt %) | Avg. mon. units | Mw |
|---|---|---|---|---|
| Li-salt of N-allyl pirrolidine, adduct with TMEDA | 60 | 100 | 11 | 708 |
| Li-salt of N-allyl piperidine, adduct with TMEDA | 60 | 100 | 15 | 937 |
| Li-salt of N-allyl-4-piperidino piperidine, adduct with TMEDA | 77 | 81 | 19 | 1236 |
| Li-salt of dioctyl allyl amine, adduct with TMEDA | 60 | 100 | 8 | 714 |
| Li-salt of diphenyl allyl amine, adduct with TMEDA | 140 | 33 | 4 | 426 |
| Li-salt of N-allyl pirrolidine, adduct with TMEDA | 60 | 100 | 13 | 1035 |

[1]Monomer Conversion was measured as polymer solid content representing the weight of polymer after removal of the polymerization solvent and potentially available volatile components.

Copolymerization of 1,3-Butadiene with Styrene (Examples 1-33)

The co-polymerizations were performed in a double wall, 20 liter steel reactor, which was first purged with nitrogen, before the addition of organic solvent, monomers, polar coordinator compound, initiator compound or other components. The polymerization reactor was tempered to 60° C., unless stated otherwise. The following components were than added in the following order: cyclohexane solvent (9000 grams); butadiene monomer, styrene monomer, tetramethylethylene diamine (TMEDA), and the mixture was stirred for one hour, followed by titration with n-butyl lithium to remove traces of moisture or other impurities. The amine polymerization initiator precursor compound was added into the polymerization reactor. Subsequently, additional n-butyl lithium was added, to form in-situ the amine polymerization initiator compound, and to initiate the polymerization reaction. The polymerization was performed for 80 minutes, not allowing the polymerization temperature to exceed 60° C. Afterwards, 0.5% of the total butadiene monomer amount was added, followed by the addition of the coupling agent. The mixture was stirred for 20 minutes. Subsequently, 1.8% of the total butadiene monomer amount was added, followed by the addition of the chain end modifier, unless stated otherwise. For the termination of the polymerization process, the polymer solution was transferred, after 45 minutes, into a separate double wall, steel reactor, containing 100 mL ethanol, 1.4 g of concentrated HCl (concentration 36%), and 5 g IRGANOX 1520 as stabilizer for the polymer. This mixture was stirred for 15 minutes. The resulting polymer solution was than stripped with steam for one hour to remove solvent and other volatiles, and dried in an oven at 70° C. for 30 minutes, and than additionally for one to three days, at room temperature.

The resulting polymer composition and several of its properties are summarized in Tables 14 and 25 below. Unless otherwise stated, quantities are expressed in mmols. Examples prepared under identical polymerization conditions (in the same polymerization reactor, on the same day, by the same operator) are designated with identical letters adjacent to the Example number (e.g. 1A, 2A).

The use of a dash "-" in the tables below indicates that no constituent was added. The abbreviation "N.M." is intended to mean that no measurement was taken, or that corresponding data was unavailable.

TABLE 14

Composition of Examples - amounts of reagents for polymerization

| Ex. | Amine polym. initiator precursor (P) (mmol) | Coupling agent (mmol) | Modified Chain-End Modifier (mmol) | butadiene (mol) | styrene (mol) | TMEDA (mol) | n-butyl lithium (I1) or amine initiator (I2) (mol) |
|---|---|---|---|---|---|---|---|
| 5B | (—) 0 | (C1) 0.461 | (E2) 5.188 | 14.58 | 2.017 | 10.37 | (I2) 10.18 |
| 6B | (—) 0 | (C1) 1.340 | (E2) 14.969 | 42.63 | 5.881 | 30.336 | (I1) 17.869 |
| 7C | (—) 0 | (C2) 0.717 | (—) 0 | 12.37 | 2.165 | 10.056 | (I1) 2.548 |
| 9C | (—) 0 | (C2) 0.717 | (E3) 1.718 | 12.43 | 2.158 | 10.056 | (I1) 2.540 |
| 8C | (P1) 2.509 | (C2) 0.715 | (E3) 1.718 | 12.41 | 2.158 | 10.056 | (I1) 2.554 |
| 10D | (—) 0 | (C2) 0.309 | (—) 0 | 12.49 | 2.171 | 8.206 | (I1) 1.889 |
| 11D | (P1) 2.048 | (C2) 0.307 | (E3) 1.797 | 12.46 | 2.169 | 8.296 | (I1) 2.041 |
| 12E | (—) 0 | (C1) 0.314 | (E3) 3.726 | 13.00 | 1.808 | 8.920 | (I1) 4.454 |
| 13E | (P2) 2.217 | (C1) 0.314 | (E3) 5.263 | 12.97 | 1.801 | 8.890 | (I1) 6.045 |
| 14E | (P3) 4.435 | (C1) 0.311 | (E3) 3.725 | 12.99 | 1.801 | 8.890 | (I1) 5.662 |
| 12G | (—) 0 | (C1) 0.314 | (E3) 3.726 | 13.00 | 1.808 | 8.920 | (I1) 4.454 |
| 19G | (P5) 4.435 | (C1) 0.309 | (E3) 3.725 | 12.97 | 1.802 | 8.920 | (I1) 4.459 |
| 20G | (P6) 4.435 | (C1) 0.311 | (E3) 3.725 | 12.98 | 1.800 | 8.920 | (I1) 4.466 |
| 22H | (P7) 6.125 | (C1) 0.459 | (—) 0 | 14.58 | 2.017 | 10.384 | (I1) 6.125 |
| 23H | (—) 0 | C1) 0.467 | (—) 0 | 14.70 | 2.032 | 10.483 | (I1) 6.182 |
| 12I | (—) 0 | (C1) 0.314 | (E3) 3.726 | 13.00 | 1.808 | 8.920 | (I1) 4.454 |
| 20I | (P6) 4.435 | (C1) 0.311 | (E3) 3.725 | 12.98 | 1.800 | 8.920 | (I1) 4.466 |
| 19I | (P5) 4.435 | (C1) 0.309 | (E3) 3.725 | 12.97 | 1.802 | 8.920 | (I1) 4.459 |
| 24I | (P8) 4.435 | (C1) 0.312 | (E3) 3.725 | 12.94 | 1.800 | 8.920 | (I1) 4.461 |
| 25J | (—) 0 | (C1) 0.295 | (E3) 3.629 | 12.981 | 1.803 | 8.708 | (I1) 4.351 |
| 26J | (P9) 2.217 | (C1) 0.306 | (E3) 3.725 | 12.97 | 1.803 | 8.920 | (I1) 4.471 |
| 25K | (—) 0 | (C1) 0.295 | (E3) 3.629 | 12.981 | 1.803 | 8.708 | (I1) 4.351 |
| 27K | (P2) 2.217 | (C1) 0.314 | (E3) 5.263 | 12.97 | 1.801 | 8.890 | (I1) 6.045 |
| 14K | (P3) 4.435 | (C1) 0.311 | (E3) 3.725 | 13.00 | 1.801 | 8.890 | (I1) 5.662 |

TABLE 14-continued

Composition of Examples - amounts of reagents for polymerization

| Ex. | Amine polym. initiator precursor (P) (mmol) | Coupling agent (mmol) | Modified Chain-End Modifier (mmol) | butadiene (mol) | styrene (mol) | TMEDA (mol) | n-butyl lithium (I1) or amine initiator (I2) (mol) |
|---|---|---|---|---|---|---|---|
| 25N | (—) 0 | (C1) 0.314 | (E3) 3.726 | 13.00 | 1.808 | 8.920 | (I1) 4.454 |
| 33N | (P10) 4.433 | (C3) 0.487 | (E3) 3.970 | 13.06 | 1.811 | 8.936 | (I1) 4.686 |
| 34N | (—) 0 | (C3) 0.493 | (E3) 3.750 | 13.08 | 1.814 | 8.9355 | (I1) 4.390 |
| 13O | (P2) 2.217 | (C1) 0.314 | (E3) 5.263 | 12.97 | 1.801 | 8.890 | (I1) 6.045 |
| 35O | (P2) 2.217 | (C1) 0.309 | (E4) 5.219 | 12.93 | 1.799 | 9.081 | (I1) 6.336 |
| 36O | (P2) 2.217 | (C1) 0.301 | (C2) 5.151 | 12.64 | 1.758 | 8.779 | (I1) 6.025 |
| 20P | (P6) 4.435 | (C1) 0.311 | (E3) 3.725 | 12.98 | 1.800 | 8.920 | (I1) 4.466 |
| 37P | (P6) 4.435 | (C1) 0.310 | (E4) 3.7133 | 12.93 | 1.801 | 8.950 | (I1) 5.098 |
| 38P | (P6) 4.435 | (C1) 0.302 | (C2) 3.666 | 12.73 | 1.773 | 8.842 | (I1) 5.299 |

C1 = TTC . . . tin tetrachloride

C2 = TMS . . . tetramethoxysilane

TABLE 15

Polymer Characterizations

| Example | Mw [g/mol] | Mn [g/mol] | Mp1 [g/mol] | Coupling Rate[A] [%] | Mooney* viscosity [MU] | Mooney** Viscosity [MU] | Vinyl content[B] [wt %] | Styrene content[C] [wt %] |
|---|---|---|---|---|---|---|---|---|
| 5B | 509520 | 276444 | 269498 | 36.0 | 61.6 | (—) | 63.9 | 20.9 |
| 6B | 449898 | 298731 | 246991 | 45.8 | 65.2 | (—) | 61.4 | 21.0 |
| 7C | 782991 | 455724 | 464461 | 39.0 | 113.6 | 54.4 | 62.5 | 25.5 |
| 9C | 847115 | 505909 | 489238 | 44.7 | 116.6 | 61.2 | 62.5 | 25.3 |
| 8C | 803958 | 484128 | 464461 | 43.5 | 121.0 | 59.2 | 61.8 | 25.3 |
| 10D | 799875 | 508358 | 585712 | 21.2 | 90.5 | 68.6 | 61.5 | 25.3 |
| 11D | 794239 | 489926 | 592886 | 20.9 | 90.0 | 68.9 | 61.7 | 25.2 |
| 12E | 448941 | 307714 | 294845 | 26.1 | 61.2/62.8 | (—) | 62.2 | 21.1 |
| 13E | 483411 | 258859 | 299106 | 28.7 | 72.4 | (—) | 62.6 | 21.2 |
| 14E | 455605 | 301405 | 298130 | 24.5 | 61.5 | (—) | 63.2 | 21.3 |
| 12G | 448941 | 307714 | 294845 | 26.1 | 61.2/62.8 | (—) | 62.2 | 21.1 |
| 19G | 445373 | 302833 | 292073 | 24.7 | 60.9 | (—) | 62.7 | 21.1 |
| 20G | 466940 | 320788 | 301100 | 25.9 | 64.6 | (—) | 62.6 | 21.2 |
| 22H | 391623 | 246269 | 256423 | 27.4 | 58.7 | (—) | 63.7 | 20.7 |
| 23H | 386563 | 258043 | 234278 | 29.7 | 41.1 | (—) | 63.6 | 20.65 |
| 12I | 448941 | 307714 | 294845 | 26.1 | 61.2/62.8 | (—) | 62.2 | 21.1 |
| 20I | 466940 | 320788 | 301100 | 25.9 | 64.6 | (—) | 62.6 | 21.2 |
| 19I | 445373 | 302833 | 292073 | 24.7 | 60.9 | (—) | 62.7 | 21.1 |
| 24I | 455034 | 315382 | 304103 | 23.6 | 66.4 | (—) | 62.3 | 21.2 |
| 25J | 424745 | 295890 | 286671 | 23.9 | 60.7 | (—) | 62.8 | 21.2 |
| 26J | 442175 | 311838 | 291063 | 24.7 | 60.0 | (—) | 62.0 | 21.3 |
| 25K | 424745 | 295890 | 286671 | 23.9 | 60.7 | (—) | 62.8 | 21.2 |
| 27K | 483411 | 258859 | 299106 | 28.7 | 72.4 | (—) | 62.6 | 21.2 |
| 14K | 455605 | 301405 | 298130 | 24.5 | 61.5 | (—) | 63.2 | 21.3 |
| 12N | 448941 | 307714 | 294845 | 26.1 | 61.2/62.8 | (—) | 62.2 | 21.1 |
| 33N | 367436 | 288161 | 298083 | 18.5 | 60.7 | (—) | 63.7 | 21.23 |
| 34N | 494901 | 361276 | 291557 | 49.1 | 82.1 | (—) | 62.1 | 21.25 |
| 13O | 483411 | 258859 | 299106 | 28.7 | 72.4 | (—) | 62.6 | 21.2 |
| 35O | 508838 | 295995 | 295047 | 30.18 | 64.7/62.6 | (—) | 62.7 | 21.4 |
| 36O | 960344 | 445067 | 300307 | 70.2 | 133 | (—) | 61.9 | 21.5 |
| 20P | 466940 | 320788 | 301100 | 25.9 | 64.6 | (—) | 62.6 | 21.2 |
| 37P | 452113 | 324837 | 303203 | 24.54 | 65.8 | (—) | 63.0 | 21.4 |
| 38P | 676198 | 474901 | 299202 | 77.5 | 100.4/99.7 | (—) | 62.8 | 21.3 |

*Mooney viscosity of oil free grade

**Mooney viscosity of TDAE oil containing grade

A: determined by SEC

B: vinyl content is that of the 1,2-polybutadiene unit content of the final copolymer, and is determined by IR Spectroscopy C: styrene content of the final copolymer, and is determined by IR Spectroscopy Polymer Compositions Polymer compositions were prepared by combining and compounding the constituents listed below in Table 16, in a 350 cc Banbury mixer, and vulcanized at 160° C. for minutes. Vulcanization process data and physical properties for the each composition example are provided in Tables 24 and 25.

TABLE 16

Polymer Composition using polymers 22H, 23H, 12I, 19I to 20I, 24I, 25J, 26J, 14K, 25K, 27 K, 16L, 12N$_2$, 33N$_2$ 20P, 37P and 38P

| Components | | Amount (phr)[h] |
|---|---|---|
| Elastomeric polymer Example (solution styrene butadiene copolymer) | | 100 |
| IRB 7 | international ref. carbon black, Sid Richardson | 50 |
| Stearic acid[e] | | 1.5 |
| Zinc oxide[f] | | 3.0 |
| Softener (Aromatic Oil) | DAE[d] | 5.0 |
| Sulfur[c,g] | | 1.75 |
| CBS[c,d] | | 1.0 |

[a]2 stage mixing, Brabender 350S, Internal Banbury mixer
[b]N-cyclohexyl-2-benzothiazylsulfenamide, Vulcacit CZ/EG Lanxess AG)
[c]Second stage (curing system)
[d]Enerdex 65, Hansen & Rosenthal KG
[e]Cognis GmbH
[f]Grillo-Zinkoxid GmbH
[g]Solvay AG
[h]Based on weight of the styrene butadiene copolymer Additional polymer compositions were prepared by combining and compounding the constituents listed below in Table 17, in a 350 cc Banbury mixer, and vulcanized at 160° C. for 20 minutes. Vulcanization process data and physical properties for the each composition example are provided in Tables 20 and 21.

TABLE 17

Polymer Composition using polymers 12-15E, 12G, 19-20G, 33N$_1$, 34N$_1$, 13O, 35O and 36O

| Components | | Amount (phr)[n] |
|---|---|---|
| Elastomeric polymer Example (solution styrene butadiene copolymer) | | 80.0 |
| High cis 1,4-polybutadiene | Buna cis 132-Schkopau[m] | 20.0 |
| Precipitated silica | Ultrasil 7000GR[f] | 80.0 |
| Silane | NXT Silane[i] | 9.7 |
| Stearic acid[j] | | 1.0 |
| Stabilizer system Ozone protecting wax Antiozonant | Antilux 654[h] Dusantox[g] 6PPD | 1.5 2.0 |
| Zinc oxide[k] | | 2.5 |
| Softener (Oil) | TDAE[e] | 20.0 |
| Sulfur[d,l] | | 1.4 |

TABLE 17-continued

Polymer Composition using polymers 12-15E, 12G, 19-20G, 33N$_1$, 34N$_1$, 13O, 35O and 36O

| Components | Amount (phr)[n] |
|---|---|
| CBS[b,d] | 1.5 |
| DPG[c,d] | 1.5 |

[a]2 stage mixing, Brabender 350S, Internal Banbury mixer
[b]N-cyclohexyl-2-benzothiazylsulfenamide, Vulcacit CZ/EG, Lanxess AG)
[c]Diphenylguanidine, Vulkacit D, Lanxess AG
[d]Second stage (curing system)
[e]VivaTec 500, Hansen & Rosenthal KG
[f]Evonic
[g]N-(1,3-dimethylbutyl)-N'-phenyl-1,4-benzenediamine, Duslo a.s.
[h]Light & ozone protective wax, Rhein Chemie Rheinau GmbH
[i]Momentive
[j]Cognis GmbH
[k]Grillo-Zinkoxid GmbH
[l]Solvay AG
[m]Dow Olefinverbund GmbH
[n]Based on sum weight of the styrene butadiene copolymer and high cis 1,4-polybutadiene Additional polymer compositions were prepared by combining and compounding the constituents listed below in Table 18, in a 350 cc Banbury mixer, and vulcanized at 160° C. for 20 minutes. Vulcanization process data and physical properties for the each composition example are provided in Tables 20 and 21.

TABLE 18

Polymer Composition using polymers 5B-6B

| Components | | Amount (phr)[n] |
|---|---|---|
| Elastomeric polymer Example (solution styrene butadiene copolymer) | | 80.0 |
| High cis 1,4-polybutadiene | Buna cis 132-Schkopau[m] | 20.0 |
| Precipitated silica | Ultrasil 7000GR[f] | 80.0 |
| Silane | NXT Silane[i] | 9.7 |
| Stearic acid[j] | | 1.0 |
| Stabilizer system | Antilux 654[h] | 1.5 |
| Ozone protecting wax Antiozonant | Dusantox[g] 6PPD | 2.0 |
| Zinc oxide[k] | | 2.5 |
| Softener (Oil) | DAE[e] | 20.0 |
| Sulfur[d,l] | | 1.4 |
| CBS[b,d] | | 1.5 |
| DPG[c,d] | | 1.5 |

[a]2 stage mixing, Brabender 350S, Internal Banbury mixer
[b]N-cyclohexyl-2-benzothiazylsulfenamide, Vulcacit CZ/EG, Lanxess AG)
[c]Diphenylguanidine, Vulkacit D, Lanxess AG
[d]Second stage (curing system)
[e]Enerdex 65, Hansen & Rosenthal KG
[f]Evonic
[g]N-(1,3-dimethylbutyl)-N'-phenyl-1,4-benzenediamine, Duslo a.s.
[h]Light & ozone protective wax, Rhein Chemie Rheinau GmbH
[i]Momentive
[j]Cognis GmbH
[k]Grillo-Zinkoxid GmbH
[l]Solvay AG
[m]Dow Olefinverbund GmbH
[n]Based on sum weight of the styrene butadiene copolymer and high cis 1,4-polybutadiene Additional polymer compositions were prepared by combining and compounding the constituents listed below in Table 19, in a 350 cc Banbury mixer, and vulcanized at 160° C. for 20 minutes. Vulcanization process data and physical properties for the each composition example are provided in Tables 22 and 23.

TABLE 19

Polymer Composition using polymers 7C-9C, 10D and 11D

| Components | | Amount (phr)[g] |
|---|---|---|
| Elastomeric polymer Example (solution styrene butadiene copolymer) | | 117.5 |
| High cis 1,4-polybutadiene | Buna cis 132-Schkopau[f] | 20.0 |
| Precipitated silica | U7000GR[e] | 80.0 |
| Silane | NXT Silane[e] | 9.7 |
| Stearic acid[e] | | 1.0 |
| Stabilizer system | Dusantox[e] 6 PPD | 2.0 |
| Ozone protecting wax Antiozonant | Antilux 654[e] | 1.5 |
| Zinc oxide[e] | | 2.5 |
| Sulfur[d,e] | | 1.4 |
| CBS[b,d] | | 1.5 |
| DPG[c,d] | | 1.5 |

[a]2 stage mixing, Brabender 350S, Banbury internal mixer
[b]N-cyclohexyl-2-benzothiazylsulfenamide, Vulcacit CZ/EG, Lanxess AG
[c]Diphenylguanidine, Vulkacit D, Lanxess AG
[d]Second stage (vulcanization)
[e]Detailed specification see Table 4
[f]Dow Olefinverbund GmbH
[g]Based on sum weight of the styrene butadiene copolymer and high cis 1,4-polybutadiene

TABLE 20

Vulcanization Process Data & Silica Containing Polymer Vulcanizate Composition Property

| Example | Compound Mooney [Mu] | TS 1 [min] | TS 2 [min] | TC 50 [min] | TC 90 [min] | TC 95 [min] | Heat build up [° C.] | DIN Abrasion 0.5 kg load [mm] |
|---|---|---|---|---|---|---|---|---|
| 5B₁ | 65.3 | 3.2 | 4.4 | 6.5 | 16.0 | 21.2 | — | — |
| 6B₁ | 69.4 | 2.8 | 3.5 | 5.1 | 14.3 | 20.1 | 100.4 | 83 |
| 12E | 66.2 | 3.4 | 4.0 | 5.6 | 14.8 | 20.4 | — | — |
| 13E | 71.9 | 3.5 | 4.2 | 5.9 | 15.3 | 20.8 | 93.9 | 97 |
| 14E | 74.3 | 3.5 | 4.1 | 5.9 | 15.4 | 20.8 | 100.1 | 89 |
| 12G | 71.0 | 3.6 | 4.4 | 6.3 | 15.5 | 20.8 | — | 105 |
| 19G | 73.6 | 3.7 | 4.6 | 6.5 | 15.9 | 21.0 | — | 96 |
| 20G | 75.7 | 3.7 | 4.6 | 6.4 | 15.0 | 21.3 | — | 104 |
| 33N₁ | 85.4 | 3.3 | 4.2 | 5.9 | 14.6 | 19.9 | 86.3 | 99 |
| 34N₁ | 84.7 | 3.2 | 4.2 | 6.0 | 14.7 | 20.1 | 93.2 | 98 |
| 13O | 71.9 | 3.5 | 4.2 | 5.9 | 15.3 | 20.8 | 93.9 | 97 |
| 35O | 57.1 | 3.4 | 4.1 | 5.9 | 15.6 | 20.8 | — | 90 |
| 36O | 71.2 | 3.1 | 3.9 | 5.7 | 15.7 | 21.2 | — | 101 |

TABLE 21

Silica Containing Polymer Vulcanizate Composition Properties

| Example | Elongation at Break [%] | Tensile Strength [MPa] | Modulus 300 [MPa] | Tan δ at −10° C. | Tan δ at 0° C. | Tan δ at 60° C. | Temp. at Tan δ max [° C.] |
|---|---|---|---|---|---|---|---|
| 5B₁ | 467 | 20.9 | 10.3 | 0.5626 | 0.2872 | 0.093 | −20 |
| 6B₁ | 503 | 20.7 | 9.1 | 0.4572 | 0.2534 | 0.1049 | −22 |
| 12E | 498 | 20.4 | 9.2 | 0.4958 | 0.2461 | 0.1093 | −20 |
| 13E | 484 | 20.4 | 9.7 | 0.5214 | 0.2581 | 0.1062 | −20 |
| 14E | 452 | 19.1 | 9.5 | 0.5352 | 0.2642 | 0.1062 | −20 |
| 12G | 447 | 16.6 | 8.6 | 0.5185 | 0.2600 | 0.1104 | −20 |
| 19G | 488 | 19.1 | 8.7 | 0.5316 | 0.2588 | 0.1034 | −20 |
| 20G | 471 | 18.2 | 9.1 | 0.5206 | 0.2549 | 0.1040 | −20 |
| 33N₁ | 414 | 17.4 | 10.1 | 0.5544 | 0.2612 | 0.0894 | −20 |
| 34N₁ | 465 | 20.2 | 10.5 | 0.4958 | 0.2546 | 0.1014 | −20 |
| 13O | 484 | 20.4 | 9.7 | 0.5214 | 0.2581 | 0.1062 | −20 |
| 35O | 464 | 17.6 | 9.3 | 0.455 | 0.267 | 0.1290 | −22 |
| 36O | 462 | 18.3 | 9.7 | 0.493 | 0.270 | 0.1140 | −20 |

TABLE 22

Vulcanization Process Data & Silica Containing Polymer Vulcanizate Composition Properties

| Example | Compound Mooney [Mu] | TS 1 [min] | TS 2 [min] | TC 50 [min] | TC 90 [min] | TC 95 [min] | Heat build up [° C.] | DIN Abrasion 0.5 kg load [mm] |
|---|---|---|---|---|---|---|---|---|
| 7C | 67.2 | 3.7 | 4.7 | 6.3 | 12.9 | 17.5 | 96.0 | 146 |
| 9C | 76.8 | 3.8 | 4.8 | 6.5 | 12.5 | 16.9 | — | 118 |
| 8C | 77.9 | 3.7 | 4.8 | 6.4 | 12.4 | 16.7 | 89.5 | 113 |
| 10D | 79.1 | 3.0 | 3.6 | 5.0 | 11.6 | 17.0 | 99.3 | 118 |
| 11D | 87.8 | 3.2 | 4.1 | 5.6 | 11.8 | 17.0 | 87.7 | 110 |

TABLE 23

Silica Containing Polymer Vulcanizate Composition Properties

| Example | Elongation at Break [%] | Tensile Strength [MPa] | Modulus 300 [MPa] | Tan δ at −10° C. | Tan δ at 0° C. | Tan δ at 60° C. | Temp. at Tan δ max [° C.] |
|---|---|---|---|---|---|---|---|
| 7C | — | 21.8 | 5.9 | 0.399 | 0.248 | 0.128 | −24 |
| 9C | 602 | 21.7 | 7.3 | 0.424 | 0.246 | 0.111 | −24 |
| 8C | 608 | 22.2 | 7.7 | 0.430 | 0.247 | 0.106 | −24 |
| 10D | 620 | 20.5 | 6.7 | 0.342 | 0.223 | 0.121 | −26 |
| 11D | 616 | 21.5 | 7.0 | 0.384 | 0.232 | 0.106 | −24 |

TABLE 24

Vulcanization Process Data & Carbon Black Containing Polymer Vulcanizate Composition Properties

| Example | Compound Mooney [Mu] | TS 1 [min] | TS 2 [min] | TC 50 [min] | TC 90 [min] | TC 95 [min] | Heat build up [° C.] | DIN Abrasion 0.5 kg load [mm] |
|---|---|---|---|---|---|---|---|---|
| 22H | 83.3 | 4.4 | 6.7 | 9.2 | 17.6 | 21.8 | 117.7 | 155 |
| 23H | 81.9 | 4.4 | 6.8 | 9.2 | 17.5 | 21.7 | 117.1 | 160 |
| 12I | 114.4 | 4.3 | 5.5 | 7.4 | 14.3 | 17.9 | 88.5 | 143 |
| 19I | 113.4 | 4.4 | 5.3 | 6.9 | 13.3 | 16.8 | 86.6 | 148 |
| 20I | 117.2 | 4.0 | 5.1 | 6.7 | 12.8 | 16.4 | 86.7 | 129 |
| 24I | 115.2 | 4.4 | 6.0 | 8.0 | 14.7 | 18.4 | 86.6 | 144 |
| 25J | 119.6 | 4.7 | 6.2 | 8.3 | 15.3 | 18.9 | — | 142 |
| 26J | 116.7 | 4.8 | 6.3 | 8.3 | 15.4 | 19.2 | — | 148 |
| 25K | 118.4 | 4.6 | 6.2 | 8.3 | 15.2 | 19.0 | — | 145 |
| 27K | 113.0 | 4.8 | 6.1 | 7.8 | 14.7 | 18.6 | — | 150 |
| 14K | 115.5 | 4.8 | 6.2 | 8.2 | 15.2 | 18.9 | — | 145 |
| 12N$_2$ | 118.1 | 4.8 | 6.3 | 8.5 | 15.9 | 19.6 | — | 147 |
| 33N$_2$ | 125.5 | 4.8 | 6.3 | 8.2 | 15.1 | 18.8 | — | 148 |
| 20P | 117.2 | 4.0 | 5.1 | 6.7 | 12.8 | 16.4 | 86.7 | 129 |
| 37P | 112.8 | 4.6 | 6.0 | 8.0 | 14.9 | 18.7 | — | — |
| 38P | 115.2 | 3.9 | 5.5 | 7.4 | 14.4 | 18.3 | — | — |

TABLE 25

Carbon Black Containing Polymer Vulcanizate Composition Properties

| Example | Elongation at Break [%] | Tensile Strength [MPa] | Modulus 300 [MPa] | Tan δ at −10° C. | Tan δ at 0° C. | Tan δ at 60° C. | Temp. at Tan δ max [° C.] |
|---|---|---|---|---|---|---|---|
| 22H | 548 | 22.0 | 10.1 | — | 0.4189 | 0.1497 | −12 |
| 23H | 500 | 20.0 | 10.2 | — | 0.4174 | 0.1614 | −12 |
| 12I | 368 | 17.6 | 14.1 | 1.1498 | 0.6192 | 0.0997 | −10 |
| 19I | 412 | 20.9 | 13.9 | 1.1969 | 0.6382 | 0.0962 | −10 |
| 20I | 400 | 21.4 | 14.3 | 1.1749 | 0.6473 | 0.0938 | −10 |
| 24I | 382 | 19.6 | 14.2 | 1.1299 | 0.6405 | 0.0976 | −10 |
| 25J | 392 | 19.3 | 13.5 | 1.2134 | 0.5941 | 0.0907 | −10 |
| 26J | 394 | 18.7 | 13.1 | 1.1719 | 0.6588 | 0.0888 | −8 |
| 25K | 384 | 19.4 | 14.0 | 1.1421 | 0.5869 | 0.0930 | −10 |
| 27K | 390 | 19.0 | 13.6 | 1.2389 | 0.6545 | 0.0899 | −10 |
| 14K | 402 | 21.2 | 14.5 | 1.1444 | 0.6422 | 0.0905 | −10 |
| 12N$_2$ | 360 | 18.3 | 14.3 | 1.1446 | 0.6063 | 0.0939 | −10 |
| 12N | 360 | 18.3 | 14.3 | 1.1446 | 0.6063 | 0.0939 | −10 |
| 33N$_2$ | 377 | 20.0 | 14.9 | 1.1668 | 0.6779 | 0.0923 | −8 |
| 20P | 400 | 21.4 | 14.3 | 1.1749 | 0.6473 | 0.0938 | −10 |
| 37P | 395 | 20.7 | 14.3 | 1.1435 | 0.5985 | 0.1000 | −10 |
| 38P | 422 | 21.3 | 14.1 | 1.1095 | 0.5730 | 0.1105 | −10 |

One important application of the present invention is the production of elastomeric polymer compositions having lower "Tan δ at 60° C." values, higher "Tan δ at 0° C." values, or higher "Tan δ at −10° C." values. If one of the three values, which relate to a tire rolling resistance, to a tire wet grip performance, or to a tire ice grip performance, is improved, the other two values as well as other physical properties, such as abrasion resistance and prossessability must not be negatively impacting to improve the key tire performance properties. Tire treads made from polymer compositions having lower "Tan δ at 60° C." values, have corresponding lower rolling resistance, while those with higher "Tan δ at 0° C." values, have corresponding better wet skid properties, while those with higher "Tan δ at −10° C." values, have corresponding better ice grip properties.

In order to demonstrate the formation of the amine polymerization initiator compounds from amine polymerization initiator precursor compounds and a hydrocarbyl alkali compound, three precursor compounds, P1, P10 and P3, were contacted with n-butyllithium. The formation of the amine polymerization initiator compounds, 12, 13 and 14, was proven by $^1$H and $^{13}$C NMR spectroscopy. Different polymerization initiator compounds were then prepared from amine polymerization initiator precursor compounds, P8, P10, P6, P5 and P3, and n-butyllithium (see Table 9). Subsequently, the formed initiator compounds were used for the preparation of low molecular weight polymers, to demonstrate the capability of the formed initiator compounds to activate and polymerize butadiene monomers (see Table 10). The structure of the moieties at the "alpha position" of alpha-modified/omega-modified linear polymer macromolecules, or at the polymer arm ends of the alpha-modified/branched-modified polymer macromolecules, is derived form the structure of the amine initiator compound(s), and corresponds to Formula 1A to 1F of the first polymer composition according to the invention.

It has been discovered that the combination of the initiator compounds, coupling modifier agents, and chain end modifiers, each as described herein, form modified polymer vulcanizates with excellent low hysteresis energy loss, as measured at low value of the Tan delta at 60° C.; improved grip properties on a wet surface, as measured at Tan delta at 0° C.; improved grip properties on an icy surface, as measured at Tan delta at −10° C.; and reduced vulcanizate heat built-up upon mechanical stress. Compared with a traditional polymer preparation, the inventive processes combining the following, A) amine polymerization initiator compounds, with B) coupling agents, and with C) a sulfanylsilane chain-end-modifier compound, provides an increased degree of polymer modification, and an improved performance in the corresponding polymer vulcanizate.

It has been discovered that modified polymers comprising moieties according to Formula 1A to 1F (formed from above stated amine polymerization initiator compounds according to Formula 1G to 1L), in combination with the coupling modifier agents (described herein), and chain end modifiers (described herein), form polymers with reduced hysteresis energy loss, as measured at low value of the Tan delta at 60° C.; improved grip properties (improved wet skid resistance) on a wet surface, as measured at Tan delta at 0° C.; improved grip properties on an icy surface, as measured at Tan delta at −10° C.; and reduced vulcanizate heat built-up upon mechanical stress.

It has been discovered that the inventive initiator compounds specified below, in combination with the coupling modifier agents (described herein), and chain end modifiers (described herein), produce polymers with increased coupling rates. An increased coupling rate beneficially decreases the risk of polymer stickiness. In addition, an increased coupling rate decreases the polymer solution viscosity, and therefore enables a higher polymer concentration in the polymerization solvent, and results in an increase in polymer production throughput. The inventive initiator compounds according to Formula 1J to 1L (derived modified polymer moieties according to Formula 1 D to 1F) comprise a divalent E group selected from the group consisting of: (i) a $(C_1-C_{18})$ alkyl, which is substituted with at least one of the following groups: tertiary amine group and $R^{39}R^{40}R^{41}$SiN group, where $R^{39}$, $R^{40}$ and $R^{41}$ are each independently selected from the group consisting of: $(C_1-C_{18})$ alkyl, $(C_6-C_{18})$ aryl, and $(C_7-C_{18})$ aralkyl; (ii) an oxygen atom; (iii) a sulfur atom; (iv) N—CHR$^8$—CR$^9$=C(M)R$^{10}$, N—CHR$^8$—C(M)=CHR$^{10}$, or N—C(M)R$^8$—CR$^9$=CHR$^{10}$; (v) N—CHR$^8$—CR$^9$=CHR$^{10}$; (vi) H—N group; and (vii) a $R^{36}R^{37}R^{38}$SiN group, where $R^{36}$, $R^{37}$ and $R^{38}$ are each independently selected from the group consisting of: $(C_1-C_{18})$ alkyl, $(C_6-C_{18})$ aryl, and $(C_7-C_{18})$ aralkyl.

It has also been discovered that the following initiator compounds, in combination with the coupling modifier agents (described herein), and chain end modifiers (described herein), produce polymers with increased coupling rates. The inventive initiator compounds according to Formula 1G to 1I (derived modified polymer moieties according to Formula 1A to 1C) comprising the following: a is the number 2, and b is the number zero; and $R^6$ is selected from $(C_1-C_{18})$ alkyl, which is substituted with at least one of the following groups: tertiary amine group, $R^{45}R^{46}R^{47}$Si— group, or $(R^{45}R^{46}R^{47}Si)_2$N group, where $R^{45}$, $R^{46}$ and $R^{47}$ are each independently selected from the group consisting of: $(C_1-C_{18})$ alkyl, $(C_6-C_{18})$ aryl, and $(C_7-C_{18})$ aralkyl; and $R^6$ is preferably selected from $(C_1-C_5)$ alkyl.

It has also been discovered that the following initiator compounds, in combination with the coupling modifier agents (described herein), and chain end modifiers (described herein), produce polymers with increased coupling rates. The inventive initiator compounds according to Formula 1G to 1I (derived modified polymer moieties according to Formula 1A to 1C) comprising the following: a is the number 1, and b is the number 1; $R^7$ is selected from the group consisting of: hydrogen (H); phenyl $(C_6H_5)$; —CHR$^8$—CR$^9$=CHR$^{10}$; and —SiR$^{51}R^{52}R^{53}$, where $R^{51}$, $R^{52}$ and $R^{53}$ are each independently selected from the group consisting of: $(C_1-C_{18})$ alkyl, $(C_6-C_{18})$ aryl, and $(C_7-C_{18})$ aralkyl; and $R^6$ is selected from the group consisting of: (i) $(C_1-C_{18})$ alkyl, which is substituted with at least one of the following groups: amine group, $R^{45}R^{46}R^{47}$Si— group, or $R^{45}R^{46}R^{47}$Si-amine group, where $R^{45}$, $R^{46}$ and $R^{47}$ are each independently selected from the group consisting of: $(C_1-C_{18})$ alkyl, $(C_6-C_{18})$ aryl, and $(C_7-C_{18})$ aralkyl; (ii) hydrogen (H); and (iii) —SiR$^{36}R^{37}R^{38}$, where $R^{36}$, $R^{37}$ and $R^{38}$ are each independently selected from the group consisting of: $(C_1-C_{18})$ alkyl, $(C_6-C_{18})$ aryl, and $(C_7-C_{18})$ aralkyl.

For example, the inventive modified polymer 20I made by using an inventive initiator, in accordance with the invention, had a coupling rate of 25.9 percent, while modified polymers 19I and 24I (comparative examples), both made by using an initiator compound corresponding to U.S. Pat. No. 5,502,131 had coupling rates of 24.7 and 23.9 percent, respectively. The same coupling modifier agent and the same chain end modifier were used in each example with identical capital letter (e.g. I). Also the modified polymer 13E made by using an inventive initiator had a coupling rate of 28.7 percent, while modified polymer 14E (comparative example), made by using an initiator compound corresponding to U.S. Pat. No. 5,502,131 had a coupling rate of only 24.5 percent. Also the modified polymer 20G made by using an inventive initiator had a coupling rate of 25.9 percent, while modified polymer 19G (comparative example), made by using an initiator compound corresponding to U.S. Pat. No. 5,502,131 had a coupling rate of only 24.7 percent. Example 34N does not comprise and amine initiator.

As previously stated, one significant application for the subject modified elastomeric polymers is their use in preparing elastomeric polymer compositions, and which are specifically used for tire treads, and which have one or more of the following key characteristics: reduced rolling resistance, as represented by compositions having relatively lower (or reduced) values for Tan δ at 60° C.; increased wet skid resistance, as represented by compositions having relatively higher values for Tan δ at 0° C.; improved ice grip, as represented by compositions having relatively higher values for Tan δ at −10° C.; and/or relatively decreased tire heat built up.

Depending on the polymer and on the composition, one, two, three or four of the aforementioned property values can be improved, while none of the above Tan δ values or heat built-up value are significantly deteriorated. The polymer preparation and the polymer characteristics of those polymers used for the preparation of compositions containing silica or carbon black, and vulcanizates formed from the same, are stated in Table 14 and 15. The compounding and vulcanization formulations are stated in Table 16, Table 17, Table 18 and Table 19. As illustrated in Table 21, "silica containing" polymer compositions are prepared from oil-free polymers modified by using amine polymerization initiator compounds, coupling agents, and sulfanylsilane chain end-modifier compounds, according to the present invention. Some of the amine polymerization initiator compounds were prepared in-situ, in the polymerization reactor, from amine polymerization initiator precursor compounds, P1, P2, P3, P4, P5, P6, and n-butyl lithium (see polymers 13E, 14E, 19G and 20G in test series E and G in Tables 20 and 21, or see polymers 4630-7 and 4630-8 in test series 8C and 11D in Tables 22 and 23). Amine polymerization initiator compound 12 (see polymers 1A, 4B and 5B in Table 14) prepared in a separate reaction vessel from amine polymerization initiator precursor compounds, P1 and n-butyl lithium, and subsequently transferred into the polymerization reactor to start the polymerization reaction. Corresponding to the invention, the combination of the amine polymerization initiator compound 12 with coupling agent C1, and sulfanylsilane compound E2, in Example $5B_1$ of Table 21, had relatively higher "Tan δ at 0° C." values, relatively higher "Tan δ at −10° C.," and relatively lower "Tan δ at 60° C." values, as compared to their counterpart Examples (designated by the same letters $B_1$, particularly reference Example, $6B_1$), prepared without using an amine polymerization initiator compound. Similarly, the combination of the amine polymerization initiator compounds, prepared from precursor P2 or P3 and n-butyl lithium, with the coupling agent C1, and with sulfanylsilane chain end-modifier compound E3, in Example 13E and 14E of Table 21, had relatively higher "Tan δ at 0° C." values, relatively higher "Tan δ at −10° C.," and relatively lower "Tan δ at 60° C." values, as compared to their counterpart examples (designated by the same letter E, particularly reference Example, 12E and 15E), prepared without using an amine polymerization initiator compound. Tensile Strength, Modulus 300, and Elongation at Break, of the stated modified polymer compound vulcanizate Examples were improved, or at least not significantly deteriorated.

As shown in Table 20, heat build up during dynamic deformation of the vulcanizate is reduced, or in a comparable range, by use of the subject modified polymers. Polymer "heat built-up" reduction is believed to improve the durability of the resulting composition, and to increase overall elasticity. Tensile Strength and Modulus 300 are not deteriorated in comparison to the reference polymer, suggesting the formation of a stable polymer network with a higher resistance under mechanical stress. Although "Elongation at Break" values are slightly reduced, they are still very acceptable considering the improved Tan δ values.

Tables 20 also shows that scorch times (TS) and times to cure (TC) are comparable with unmodified polymers, and thus, the corresponding polymer compositions have good processability.

Table 23 illustrates "silica-containing" polymer compositions are prepared from oil-extended polymers, modified by using amine polymerization initiator compounds, coupling agents and sulfanylsilane chain end-modifier compounds, according to the present invention. Corresponding to the invention, the combination of the amine polymerization initiator compounds, prepared from precursor P1 and n-butyl lithium, with the coupling agent C1 or C2, and with sulfanylsilane chain end-modifier compound E3, in Example 8C of Table 23, had relatively higher "Tan δ at −10° C." values, and relatively lower "Tan δ at 60° C." values, the "Tan δ at 0° C." values being in the same range, as compared to their counterpart Examples (designated by the same letter C particularly reference Example, 9C), prepared without using an amine polymerization initiator compound. Tensile Strength, Modulus 300, and Elongation at Break, of the stated modified polymer compound vulcanizate Examples (see Table 23) were improved, or at least not significantly deteriorated. Reference Example 9C however shows improved "Tan δ at 60° C." and "Tan δ at 0° C." values, when compared with reference Example 7C, which was prepared without using an amine polymerization initiator and chain end modifier compound. Accordingly, the correct choice, and kind of modifier components, beneficially including amine polymerization initiator compound, coupling agent and chain end-modifier compound, lead to an improvement of modified polymer vulcanizate rolling resistance, wet grip and ice grip.

Furthermore, with respect to "oil-free, modified SSBR-silica" vulcanizate, the combination of the amine polymerization initiator compounds, prepared from precursor P2 or P3 and n-butyl lithium, with the coupling agent C1, and with sulfanylsilane chain end-modifier compound E3, in Example 13E and 14E of Table 20, had relatively lower heat built up, as compared to their counterpart examples (Example 15E), prepared without using an amine polymerization initiator compound.

Furthermore, with respect to "oil-extended, modified SSBR-silica" vulcanizate, the combination of the amine polymerization initiator compounds, prepared from precursor P1 and n-butyl lithium, with the coupling agent C2, and with sulfanylsilane chain end-modifier compound E3, in Example 8C and 11D of Table 22, had relatively lower heat built-up, as compared to their counterpart examples (Example 7C and Example 10D), prepared without using an amine polymerization initiator compound.

The aforementioned benefits of the technology were found in carbon black containing modified polymer compositions as well.

Corresponding to the invention, the combination of the amine polymerization initiator compounds, prepared from precursor P5, P6 or P1 and n-butyl lithium, with the coupling agent C1, and with sulfanylsilane chain end-modifier compound E3, in Example 19I and 20I of Table 25, had relatively higher "Tan δ at 0° C." values, relatively higher "Tan δ at − 10° C." values and relatively lower "Tan δ at 60° C." values, as compared to their counterpart Examples (designated by the same letter I, particularly reference Example, 12I), prepared without using an amine polymerization initiator compound. Tensile Strength, Modulus 300, and Elongation at Break, of the stated "modified polymer vulcanizate" Examples were improved, or at least not significantly deteriorated.

Furthermore, with respect to "oil-free, modified SSBR-carbon black" vulcanizate, the combination of the amine polymerization initiator compounds, prepared from precursor P5, P6 or P1 and n-butyl lithium, with the coupling agent C1, and with sulfanylsilane chain end-modifier compound E3, in Example 19I and 20I of Table 24, had low vulcanizate heat built-up values, as compared to their counterpart Examples (designated by the same letter 1, particularly reference Example, 12I), prepared without using an amine polymerization initiator compound.

A polar groups already attached to a polymer chain often negatively impacts the addition of another polar group comprising molecule. The discovered of beneficially improved vulcanizate performance properties, particularly the excellent low hysteresis energy loss, the improved grip properties on a wet or icy surface, and reduced vulcanizate heat built-up upon mechanical stress, indicate that amine groups comprising living polymers formed from amine polymerization initiator compounds, made from amine polymerization initiator precursor compounds P1, P3, P5, P6, P8 and P10, and n-butyl lithium do not prevent both, the efficient polymer coupling using coupling agents C1, C2 or C3 and an efficient chain-end modification using chain end modification agent E2 or E3. The application of alternative chain-end modification agents often leads to deteriorated vulcanizate performance properties.

For example, with respect to "oil-free, modified SSBR-carbon black" vulcanizate, the combination of the amine polymerization initiator compounds, prepared from precursor P6 and n-butyl lithium, with the coupling agent C1, and with sulfanylsilane chain end-modifier compound E3, in Example 20P of Table 25, had low vulcanizate Tan δ at 60° C." value and a higher Tan δ at −10° C." value, as compared to their counterpart Examples (designated by the same letter P, particularly reference Examples, 37P and 38P), prepared by using alternative chain-end modifier compounds E4 or coupling agent C2 for polymer chain-end modification.

Furthermore, with respect to "oil-free, modified SSBR-silica" vulcanizate, the combination of the amine polymerization initiator compounds, prepared from precursor P2 and n-butyl lithium, with the coupling agent C1, and with sulfanylsilane chain end-modifier compound E3, in Example 130 of Table 21, had low vulcanizate Tan δ at 60° C." value and a higher Tan δ at −10° C." value, as compared to their counterpart Examples (designated by the same letter O, particularly reference Examples, 35O and 36O), prepared by using alternative chain-end modifier compounds E4 or coupling agent C2 for polymer chain-end modification.

It is particularly advantageous that aforementioned benefits were generally found with both "carbon black containing" polymer compositions, as well as with "silica containing" polymer compositions.

In addition, it is advantageous that the aforementioned benefits were found, when according to the invention, "oil free" modified polymers and "oil extended" modified polymers were used as polymer source in "carbon black containing" and "silica containing" polymer compositions.

The invention claimed is:

1. A composition comprising a modified polymer comprising:
   at least one branched modified polymer macromolecule comprising at least one of structure (ib1), (ib2), (ib3), or (ib4); and
   at least one linear modified polymer macromolecule comprising at least one of structure (iib1) or (iib2);
   wherein the at least one branched modified polymer macromolecule and the at least one linear modified polymer macromolecule each, independently, further comprise at least one amine group selected from the group consisting of:

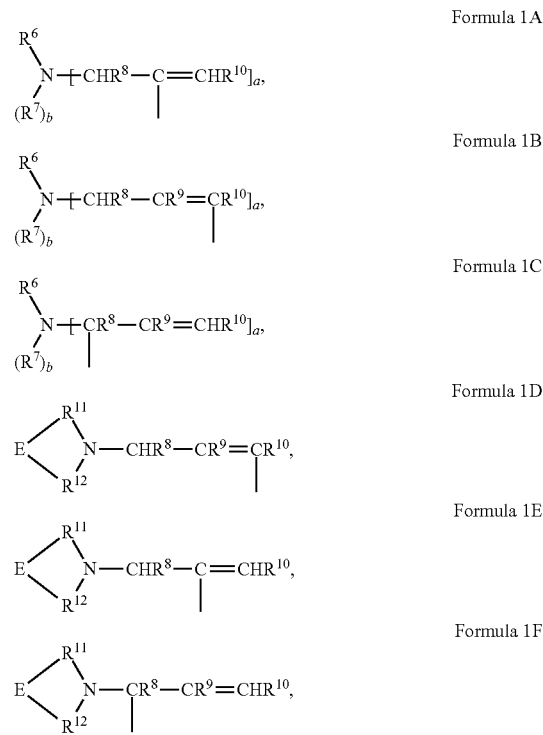

and combinations thereof;
where,
N is a nitrogen atom;
C is carbon atom;
H is a hydrogen atom;
E is at least divalent, comprises at least one heteroatom, and is selected from the group consisting of: a) a $(C_1-C_{18})$ alkyl, which is substituted with one or more of the following groups: amine group, or $R^{39}R^{40}R^{41}Si$-amine group; b) an oxygen atom (O); c) a sulfur atom (S); d) $N-CHR^8-CR^9=CR^{10}$; e) $N-CHR^8-C\equiv CHR^{10}$; f) $N-CR^8-CR^9=CHR^{10}$; g) $N-CHR^8-CR^9=CHR^{10}$; h) a H—N group; i) a tertiary amine group; and j) a $R^{42}R^{43}R^{44}SiN$ group;
$R^{39}$, $R^{40}$ and $R^{41}$ are each independently selected from the group consisting of: $(C_1-C_{18})$ alkyl, $(C_6-C_{18})$ aryl, and $(C_7-C_{18})$ aralkyl;
$R^{42}$, $R^{43}$ and $R^{44}$ are each independently selected from the group consisting of $(C_1-C_{18})$ alkyl, $(C_6-C_{18})$ aryl, and $(C_7-C_{18})$ aralkyl;
$R^6$ is $(C_1-C_{18})$ alkyl substituted with an amine group which is a tertiary amine or a $R^{45}R^{46}R^{47}SiN$ group;
$R^{45}$, $R^{46}$ and $R^{47}$ are each independently selected from the group consisting of $(C_1-C_{18})$ alkyl, $(C_6-C_{18})$ aryl, and $(C_7-C_{18})$ aralkyl;
$R^8$, $R^9$, $R^{10}$ are each independently selected from the group consisting of hydrogen, $(C_1-C_{18})$ alkyl, $(C_6-C_{18})$ aryl, and $(C_7-C_{18})$ aralkyl;
$R^{11}$ and $R^{12}$ are each at least divalent, and each independently selected from the group consisting $(C_1-C_{18})$ alkyl, $(C_6-C_{18})$ aryl, and $(C_7-C_{18})$ aralkyl;
a is the number 2;
b is the number 0; and
where
(ib1) is a four valent silicon or tin atom selected from the group consisting of a $(R''')_rM$ group, a $(R''')_rM(X)_p$ group, and a $M(X)_z-(O)_x-M(X)_z$ group, wherein M is a tin or a silicon atom;
O is an oxygen atom;
X is a halide atom, an alkoxy group or a hydroxyl group (—OH group);
R''' is a $(C_1-C_6)$-alkyl group;
z is the number 2;
x is the number 0 or 1;
t is the number 0 or 1;
p is the number 1 or 2; and
wherein the remaining free valences on M are each linked to an alpha-modified polymer macromolecule;

(ib2) is a group according to Formula 2A:

$$(R^{24}O)_q(R^{25})_r Si—R^{29}—S—Si'R^{26}R^{27}R^{28} \quad \text{Formula 2A}$$

(ib3) is a group according to Formula 2B:

$$(R^{24}O)_q(R^{25})_r Si—R^{29}—S—H \quad \text{Formula 2B}$$

(ib4) is a group according to Formula 2C:

$$(R^{30}O)_s(R^{31})_t Si—R^{35}—N(H)_u(Si'R^{32}R^{33}R^{34})_v \quad \text{Formula 2C}$$

(iib1) is a sulfanylsilane moiety according to Formula 4A:

$$(R^{18}O)_c(R^{19})_d Si—R^{20}—S—Si'R^{21}R^{22}R^{23} \quad \text{Formula 4A}$$

(iib2) is a sulfanylsilane compound moiety according to Formula 4B:

$$(R^{18}O)_c(R^{19})_d Si—R^{20}—S—H \quad \text{Formula 4B}$$

wherein,
Si and Si' are each a silicon atom;
S is a sulfur atom;
O is an oxygen atom;
$R^{18}$ is hydrogen or $(C_1-C_6)$ alkyl;
$R^{19}$ is selected from the group consisting of hydrogen, $(C_1-C_{18})$ alkyl, $(C_6-C_{18})$ aryl, and $(C_7-C_{18})$ aralkyl;
$R^{20}$ is a divalent group selected from the group consisting of a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl; where $R^{20}$ may be substituted with a substituent selected from the group consisiting of a $(C_1-C_4)$ alkyl, a $(C_1-C_4)$ alkoxy, a $(C_7-C_{16})$ aryl, a $(C_7-C_{16})$ aralkyl, a nitrile, an amine, —$NO_2$, and a thioalkyl;
$R^{21}$, $R^{22}$ and $R^{23}$ are each independently selected from the group consisting of hydrogen, $(C_1-C_{18})$ alkyl, $(C_1-C_{18})$ alkoxy, $(C_6-C_{18})$ aryl, and $(C_7-C_{18})$ aralkyl;
$R^{24}$ is hydrogen or $(C_1-C_6)$ alkyl;
$R^{25}$, $R^{26}$, $R^{27}$ and $R^{28}$ are each independently selected from the group consisting of hydrogen, $(C_1-C_{18})$ alkyl, $(C_1-C_{18})$ alkoxy, $(C_6-C_{18})$ aryl, and $(C_7-C_{18})$ aralkyl;
$R^{29}$ is a divalent group selected from the group consisting of a di-$(C_2-C_{20})$ alkylether (alkyl-O-alkyl), a $(C_6-C_{18})$ aryl, a $(C_7-C_{18})$ alkylaryl, and a $(C_1-C_{18})$ alkyl; where $R^{29}$ may be substituted with a substituent selected from the group consisting of a $(C_1-C_4)$ alkyl, a $(C_1-C_4)$ alkoxy, a $(C_7-C_{16})$ aryl, a $(C_7-C_{16})$ aralkyl, a nitrile, an amine, an $NO_2$, and a thioalkyl;
$R^{30}$ is hydrogen or $(C_1-C_6)$ alkyl;
$R^{31}$, $R^{32}$, $R^{33}$ and $R^{34}$ are each independently selected from the group consisting of hydrogen, $(C_1-C_{18})$ alkyl, $(C_1-C_{18})$ alkoxy, $(C_6-C_{18})$ aryl, and $(C_7-C_{18})$ aralkyl;
$R^{35}$ is a divalent group selected from the group consisting of a di-$(C_2-C_{20})$ alkylether (alkyl-O-alkyl), an $(C_6-C_{18})$ aryl, a $(C_7-C_{18})$ alkylaryl, and a $(C_1-C_{18})$ alkyl; where $R^{35}$ may be substituted with a substituent selected from the group consisting of a $(C_1-C_4)$ alkyl, a $(C_1-C_4)$ alkoxy, a $(C_7-C_{16})$ aryl, a $(C_7-C_{16})$ aralkyl, a nitrile, an amine, —$NO_2$, and a thioalkyl;
c is a number selected from 0, 1 and 2;
d is a number selected from 0, 1, and 2;
c+d=2;
q is the number 0 or 1;
r is the number 0 or 1;
q+r is 0 or 1;
s is the number 0 or 1;
t is the number 0 or 1;
s+t is 0 or 1;
u is the number 0, 1 or 2;
v is the number 0, 1 or 2;
u+v is 2; and
the remaining free valences of the four valent silicon atom are each linked to an alpha-modified polymer macromolecule.

2. The composition of claim 1, wherein the amine group is selected from the group consisting of the Formula 1 D, Formula 1 E, and Formula 1 F.

3. The composition of claim 2, wherein E is selected from the group consisting of (i) $(C_1-C_{18})$ alkyl which is substituted with an amine group which is a tertiary amine, or $R^{39}R^{40}R^{41}$Si-amine group; (ii) a tertiary amine group; (iii) a $R^{42}R^{43}R^{44}$SiN group; (iv) an oxygen atom; (v) a sulfur atom; (vi) N—$CHR^8$—$CR^9$=$CR^{10}$; (vii) N—$CHR^8$—C=$CHR^{10}$; (viii) N—$CR^8$—$CR^9$=$CHR^{10}$; (ix) N—$CHR^8$—$CR^9$=$CHR^{10}$; and (x) a H—N group.

4. The composition of claim 2, wherein E is a $(C_1-C_{18})$ alkyl substituted with a tertiary amine group or $R^{42}R^{43}R^{44}$SiN group.

5. The composition of claim 2, wherein E is an oxygen atom (O) or a sulfur atom (S).

6. The composition of claim 2, wherein E is N—$CHR^8$—$CR^9$=$CR^{10}$, N—$CHR^8$—C=$CHR^{10}$, N—$CR^8$—$CR^9$=$CHR^{10}$ or N—$CHR^8$—$CR^9$=$CHR^{10}$.

7. The composition of claim 2, wherein E is an H—N group or a $R^{42}R^{43}R^{44}$SiN group.

8. The composition of claim 1, further comprising an oil.

9. The composition of claim 1, wherein the composition further comprises a filler.

10. The composition of claim 1, wherein the at least one branched modified polymer macromolecule and the at least one linear modified polymer macromolecule each independently comprise a monomer unit derived from at least one monomer selected from the group consisting of butadiene, isoprene, styrene, alpha-methylstyrene, and combinations thereof.

11. The composition of claim 1, wherein the composition further comprises a polymer selected from the group consisting of polybutadiene, butadiene-styrene copolymers, butadiene-isoprene copolymers, polyisoprene, and butadiene-styrene-isoprene terpolymers.

12. An article comprising at least one component formed from the composition of claim 1, wherein the article is selected from the group consisting of a tire, a tire tread, a tire side wall, a tire carcass, a belt, a hose, a vibration damper, and a footwear component.

13. An article comprising at least one component formed from a vulcanized composition comprising the reaction product of the composition of claim 1 with a filler or a vulcanizing agent.

14. The article of claim 13, wherein the article is selected from the group consisting of a tire, a tire tread, a tire side wall, a tire carcass, a belt, a hose, a vibration damper, and a footwear component.

15. A method for making a modified polymer, comprising:
A) reacting an amine polymerization initiator with a monomer in a polymerization solvent to form Composition A; where the amine polymerization initiator is selected from the group consisting of:

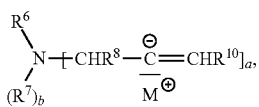  Formula 1G

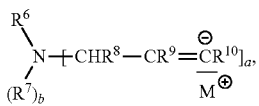  Formula 1H

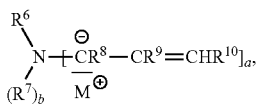  Formula 1I

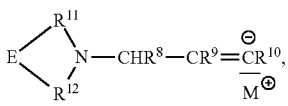  Formula 1J

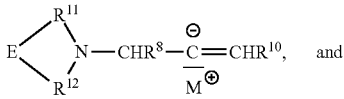  Formula 1K and

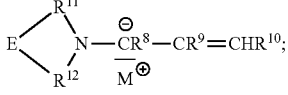  Formula 1L where

M is lithium, sodium or potassium;

N is a nitrogen atom;

C is carbon atom;

H is a hydrogen atom;

E comprises at least one heteroatom and is selected from the group consiting of an oxygen atom (O), a sulfur atom (S), N—$CHR^8$—$CR^9$=$C(M)R^{10}$, N—$CHR^8$—$C(M)$=$CHR^{10}$, N—$C(M)R^8$—$CR^9$=$CHR^{10}$, and N—$CHR^8$—$CR^9$=$CHR^{10}$;

$R^6$ is ($C_1$-$C_{18}$) alkyl substituted with an amine group which is a tertiary amine;

$R^8$, $R^9$, $R^{10}$, $R_{12}$ are each independently selected from the group consisting of ($C_1$-$C_{18}$) alkyl, ($C_6$-$C_{18}$) aryl, and ($C_7$-$C_{18}$) aralkyl;

a is the number 2; and b is the number 0; and the monomer is selected from the group consisting of butadiene, styrene, isoprene, and combinations thereof;

B) reacting Composition A with at least one coupling agent selected from the group consisting of $SnCl_4$, $(R^1)_3SnCl$, $(R^1)_2SnCl_2$, $R^1SnCl_3$, $SiCl_4$, $(R^1)_3SiCl$, $(R^1)_2SiCl_2$, $R^1SiCl^3$, $Cl_3Si$—$SiCl_3$, $Cl_3Si$—O—$SiCl_3$, $Cl_3Sn$—$SnCl_3$, $Cl_3Sn$—O—$SnCl_3$, $Sn(OMe)_4$, $Si(OMe)_4$, $Sn(OEt)_4$, $Si(OEt)_4$, $(R^{24}O)_q(R^{25})_r Si$—$R^{29}$—S—$Si'R^{26}R^{27}R^{28}$ (Formula 2A), $(R^{30}O)_s(R^{31})_t Si$—$R^{35}$—N(H)$_u$($Si'R^{32}R^{33}R^{34}$)$_v$ (Formula 2C), and combinations thereof, to form Composition B;

where $R_1$ is a hydrocarbyl group;

Si and Si' are silicon atoms;

S is a sulfur atom;

N is a nitrogen atom;

O is an oxygen atom;

H is a hydrogen atom;

$R^{24}$ and $R^{30}$ are each independently hydrogen or ($C_1$-$C_6$) alkyl;

$R^{25}$, $R^{26}$, $R^{27}$, $R^{28}$, $R^{31}$, $R^{32}$, $R^{33}$, and $R^{34}$ are the same or different, and are each independently selected from the group consisting of hydrogen, ($C_1$-$C_{18}$) alkyl, ($C_1$-$C_{18}$) alkoxy, ($C_6$-$C_{18}$) aryl, and ($C_7$-$C_{18}$) aralkyl;

$R^{29}$ and $R^{35}$ are each divalent groups independently selected from the group consisting of a di-($C_2$-$C_{20}$) alkylether (alkyl-O-alkyl), a ($C_6$-$C_{18}$) aryl, a ($C_7$-$C_{18}$) alkylaryl, and a ($C_1$-$C_{18}$) alkyl; where each of $R^{29}$ and $R^{35}$ may independently be substituted with at least one substituent selected from the group consisting of ($C_1$-$C_4$) alkyl, ($C_1$-$C_4$) alkoxy, ($C_7$-$C_{16}$) aryl, ($C_7$-$C_{16}$) aralkyl, an amine, and thioalkyl;

q and s are independently the number 2 or 3;

r and u are independently the number 0 or 1;

q+r=3; and u+v=3;

C) reacting Composition B with at least one chain-end modifying agent of Formula 4C to form the modified polymer:

$(R^{18}O)_c(R^{19})_d Si$—$R^{20}$—S—$Si'(R^{21})(R^{22})R^{23}$ (Formula 4C)

where

Si and Si' are silicon atoms;

S is sulfur;

O is oxygen;

c is an integer selected from the group consisting of 1, 2 and 3;

d is an integer selected from the group consisting of 0, 1, and 2;

c+d=3;

$R^{18}$ is ($C_1$-$C_6$) alkyl;

$R^{19}$ is selected from the group consisting of ($C_1$-$C_{18}$) alkyl, ($C_6$-$C_{18}$) aryl, and ($C_7$-$C_{18}$) aralkyl;

$R^{20}$ is a divalent group selected from the group consisting of ($C_6$-$C_{18}$) aryl, ($C_7$-$C_{18}$) alkylaryl, and ($C_1$-$C_{18}$) alkyl; where $R^{20}$ may be substituted with at least one substituent selected from the group consisting of ($C_1$-$C_4$) alkyl, ($C_1$-$C_4$) alkoxy, ($C_7$-$C_{16}$) aryl, ($C_7$-$C_{16}$) aralkyl, and thioalkyl;

$R^{21}$, $R^{22}$ and $R^{23}$ are each independently selected from the group consisting of ($C_1$-$C_{18}$) alkyl, ($C_1$-$C_{18}$) alkoxy, ($C_6$-$C_{18}$) aryl, and ($C_7$-$C_{18}$) aralkyl.

* * * * *